US012551407B2

(12) United States Patent
Halkude et al.

(10) Patent No.: US 12,551,407 B2
(45) Date of Patent: Feb. 17, 2026

(54) SYSTEM FOR MOLDING AND COATING OF PHARMACEUTICAL TABLETS

(71) Applicants: Continuus Pharmaceuticals, Inc., Woburn, MA (US); I.M.A. Industria Macchine Automatiche S.p.A., Bologna (IT)

(72) Inventors: Bhakti Halkude, Boston, MA (US); Federica Casati, Boston, MA (US); Evan James Goodwin, Georgetown (CA); Saptarshi Chattopadhyay, Worcester, MA (US); Bayan Teisho Takizawa, Sudbury, MA (US); Salvatore Mascia, Boston, MA (US)

(73) Assignees: Continuus Pharmaceuticals, Inc., Woburn, MA (US); I.M.A. Industria Macchine Autommatiche S.p.A., Bologna (IT)

( * ) Notice: Subject to any disclaimer, the term of this patent is extended or adjusted under 35 U.S.C. 154(b) by 921 days.

(21) Appl. No.: 17/119,143

(22) PCT Filed: Jun. 10, 2019

(86) PCT No.: PCT/US2019/036407
§ 371 (c)(1),
(2) Date: Jan. 27, 2023

(87) PCT Pub. No.: WO2019/241163
PCT Pub. Date: Dec. 19, 2019

(65) Prior Publication Data
US 2023/0293390 A1 Sep. 21, 2023

Related U.S. Application Data

(60) Provisional application No. 62/683,470, filed on Jun. 11, 2018.

(51) Int. Cl.
*B29C 45/04* (2006.01)
*A61J 3/00* (2006.01)
(Continued)

(52) U.S. Cl.
CPC ............ *A61J 3/005* (2013.01); *A61J 3/10* (2013.01); *A61K 9/2893* (2013.01);
(Continued)

(58) Field of Classification Search
CPC .................................................... B29C 45/04
See application file for complete search history.

(56) References Cited

U.S. PATENT DOCUMENTS 4,444,711 A * 4/1984 Schad ................ B29C 45/2626
264/243
5,817,345 A * 10/1998 Koch .................... B29C 49/063
425/572
(Continued)

FOREIGN PATENT DOCUMENTS

BR    PI 0 517 629 A    10/2008
DE    10 2010 052208 A1    5/2012
(Continued)

OTHER PUBLICATIONS

European Search Report dated May 6, 2022, issued in European Appln. 21183723.2.
(Continued)

*Primary Examiner* — Cachet I Proctor
(74) *Attorney, Agent, or Firm* — Arnold & Porter Kaye Scholer LLP

(57) ABSTRACT

Disclosed herein are new injection molding-coating devices for the continuous manufacturing of coated pharmaceutical tablets comprising one or more active pharmaceutical ingredients and one or more excipients. Also disclosed herein are methods for the continuous manufacture of coated pharma-
(Continued)

ceutical tablets using these new devices for the purpose application in the pharmaceutical and drug manufacturing industries.

21 Claims, 30 Drawing Sheets

(51) Int. Cl.
| | |
|---|---|
| A61J 3/10 | (2006.01) |
| A61K 9/28 | (2006.01) |
| B29C 48/25 | (2019.01) |
| B29C 48/40 | (2019.01) |
| B29C 48/68 | (2019.01) |
| B29C 48/80 | (2019.01) |
| B29C 48/92 | (2019.01) |
| B30B 11/24 | (2006.01) |
| B30B 11/26 | (2006.01) |
| B30B 11/34 | (2006.01) |
| B30B 15/26 | (2006.01) |
| B30B 15/34 | (2006.01) |

(52) U.S. Cl.
CPC .... *B29C 48/2565* (2019.02); *B29C 48/25684* (2019.02); *B29C 48/40* (2019.02); *B29C 48/6801* (2019.02); *B29C 48/6803* (2019.02); *B29C 48/83* (2019.02); *B29C 48/92* (2019.02); *B30B 11/24* (2013.01); *B30B 11/26* (2013.01); *B30B 11/34* (2013.01); *B30B 15/26* (2013.01); *B30B 15/34* (2013.01); *B29C 2948/92209* (2019.02); *B29C 2948/92704* (2019.02); *B29C 2948/92895* (2019.02)

(56) References Cited

U.S. PATENT DOCUMENTS

| | | | |
|---|---|---|---|
| 6,982,094 B2 * | 1/2006 | Sowden | A23G 3/368 425/576 |
| 8,123,509 B2 * | 2/2012 | Clarke | A61K 9/2072 425/129.1 |
| 10,945,923 B2 | 3/2021 | De Margerie et al. | |
| 2001/0038163 A1 | 11/2001 | Matysek | |
| 2003/0086973 A1 | 5/2003 | Sowden et al. | |
| 2003/0124183 A1 | 7/2003 | Sowden | |
| 2008/0075766 A1 * | 3/2008 | Li | A61K 9/2893 424/452 |
| 2008/0290561 A1 | 11/2008 | Gaiser | |
| 2012/0038076 A1 | 2/2012 | Lausenhammer et al. | |
| 2013/0174997 A1 | 7/2013 | Quach et al. | |
| 2017/0354609 A1 * | 12/2017 | Puri | B29C 45/14819 |
| 2020/0086540 A1 * | 3/2020 | Goodwin | B29C 45/1816 |

FOREIGN PATENT DOCUMENTS

| | | | |
|---|---|---|---|
| EP | 0794045 A1 * | 9/1997 | |
| EP | 0794045 B1 | 6/2002 | |
| EP | 3 313 353 A1 | 5/2018 | |
| WO | WO 2013/030226 A2 | 3/2013 | |

OTHER PUBLICATIONS

Supplementary European Search Report dated Feb. 4, 2022, issued in European Appln. 19819013.4.

International Search Report dated Oct. 28, 2019 in International Appln. No. PCT/US2019/036407.

* cited by examiner

SYSTEM FOR MOLDING AND COATING OF PHARMACEUTICAL TABLETS

REFERENCE TO RELATED APPLICATION

This application is a U.S. National Stage filing under 35 U.S.C. § 371 of International Application No. PCT/US2019/036407 filed Jun. 10, 2019, which claims the benefit of U.S. Provisional Application No. 62/683,470, filed Jun. 11, 2018, which are herein incorporated by reference in their entireties.

FIELD OF THE INVENTION

The present disclosure relates to devices and methods for the continuous manufacture of coated pharmaceutical tablets comprising one or more active pharmaceutical ingredients and one or more excipients.

BACKGROUND OF THE INVENTION

Continuous manufacturing of solid dosage forms (e.g. tablets) is an emerging production method for pharmaceuticals. More than $1 billion USD has been invested in continuous manufacturing initiatives by major pharmaceutical companies over the past 10 years. These continuous manufacturing initiatives have been applied to many aspects of the drug development process, spanning from pre-clinical chemical development to the large scale production and formulation of final drug products.

Recently, the injection molding process has also found application in the pharmaceutical and drug manufacturing industry. Injection molding has been used extensively in the plastics industry, but may be adapted to fit other applications. Injection molding has been used to produce drug products where active pharmaceutical ingredients (APIs) are directly incorporated into shaped plastic parts to create drug-eluting medical devices.

More recently, injection molding has also been used to prepare solid dosage tablets. The production of API-containing pharmaceutical tablets by the injection molding process offers a producer the flexibility of specific shaped-part preparation capability, the ability to eliminate the production and testing of discrete batches of an API, as well as the potential for life-cycle management of an API. However, the known methods for forming coated pharmaceutical tablets by injection molding operate by a discontinuous process. In order to improve the efficiency of this process, a need exists in the pharmaceutical industry for the identification of a suitable molding and coating platform which would allow pharmaceutical tablets to be produced by injection molding on a continuous basis.

SUMMARY OF THE INVENTION

In aspects according to the present disclosure, a machine is provided for producing coated pharmaceutical tablets by a continuous process. Such a machine comprises: (i) a mold unit (200) comprising a molding frame (207) comprising at least one core block (500) and rotatable to at least four positions, (ii) a coating delivery system (400A, 400B) comprising a first cavity block (600) and a third cavity block (800), a means to provide a heated coating material under pressure, and a mechanism for reversibly joining and placing the first cavity block (600) or third cavity block (800) in fluid communication with the at least one core block (500) forming a first temporary mold on the molding frame (207) at a first position; (iii) a core injection unit (300) comprising a piston barrel injection chamber (325) fitted with a retractable piston (321), a port, a second cavity block (700), and a mechanism for reversibly joining and placing the second cavity block (700) in fluid communication with the at least one core block (500) forming a second temporary mold on the molding frame (207) at a second position, wherein the retractable piston (321) is configured to retract to expand the piston barrel injection chamber (325) and extend to eject material present in the piston barrel injection chamber (325) into the second temporary mold; and (iv) a discharge area located at, or in proximity to, a fourth position of the molding frame (207).

In other aspects according to the present disclosure, a method is provided for producing coated pharmaceutical tablets by an integrated, continuous process. Such a method comprises: (i) providing a machine according to claim 1 comprising a mold unit (200) comprising a molding frame (207) comprising at least one core block (500) and rotatable to at least four positions, and a continuous source of a hot melt comprising an active pharmaceutical ingredient and one or more excipients; (ii) forming a half coat within the at least one core block (500) by (a) joining and placing a first cavity block (600) in fluid communication with a first coating delivery system (400A) and the at least one core block (500) to form a first temporary mold in a first position; (b) injecting a first coating material into the first temporary mold to form a half coat; (c) separating the first temporary mold to provide at least one core block (500) comprising a half coat; and (d) rotating the molding frame (207) to a second position; (ii) forming half coated pharmaceutical pre-tablets by (a) joining and placing a second cavity block (700) in fluid communication with a piston barrel injection chamber (325) fitted with a retractable piston (321) and a port to introduce the hot melt into the piston barrel injection chamber (325) and the at least one core block (500) comprising a half coat to form a second temporary mold; (b) injecting the hot melt into the second temporary mold by extending the retractable piston (321) into the piston barrel injection chamber (325) to form half coated pharmaceutical pre-tablets; (c) separating the second temporary mold to provide at least one core block (500) comprising half coated pharmaceutical pre-tablets while simultaneously initiating retraction of the retractable piston (321) to expand the piston barrel injection chamber (325) and accommodate a flow of the hot melt from the continuous source; and (d) rotating the molding frame (207) to a third position; (iii) forming fully coated pharmaceutical tablets by (a) joining and placing a third cavity block (800) in fluid communication with a second coating system (400B) and the at least one core block (500) comprising half coated pharmaceutical pre-tablets to form a third temporary mold; (b) injecting a second coating material into the third temporary mold to form fully coated pharmaceutical tablets; (c) separating the third temporary mold to provide at least one core block (500) comprising fully coated pharmaceutical tablets; and (d) rotating the molding frame (207) to a fourth position; and (iv) ejecting the fully coated pharmaceutical tablets from the at least one core block comprising fully coated pharmaceutical tablets and then rotating the molding frame (207) to a different position.

In further aspects according to the present disclosure, the method comprises a molding frame (207) comprising additional core blocks, wherein each additional core block (500) is located at a different position of the molding frame (207). In even further aspects according to the present disclosure, steps (i) to (iv) described above are performed simultaneously where the forming steps (i), (ii), and (iii), and the ejecting steps (iv) are determined by the positions of the additional core blocks (500) on the molding frame (207).

BRIEF DESCRIPTION OF THE DRAWINGS

The present disclosure is disclosed with reference to the accompanying drawings, wherein:

FIG. 9A shows a mold unit (200) at a first position disengaged from a first coating delivery system (400A). FIG. 9B shows a mold unit (200) engaged with a first coating delivery system (400A) at a first position, where a first coating material may be injected into the core block (500) attached to the molding frame (207). FIG. 9C shows disengagement of the mold unit (200) at a first position from a first coating delivery system (400A), and partial rotation of the molding frame (207) toward a second position. FIG. 9D shows a mold unit (200) at a second position disengaged from a core injector unit (300). FIG. 9E shows a mold unit (200) engaged with core injector unit (300) at a second position, where a hot melt may be injected into the core block (500) attached to the molding frame (207). FIG. 9F shows disengagement of the mold unit (200) at a second position from a core injector unit (300), and partial rotation of the molding frame (207) toward a third position. FIG. 9G shows a mold unit (200) at a third position disengaged from a second coating delivery system (400B). FIG. 9H shows a mold unit (200) engaged with a second coating delivery system (400B) at a third position, where the second coating material is injected into the core block (500) attached to the molding frame (207). FIG. 9I shows disengagement of the mold unit (200) at a third position from a second coating delivery system (400B), and partial rotation of the molding frame (207) toward a fourth position. FIG. 9J shows the mold unit (200) at a fourth position for the ejection of coated pharmaceutical tablets from the mold unit (200).

Corresponding reference characters indicate corresponding parts throughout the several views. The examples set out herein illustrates multiple embodiments of the present disclosure but should not be construed as limiting the scope of the present disclosure in any manner.

DETAILED DESCRIPTION

Figure 1A:
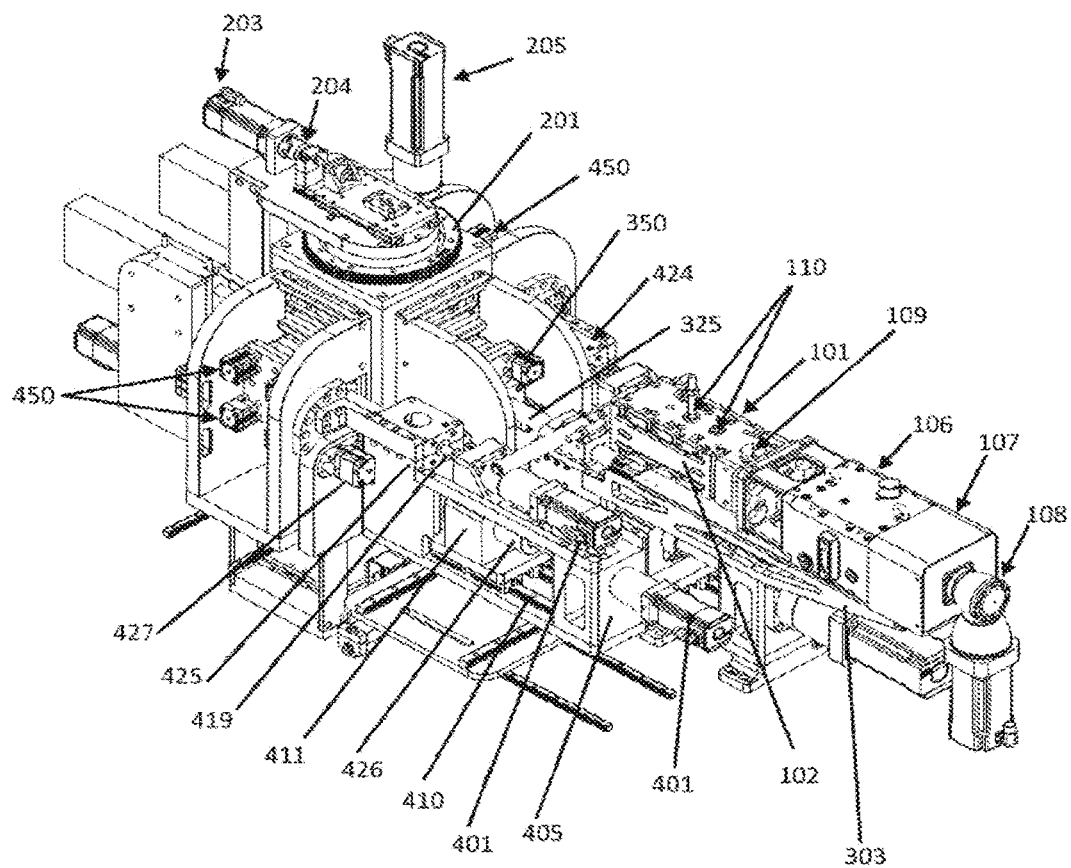
FIG. 1A is an isometric view of an exemplary machine for the molding and coating of pharmaceutical tablets with a hot melt extruder attached.

Unless defined otherwise herein, terms are to be understood according to conventional usage by those of ordinary skill in the relevant art. Where a term is provided in the singular, the inventors also contemplate aspects of the disclosure described by the plural of that term. Where there are discrepancies in terms and definitions used in references that are incorporated by reference, the terms used in this application shall have the definitions given herein. Other technical terms used have their ordinary meaning in the art in which they are used, as exemplified by various art-specific dictionaries, for example, "The American Heritage® Science Dictionary" (Editors of the American Heritage Dictionaries, 2011, Houghton Mifflin Harcourt, Boston and New York), or the "McGraw-Hill Dictionary of Scientific and Technical Terms" (6th edition, 2002, McGraw-Hill, New York).

All publications, patents, and patent applications mentioned in this disclosure are herein incorporated by reference to the same extent as if each individual publication, patent, or patent application was specifically and individually indicated to be incorporated by reference.

The term "and/or" when used in a list of two or more items, means that any one of the listed items can be employed by itself or in combination with any one or more of the listed items. For example, the expression "A and/or B" is intended to mean either or both of A and B, i.e., A alone, B alone, or A and B in combination. The expression "A, B and/or C" is intended to mean A alone, B alone, C alone, A and B in combination, A and C in combination, B and C in combination, or A, B, and C in combination.

As used herein, terms in the singular and the singular forms "a," "an," and "the," for example, include plural referents unless the content clearly dictates otherwise.

Where a range of values is provided, it is understood that each intervening value, between the upper and lower limit of that range and any other stated or intervening value in that stated range is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either both of those included limits are also included in the disclosure. Whenever the phrase "comprising" is used, variations such as "consisting essentially of" and "consisting of" are also contemplated.

As used herein, the term "machine" refers to a mechanical apparatus comprising one or more parts which function together in a coordinated manner to accomplish one or more tasks.

As used herein, the term "continuous process" refers to an automated process which is performed for an extended period of time. The extended period of time may be any time period, such as an hour, a day, a week, a month, or a year, but generally refers to a process intended to run for an indefinite period of time without interruption.

As used herein, the term "pharmaceutical tablet" refers to a molded or compressed solid unit dosage form of a medicament comprising a drug or a mixture of drugs, with or without excipients. As used herein, the term "excipient" refers to an inactive substance which is formulated along with the active ingredient of a medicament. The incorporation of one or more excipients into a pharmaceutical tablet can serve a number of purposes, including facilitating the manufacturing process, increasing the overall mass of the tablet by acting as a "bulking agent" or "filler," improving the long-term stability of the active ingredient in the tablet, controlling the release of the active ingredient after administration, and enhancing the efficacy of the active ingredient after administration.

As used herein, the term "active pharmaceutical ingredient" (API) refers to the biologically active component of a drug. An API may also be a mixture of two or more biologically active components of a drug. In an aspect, an API is thermally stable (i.e., stable to elevated temperatures).

As used herein, the term "hot melt" refers to one or more compounds that are liquefied by the application of heat and, optionally, pressure.

As used herein, the term "heat melt extrusion" (HME) refers to a continuous melt processing technology used for the liquefaction and mixing of polymers and other compounds by the application of heat and shear motion of a single or twin rotating extrusion screw.

As used herein, the term "coating material" refers to the layer of material covering the exterior of a pharmaceutical tablet. Without being limited by theory, the coating material may add physical and chemical protection to the tablet (e.g., thermal stability, moisture protection), mask undesirable tastes, colors, and/or odors, protect the drug in the stomach, and control and sustain the release of the drug in the body.

As used herein, the term "coating" refers to the application of a coating material to a surface.

As used herein, the term "coated pharmaceutical tablet" refers to a pharmaceutical tablet, the exterior surface area of which is fully covered by one or more coating materials.

As used herein, the term "uncoated pharmaceutical tablet" refers to a pharmaceutical tablet with an exterior surface that does not comprise a coating material.

As used herein, the term "molding" refers to the shaping and hardening of a liquid material into a solid form of a particular shape.

As used herein, the term "in fluid communication" refers to a configuration of two areas or chambers which are interconnected to allow the travel of fluid or solid from one area or chamber to the other. As used herein, a mechanism for reversibly joining and placing two objects, such as two blocks, in fluid communication with one another is a clamp, screw, hook, tie, rail, or hydraulic press.

As used herein, the term "port" refers to an orifice through which a material may be introduced into an enclosed system (inlet port), transferred from one section of a system to another (transfer port), or expelled out of the enclosed system (outlet port). A port may also be an orifice through which a detector probe is inserted.

As used herein, the term "injection chamber" refers to a heated space or compartment fitted with two or more ports into which a fluid may enter through a first port and accumulate, from which a fluid may be ejected through a second port, typically by the action of a retractable piston. In an aspect, an injection chamber is a piston barrel.

As used herein, the term "retractable piston" refers to a solid rod or cylinder that fits into a hollow barrel which displaces or compresses fluid present in the larger cylinder as the retractable piston extends, and allows fluid to enter the larger cylinder as the retractable piston retracts. In an aspect, a retractable piston of the present disclosure is an auger flighting, i.e., a rotating helical screw blade.

As used herein, the term "volumetric flow rate" refers to the volume of fluid which passes per unit time. Volumetric flow rates may be expressed in milliliters per minute (ml/min).

As used herein, the term "dwell time" refers to the molding time, or the time during which the material is injected into the mold and held at an elevated temperature prior to cooling.

As used herein, two objects are referred to as "in proximity" if they are physically close or nearby to one another.

As used herein, the term "discharge area" refers to an area or container into which coated or uncoated pharmaceutical tablets are released from a core block for collection.

As used herein, the term "shot size" refers to amount of hot melt or heated coating material that is injected into a block of mold cavities in one injection cycle as measured by volume or length within a barrel. The choice of shot size will depend upon the sizes and number of cavities to be filled in a mold.

As used herein, the term "in-line detection" refers to the use of a probe or sensor to analyze or detect a property in a vessel or stream of flowing material by insertion of the probe or sensor into the vessel or stream. As used herein, the term "in-line detector port" refers to an orifice through which a detection probe or sensor may be inserted. As used herein, the term "in-line detection instrument" refers to any instrument which analyzes or detects a property in a vessel or stream of flowing material.

All parts shown in the Figures of the present disclosure are listed by name in Table 1.

TABLE 1

| Listing of mechanical parts | |
| --- | --- |
| Part number | Part name |
| 100 | hot melt extruder |
| 101 | extruder barrel |
| 102 | secondary cooling block |
| 103 | removable extrusion barrel liner |
| 104 | screw extruder (single or twin) |
| 105 | extruder intermediate plate |
| 106 | gearbox |
| 107 | mount |
| 108 | extruder motor/gearbox |
| 109 | primary material inlet |
| 110 | secondary inlet port |
| 111 | port insert |
| 112 | material inlet |
| 113 | die exit |
| 114 | melt pressure probe |
| 115 | melt temperature probe |
| 116 | transfer manifold |
| 117, 118 | process analytical technology (PAT) machine |
| 200 | mold unit |
| 201 | ring gear |
| 202 | molding platform support |
| 203 | ejection motor |
| 204 | coupler |
| 205 | ring gear motor |
| 206 | molding platform support arm |
| 207 | molding frame |
| 327, 410 | rail tracks |
| 300 | core injection unit |
| 301, 302 | core motor/gearbox |
| 303 | tie bar |
| 304, 312, 414 | gearbox hub |
| 305, 311, 402 | coupler |
| 306, 314, 404 | bearing |
| 307, 405 | rail base backplate |
| 308, 406 | thrust bearing housing |
| 309, 318, 407 | thrust bearing |
| 310 | 15 mm spacer |
| 313, 320, 403, 418 | split collar |
| 315, 413 | housing |
| 316 | housing plate |
| 319, 417 | intermediate shaft |

TABLE 1-continued

| Listing of mechanical parts | |
| --- | --- |
| Part number | Part name |
| 321, 419 | retractable piston |
| 322 | insulator board |
| 323 | feed clock brace |
| 324, 411 | sleeve |
| 325 | piston barrel injection chamber |
| 326 | intermediate barrel |
| 327, 423 | barrel tip |
| 328, 426 | ball screw |
| 350, 450 | valve gate pneumatic cylinder |
| 351 | core clamp |
| 352, 421 | screw tip |
| 353 | feed block |
| 400 | coating delivery system |
| 401 | coating motor/gearbox |
| 408 | feed block support |
| 409 | plate |
| 412 | load cell housing/thrust bearing housing |
| 415 | load cell |
| 416 | thrust bearing/custom housing washer |
| 420 | check ring |
| 422 | piston barrel injection chamber |
| 424 | upper feed block |
| 425 | lower feed block |
| 427 | coating clamp pneumatic cylinder |
| 451 | coating clamp |
| 500 | core block |
| 501 | core mold plate |
| 502, 702 | well |
| 503, 604, 703 | mounting bolt location |
| 504, 603, 704 | water port |
| 505 | threaded hole |
| 507, 606, 706 | alignment profile |
| 510, 610, 710 | outer frame |
| 520, 620, 720 | removable inner plate |
| 550 | ejector spring |
| 551 | ejector plate |
| 552 | pin retainer plate |
| 553 | retractable ejection pins |
| 554 | tablet discharge area |
| 600, 700, 800 | cavity block |
| 601 | coating mold plate |
| 602 | protrusion |
| 605, 705 | dowel knockout hole |
| 607 | valve gate |
| 608, 751 | secondary material path |
| 609, 752 | primary material path |
| 650, 750 | upper manifold |
| 653, 753 | transfer tips |
| 654, 754 | leader pin |
| 655, 755 | pin retainer plate |
| 656, 756 | valve gate pin plate |
| 657, 757 | leader pin bushing |
| 658 | hard stop |
| 659, 759 | heater plate |
| 701 | cavity mold plate |
| 760 | valve pin |
| 761 | lower manifold |

Figure 1B:
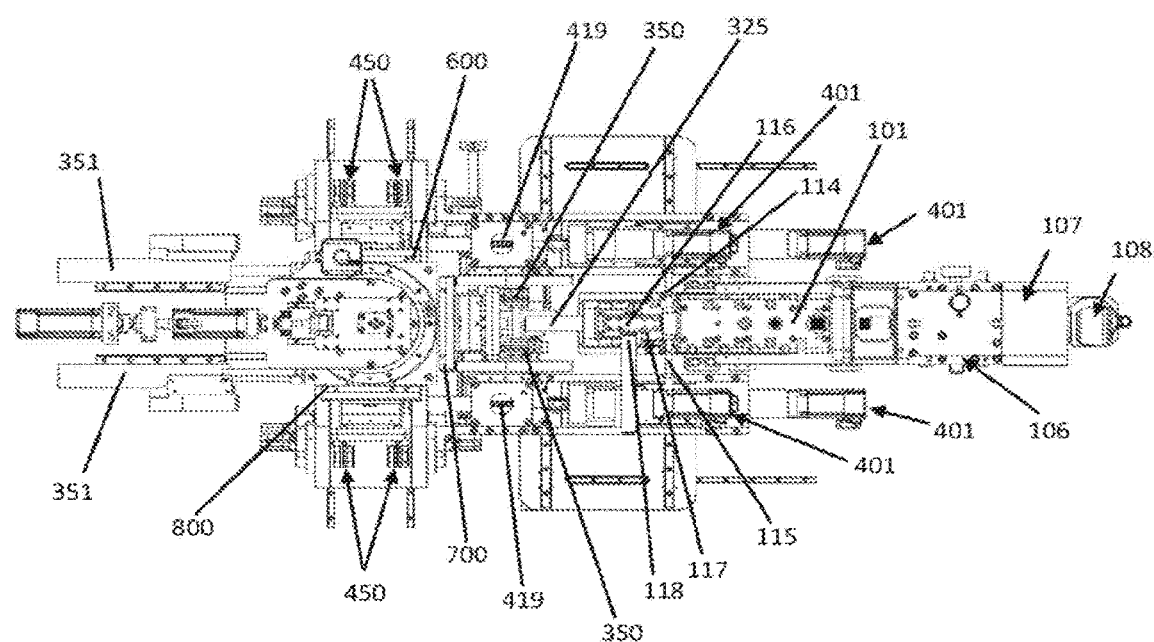
FIG. 1B is a top view of an exemplary machine for the molding and coating of pharmaceutical tablets with a hot melt extruder attached.
Figure 1C:
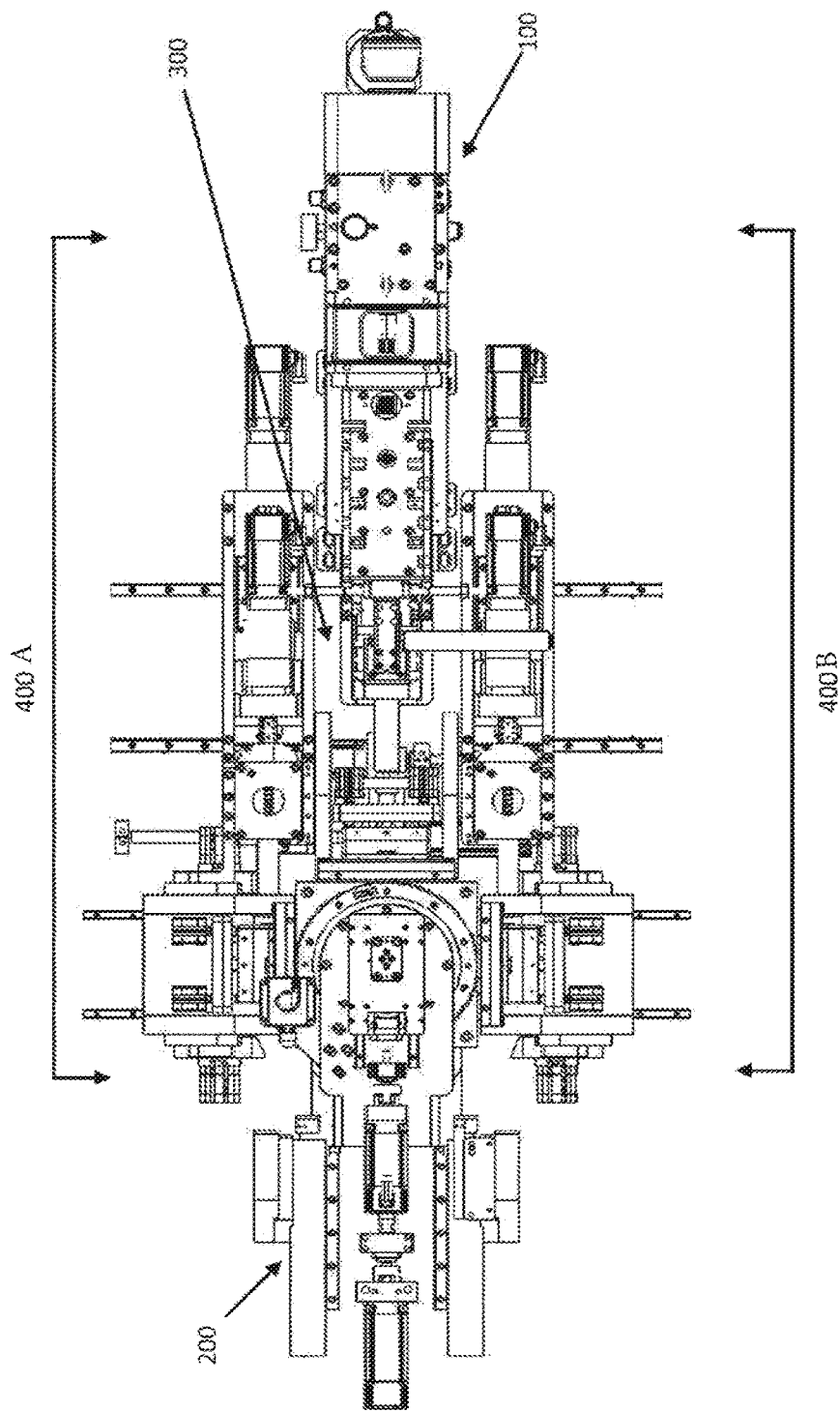
FIG. 1C is a top view of an exemplary machine for the molding and coating of pharmaceutical tablets with a hot melt extruder attached showing the main components, a hot melt extruder (100), a mold unit (200), a core injector unit (300), and two coating delivery systems (400A and 400B).
Figure 2A:
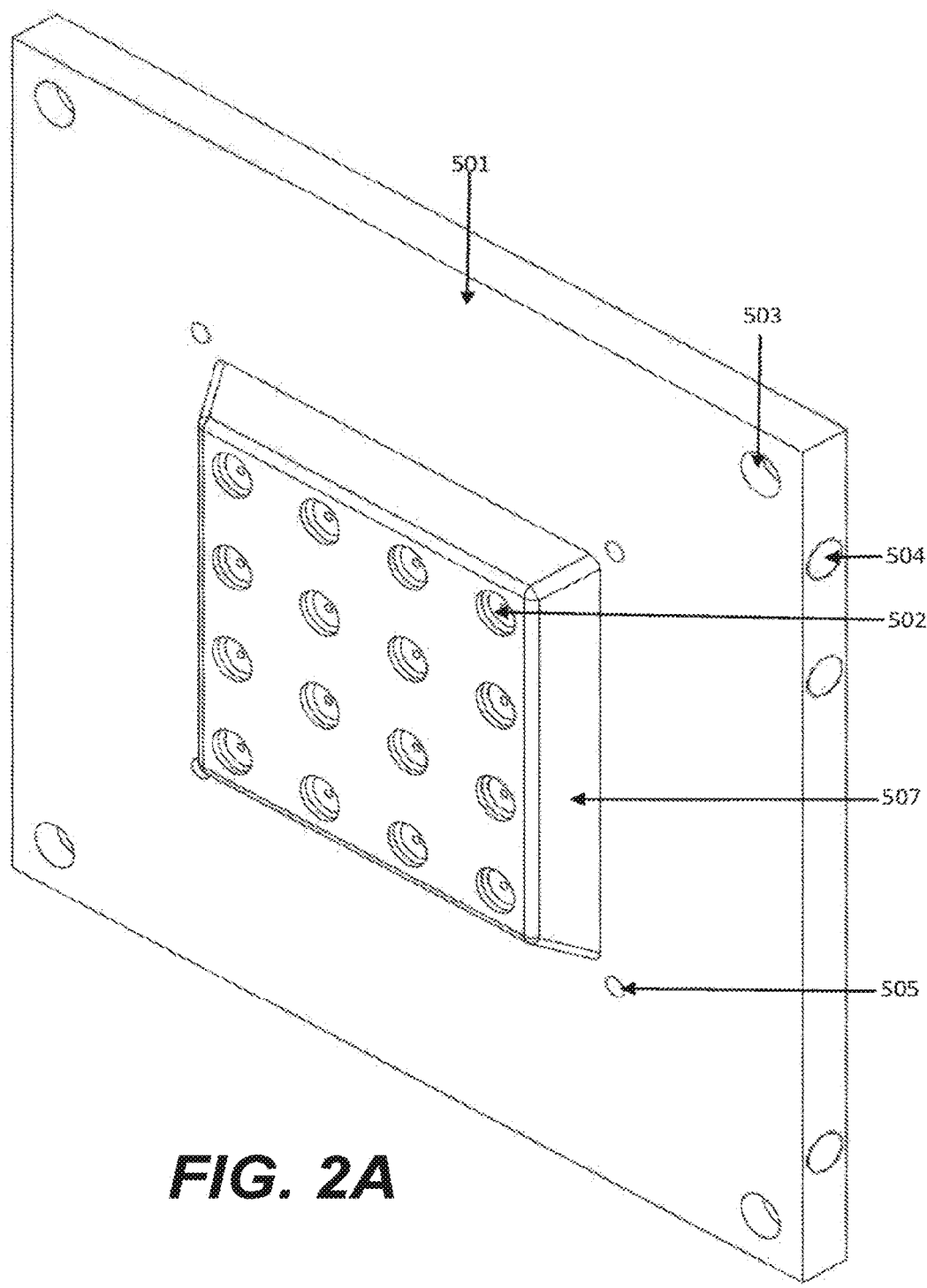
FIG. 2A is an isometric view of an exemplary core block (500).
Figure 2B:
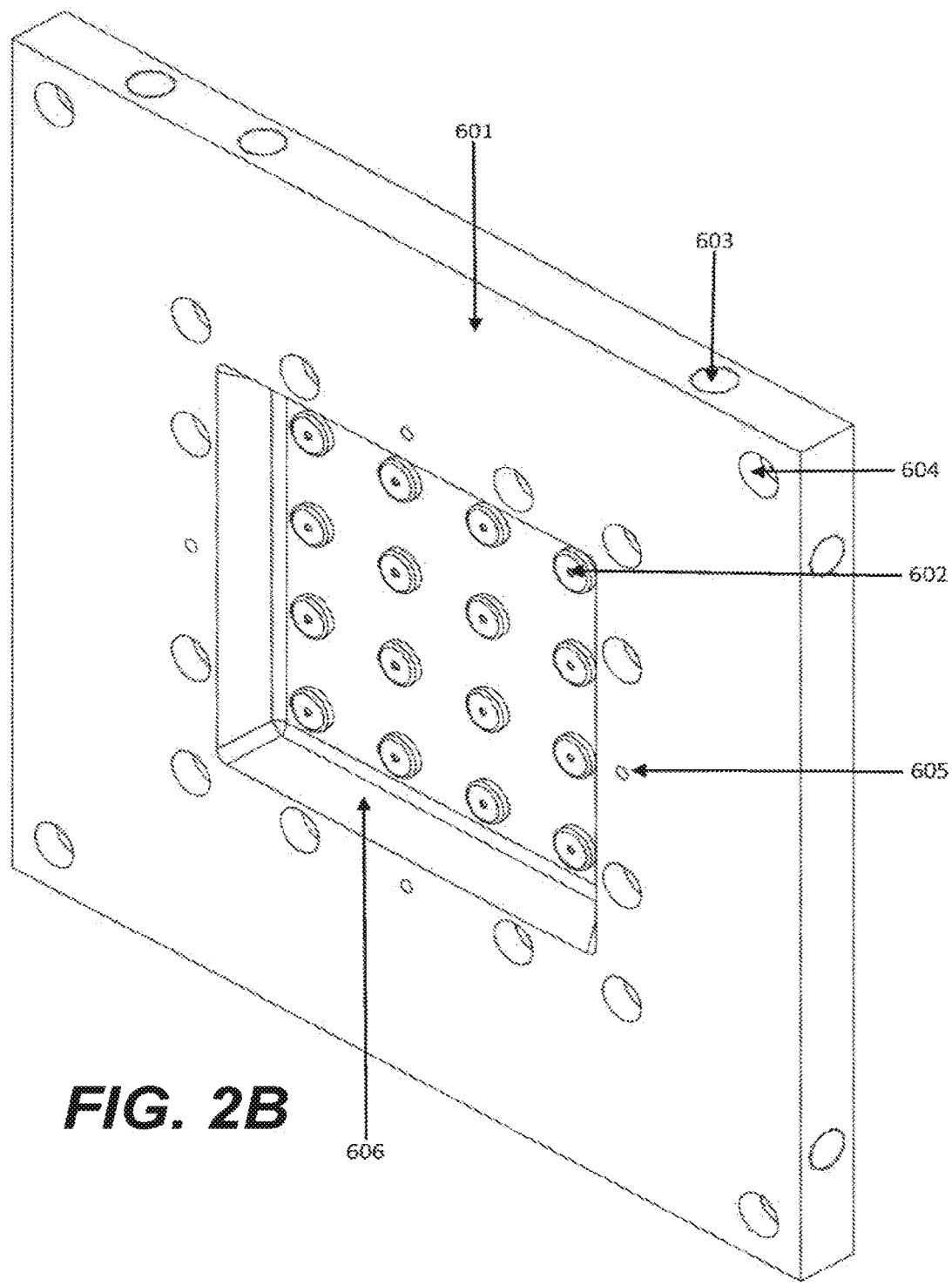
FIG. 2B is an isometric view of an exemplary first cavity block (600).
Figure 2C:
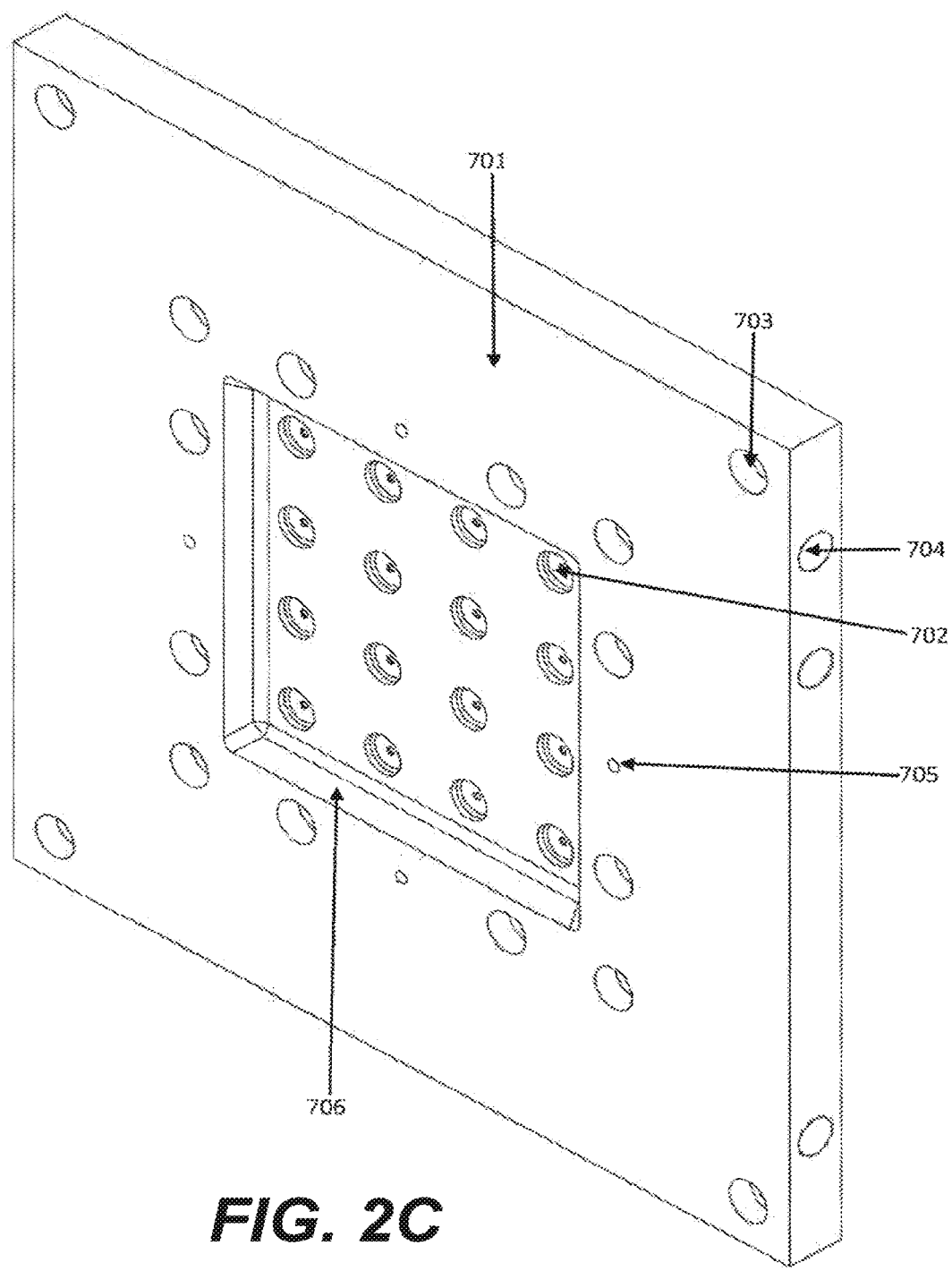
FIG. 2C is an isometric view of an exemplary second or third cavity block (800).
Figure 2D:
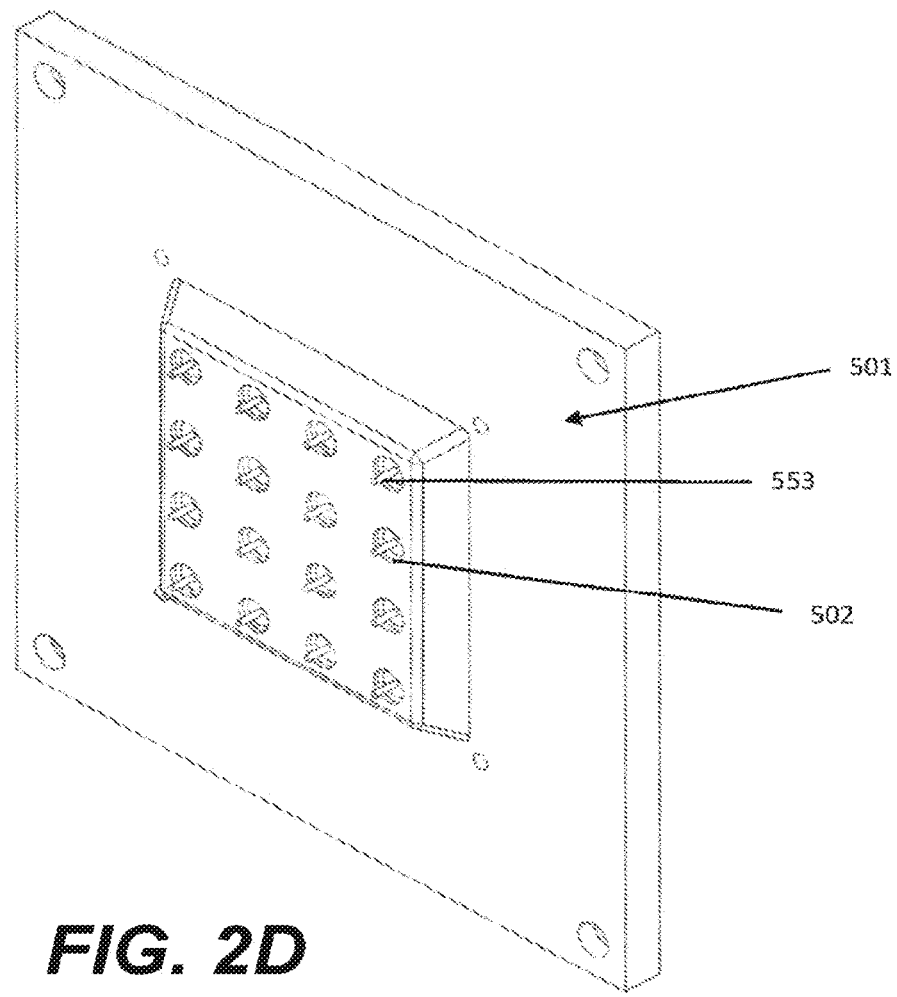
FIG. 2D is an isometric view of an exemplary core block (500) with a set of retractable ejection pins (553) extended from wells (502) for the ejection of coated tablets from the wells (502).

The present disclosure comprises a system, shown in FIG. 1A-1C, for the continuous molding and coating of pharmaceutical tablets comprising: a mold unit, a core injection unit, and one or more coating delivery systems. In an aspect, a hot melt extruder is joined to, and in fluid communication with, a core injection unit for delivering an API and one or more excipients as a hot melt to the core injection unit.

Referring to FIGS. 2A-2D, a mold of the present disclosure is formed when a core block (500) and a corresponding cavity block (600, 700, 800) are clamped or joined together to form hollow cavities (e.g., voids) into which a hot melt and optionally one or more coating materials is injected via a channel (e.g., sprue) in the cavity block to form tablets.

The final shapes and dimensions of the solidified tablets correspond to the shapes of the mold cavities. A mold where a core block and a cavity block are physically clamped or joined together for a finite period of time and then are physically separated from each other at a later time is referred to as a "temporary mold."

A mold or temporary mold may be cooled for a period of time in order to facilitate solidification and retention upon separation of the two blocks comprising the mold or temporary mold. In an aspect, one or more external cooling devices may be used in order to cool a mold or temporary mold. In an aspect, one or more internal cooling devices (e.g., Peltier thermoelectric cooling device) may be used in order to cool a mold or temporary mold. The temperature may be chosen to affect the molding and/or coating processes and improve the shape, coating, and composition of the molded tablets. Mold or temporary mold temperatures may range from about −20° C. to about 23° C. more preferably between about −10° C. and about 15° C. A mold or temporary mold may also be heated for a period of time in order to control or reverse the solidification process.

The molding process may also be controlled and optimized by the proper choice of an injection flow rate into the mold, as well as appropriate dwell times and cooling times of the injected material within the mold.

A cavity block (600, 700, 800) of the present disclosure is a metal block that is the A-side or outer surface of a mold. A cavity block (600, 700, 800) comprises a channel for receiving injected material, and runner or series of channels which connects the sprue to the cavities into which the injected material is delivered. A cavity block (600, 700, 800) of the present disclosure may further comprise additional holes and channels for controlling the temperature of the block, and may be cooled by one or more external temperature control units. A cavity block (600) which comprises one or more protrusions (602) extending out from the surface of the block is referred to herein as a "first cavity block." A cavity block (700, 800) of the present disclosure which comprises one or more wells or depressions (702) into the surface of the block is referred to herein as a "second cavity block (700)" or a "third cavity block (800), respectively." These protrusions (602) or wells (702) of a cavity block (600, 700, 800) form cavities when coupled with the corresponding wells (502) of a core block (500). A cavity block (600, 700, 800) may comprise protrusions (602) or wells (702) of any number, size, and shape.

A core block (500) of the present disclosure is a metal block that is the B-side or inner surface of a mold which retains the injected material. A core block (500) comprises one or more wells or depressions (502) in the surface of the block for forming cavities in a mold. A core block (500) may comprise wells (502) of any number, size, and shape. A core block (500) may further comprise additional holes and channels for controlling the temperature of the block, and may be cooled by an external temperature control unit. As used herein, a core block (500) may further comprise a means for retaining injected material, where the retaining of injected material is accomplished by vacuum, by adhesion, by mass distribution, by physical clamping, or by two or more of these methods used in combination. As used herein, a core block (500) may further comprise a set of retractable ejection pins (553), optionally connected to an ejector plate (551), for ejecting completed pharmaceutical tablets from the core block after separation of the core and cavity blocks of the mold.

Figure 3:
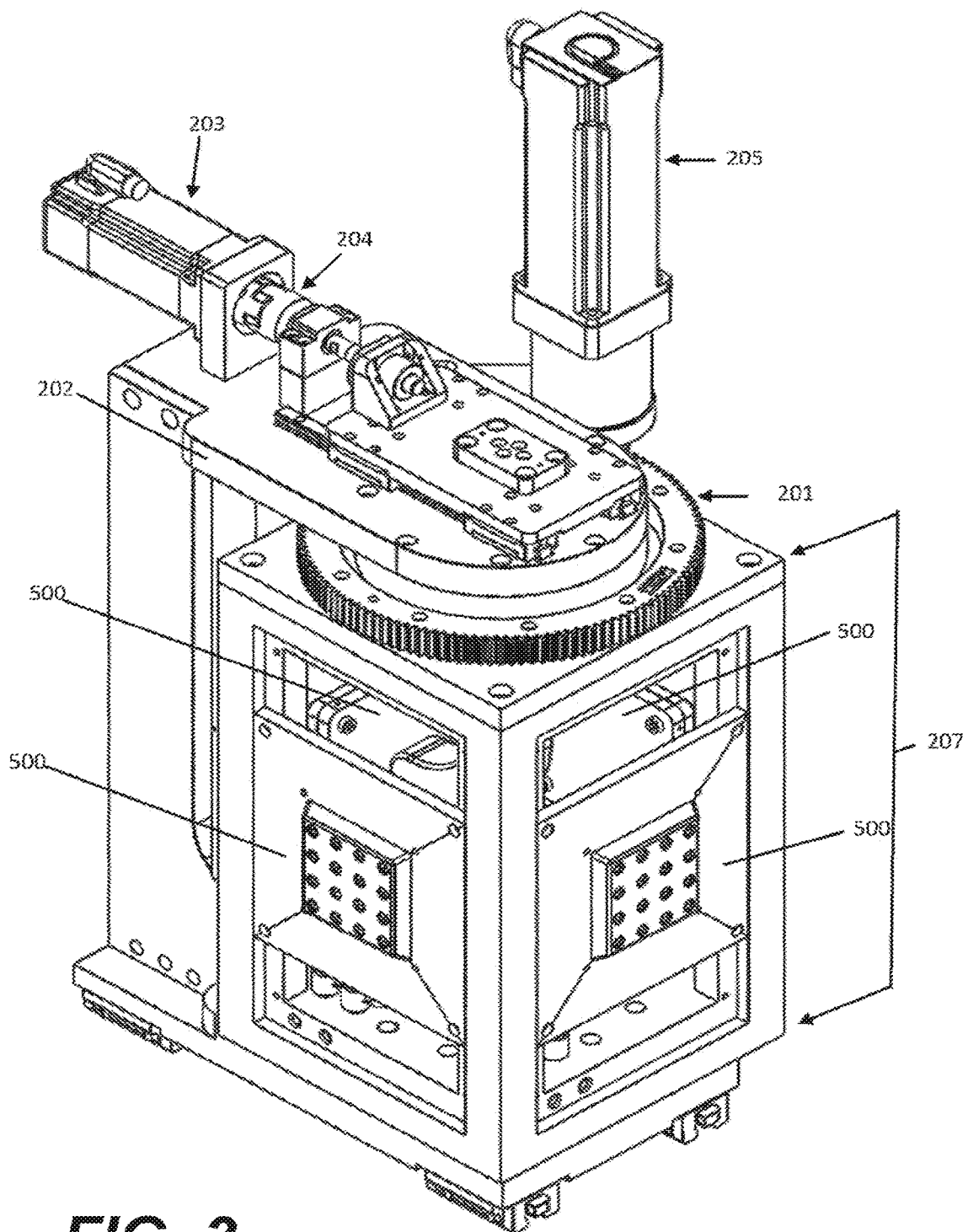
FIG. 3 is an isometric view of an exemplary mold unit (200).

Referring to FIG. 3, a mold unit (200) of the present disclosure refers to a mechanical apparatus comprising a molding frame (207) which is a structure rotatable to one or more positions and to which one or more core blocks (500) may be attached. The molding frame (207) includes a combination of a ring gear motor (205) and a ring gear (201), which serve to rotate the molding frame (207). The molding frame (207) may rotate in any direction, including lateral rotation, vertical rotation, or angular rotation. In addition to rotation, the molding frame (207) may be capable of lateral, horizontal, angled, or circular motion toward or away from a core injection unit (300) and one or more coating injection. The mold unit (200) further comprises a stationary support arm (206).

In an alternative aspect of the present disclosure, the molding frame (207) is non-rotating. In another alternative aspect of the present disclosure, the molding frame (207) is stationary.

In an aspect, a mold unit (200) of the present disclosure further comprises an ejection motor (203) for retracting and extending retractable ejection pins (553) in a core block (500) in order to release coated tablets retained on the core block (500). See FIG. 12. In an aspect, a mold unit (200) of the present disclosure rotates in a clockwise direction. In an aspect, a mold unit (200) of the present disclosure rotates in a counterclockwise direction.

The one or more core blocks (500) attached to the molding frame (207) at one or more positions is coupled and joined with one or more cavity blocks (600, 700, 800) to form molds, where the one or more cavity blocks (600, 700, 800) are attached to a core injection unit (300) and/or one or more coating delivery systems (400A, 400B). A person of skill in the art, in view of the present specification, would recognize the proper selection of core block (500) and cavity block (600, 700, 800) configurations may result in production of fully coated tablets, uncoated tablets, partially coated tablets, or multiple coated tablets.

Figure 4:
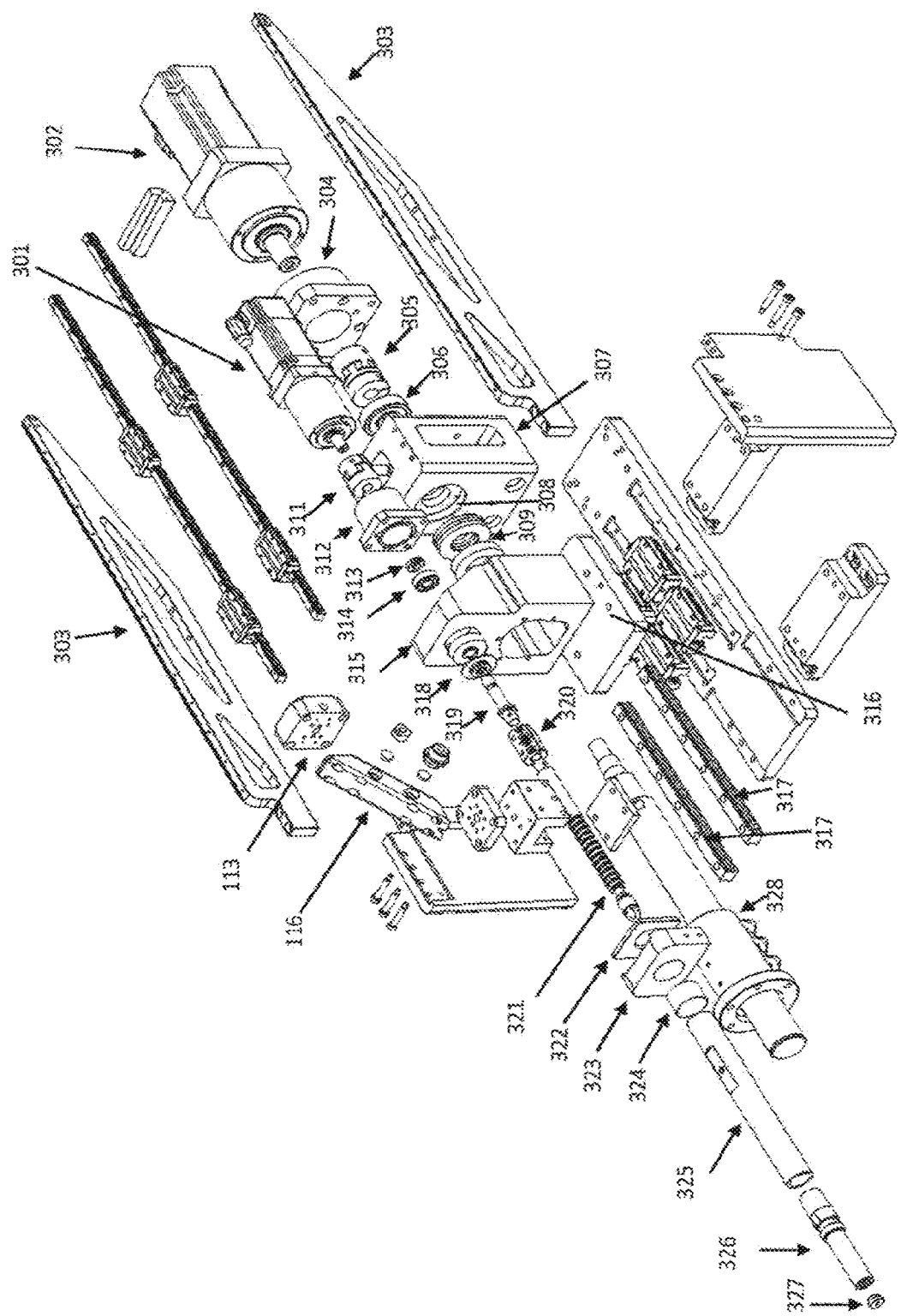
FIG. 4 is an isometric, exploded view of an exemplary core injector unit (300).

Referring to FIG. 4, an exemplary core injection unit (300) of the present disclosure is a mechanical apparatus for injecting a hot melt into a mold. A core injection unit (300) comprises a port for the introduction of the hot melt, a heated piston barrel injection chamber (325), a retractable piston (321), and an injection nozzle or tip (327). The speed, temperature, and pressure of the core injection unit may be optionally controlled by one or more external control units. The core injection unit (300) is capable of lateral motion toward or away from a mold unit (200) by means of sliding on a set of stationary rail tracks (317).

The temperature of the heated piston barrel injection chamber (325) may be chosen in view of the physical properties (e.g., thermal stability, viscosity) of the hot melt. The temperature may also be chosen to affect the molding process and improve the shape, coating, and composition of the molded tablets. In an aspect, heated piston barrel injection chamber (325) temperatures may range from about 23° C. to about 300° C. In another aspect, heated piston barrel injection chamber (325) temperatures may range from about 35° C. to about 150° C. One or more additional core injection unit (300) parameters such as the injection time, injection pressure, piston speed, hold time, and hold pressure may also be controlled independently or in conjunction.

Figure 5:
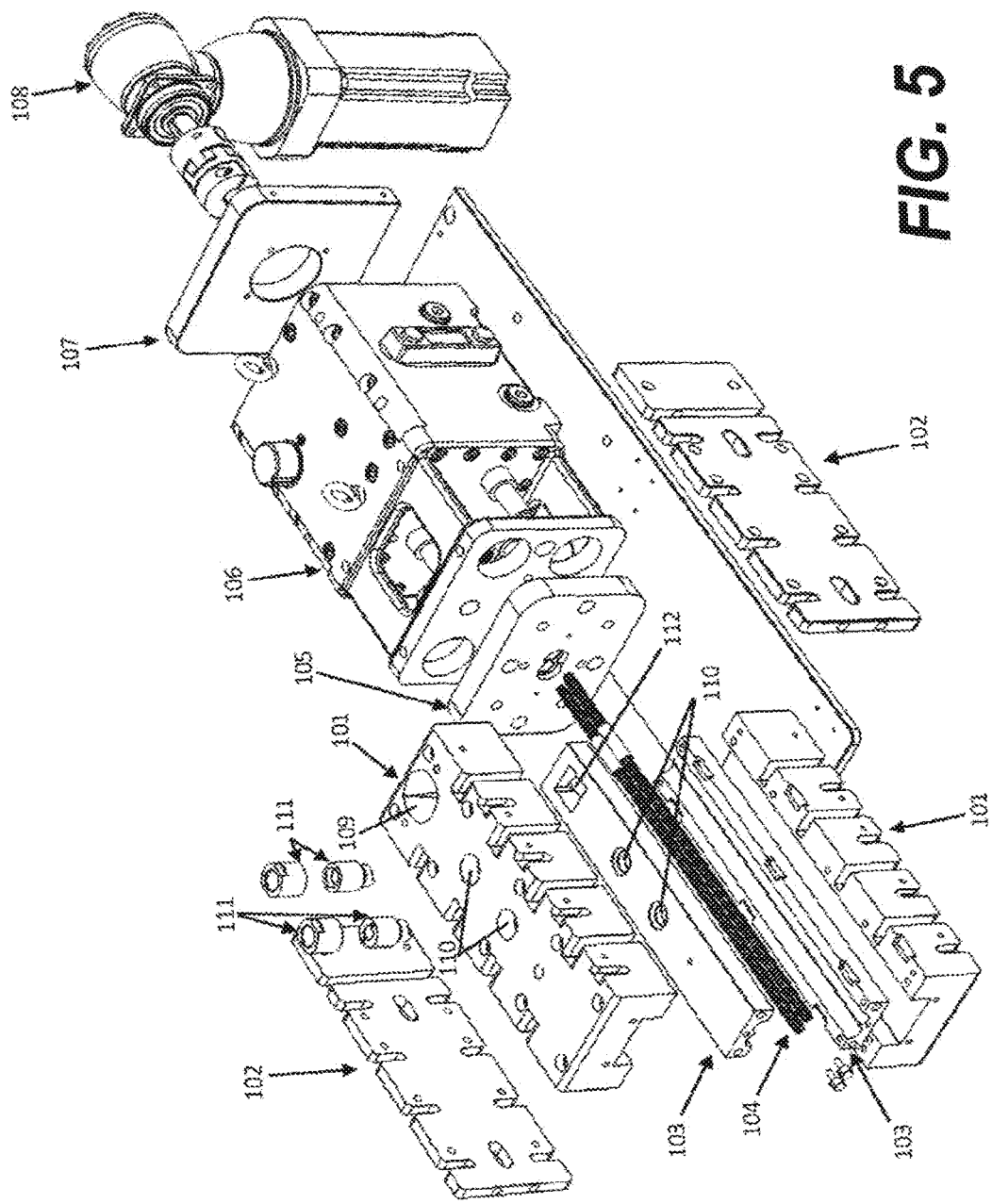
FIG. 5 is an isometric, exploded view of an exemplary hot melt extruder (100) having a removable extrusion barrel liner (103).

Referring to FIG. 5, a core injection unit (300) of the present disclosure may optionally be joined to and in direct fluid communication with a hot melt extruder (100) via a port. A hot melt extruder (100) of the present disclosure is a device for applying heat and pressure to melt and mix an active pharmaceutical ingredient and one or more excipients to produce a hot melt. A hot melt extruder (100) comprises a motion control unit (108) connected to an extruder barrel (101), where the interior of the extruder barrel (101) comprises a single or twin screw extruder (104) surrounded by a removable extrusion barrel liner (103). In an aspect, the single or twin screw extruder (104) rotation rate may be between 50 rpm and 250 rpm. In an aspect, the single or twin screw extruder (104) rotation rate may be between 100 rpm and 200 rpm. In an aspect, the single or twin screw extruder (104) rotation rate may be between 100 rpm and 160 rpm.

The extruder barrel (101) further comprises one or more secondary cooling blocks (102) for controlling the interior temperature within the extrusion barrel, a primary material inlet (109) for introduction of an API, and optionally one or more secondary inlet ports (110) for the addition of an API, the addition of one or more excipients, and/or the insertion of in-line detectors into the extrusion barrel. In an aspect, an API is introduced into the extruder barrel through a primary inlet port (109). In an aspect, an API is introduced into the extruder barrel through a primary inlet port (109) and a secondary inlet port (110). In an aspect, an API is introduced into the extruder barrel through a primary inlet port (109) and two secondary inlet ports (110). In an aspect, an API is introduced into the extruder barrel through a primary inlet port (109) and three secondary inlet ports (110). In an aspect, an API is introduced into the extruder barrel through a secondary inlet port (110). In an aspect, an API is introduced into the extruder barrel through two secondary inlet ports (110). In an aspect, an API is introduced into the extruder barrel through three secondary inlet ports (110).

In an aspect, an excipient is introduced into the extruder barrel through a primary inlet port (109). In an aspect, an excipient is introduced into the extruder barrel through a primary inlet port (109) and a secondary inlet port (110). In an aspect, an excipient is introduced into the extruder barrel through a primary inlet port (109) and two secondary inlet ports (110). In an aspect, an excipient is introduced into the extruder barrel through a primary inlet port (109) and three secondary inlet ports (110). In an aspect, an excipient is introduced into the extruder barrel through a secondary inlet port (110). In an aspect, an excipient is introduced into the extruder barrel through two secondary inlet ports (110). In an aspect, an excipient is introduced into the extruder barrel through three secondary inlet ports (110).

In an aspect, more than one excipients are introduced into the extruder barrel through a primary inlet port (109). In an aspect, more than one excipients are introduced into the extruder barrel through a primary inlet port (109) and a secondary inlet port (110). In an aspect, more than one excipients are introduced into the extruder barrel through a primary inlet port (109) and two secondary inlet ports (110). In an aspect, more than one excipients are introduced into the extruder barrel through a primary inlet port (109) and three secondary inlet ports (110). In an aspect, more than one excipients are introduced into the extruder barrel through a secondary inlet port (110). In an aspect, more than one excipients are introduced into the extruder barrel through two secondary inlet ports (110). In an aspect, more than one excipients are introduced into the extruder barrel through three secondary inlet ports (110).

The extruder barrel (101) may further comprise between one and five individual extruder barrel segments, where the temperature of each extruder barrel segment may be controlled independently by the use of an external heating system or an internal thermoelectric heating system (e.g., a Peltier heating system). The individual segments of an extruder barrel (101) may be of the same temperature or may comprise different temperatures, where the different temperatures may be held steady or varied throughout the process.

The temperatures of the primary material inlet (109), secondary inlet ports (110), and extruder barrel (101) may be chosen in view of the melting points, thermal stabilities, and viscosities of the specific API and one or more excipients comprising the hot melt. In an aspect, primary material inlet (109) temperatures may range from about −20° C. to about 300° C. In an aspect, primary material inlet (109) temperatures may range from about 0° C. and about 100° C. In an aspect, secondary inlet port (110) temperatures may range from about −20° C. to about 300° C. In an aspect, secondary inlet port (110) temperatures may range from about 0° C. and about 100° C. In an aspect, extruder barrel (101) temperatures may range from about 23° C. to about 300° C. In an aspect, extruder barrel (101) temperatures may range from about 35° C. and about 150° C.

The extruder barrel (101) may be held at a single temperature throughout the process, or the temperature may be varied.

The present disclosure provides for and includes other hot melt extrusion parameters such as the rate of API addition, the rate of excipient addition, the extruder barrel (101) pressure, and the screw extruder (104) speed.

In some aspects of the present disclosure, the hot melt extruder (100) is detached from the core injection unit (300). In further aspects of the present disclosure, the detached hot melt extruder (100) may be used separately to generate a continuous source of a hot melt. In even further aspects of the present disclosure, the detached hot melt extruder (100) generating a continuous source of a hot melt is independently joined and in fluid communication with an additional device or container for further processing and/or collection of the hot melt.

Figure 6:
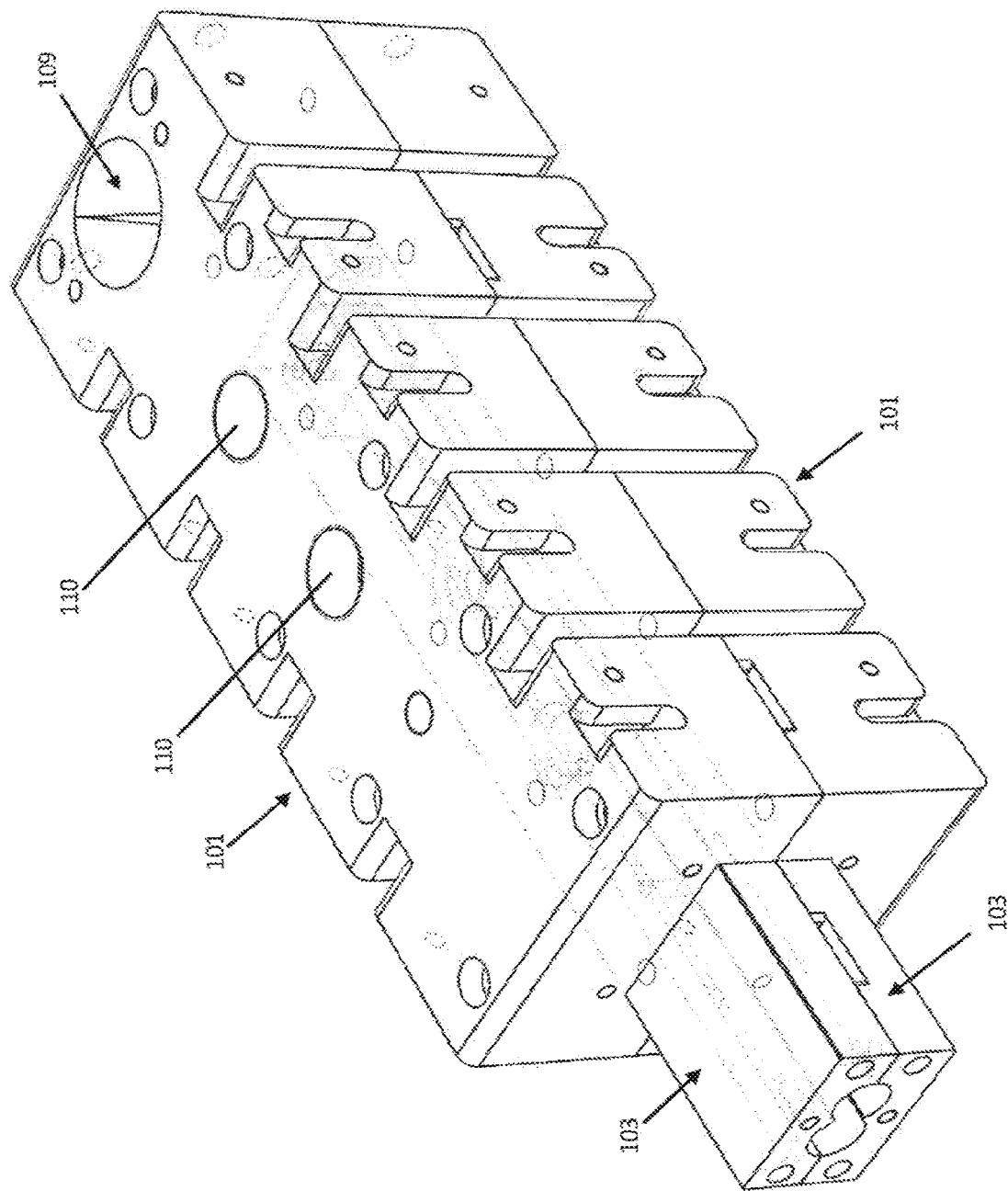
FIG. 6 is an isometric view of an exemplary hot melt extrusion barrel having a removable extrusion barrel liner (103) and secondary cooling blocks (102).

Referring to FIG. 6, the removable extrusion barrel liner (103) of the present disclosure further comprises openings aligned with the primary material inlet (109) and one or more secondary inlet ports (110).

In an aspect, a hot melt extruder (100) of the present disclosure further comprises a transfer manifold (116) which transfers a hot melt from the extruder (100) into a core injection unit (300). In an aspect of the present disclosure, transfer of the hot melt is be accomplished by gravity. In an aspect of the present disclosure, transfer of the hot melt is be accomplished by the application of pressure at the transfer manifold inlet. In an aspect of the present disclosure, transfer of the hot melt is be accomplished by a reduction of pressure at the transfer manifold outlet. In an aspect, the transfer manifold (116) of the present disclosure comprises a pressure sensor for the regulation of the internal pressure of hot melt in the system, which serves to regulate the action of the retractable piston (321) of an attached core injection unit (300). In an aspect of the present disclosure, the temperature and pressure of the transfer manifold (116) are controlled by one or more external or internal control units. In an aspect, a transfer manifold (116) of the present disclosure comprises one or more in-line detector ports. In a further aspect, the one or more in-line detection ports are connected to one or more in-line detection instruments.

Figure 7A:
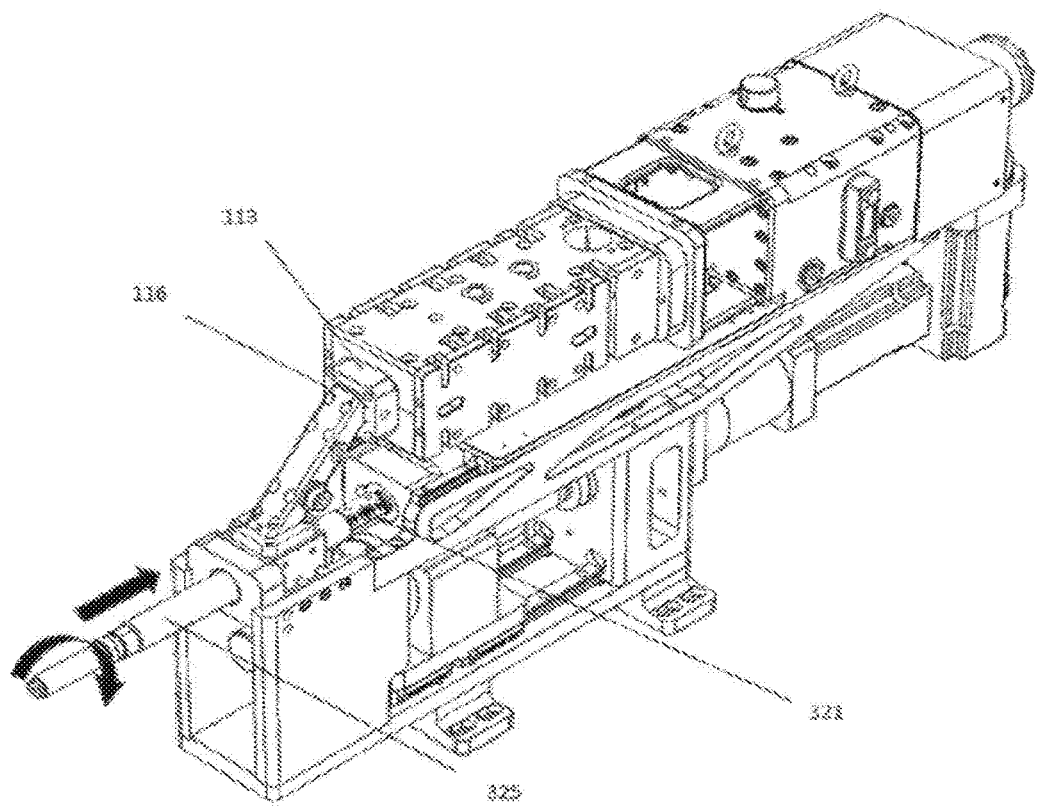
FIG. 7A is an isometric view of an exemplary hot melt extruder (100) attached to, and in fluid communication with, an exemplary coating injection unit (300) via a transfer manifold (116), where arrows show the synchronized backward lateral and rotational movement of the retractable piston (321) during retraction where the piston barrel injection chamber (325) is filled with hot melt and prior to injection into a mold. During an injection, the retractable piston (321) extends, where the directions of lateral and rotational motion are opposite to those shown.
Figure 7B:
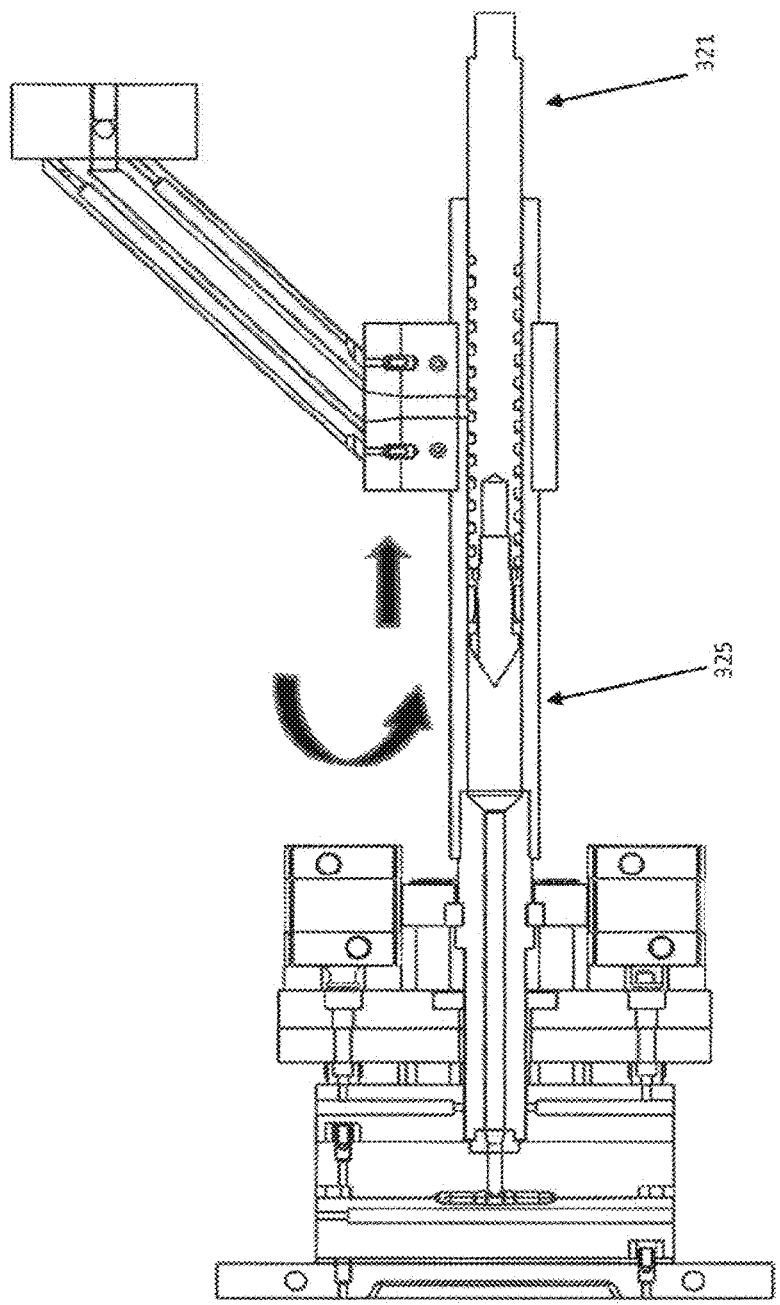
FIG. 7B is a top view of showing the synchronized backward lateral and rotational movement of the retractable piston (321) during retraction where the piston barrel injection chamber (325) is filled with hot melt and prior to injection into a mold. During an injection, the retractable piston (321) expands where the directions of lateral and rotational motion are opposite to those shown.

Referring to FIG. 7A-7B, an example of the delivery of a hot melt from an extruder (100) into a core injection unit (300) via a transfer manifold (116) occurring by way of a synchronized, pressure-controlled process is provided. As shown in FIG. 7A-7B, the retractable piston (321) within the piston barrel injection chamber (325) is mechanically retracted away from the core injection unit (300) while simultaneously rotating in a reverse direction. As the piston barrel injection chamber (325) becomes filled with the hot melt, the overall pressure within the system increases. This pressure is monitored at the die exit (113) of the extruder (100) using an external pressure probe, and upon reaching a predetermined pressure threshold, a pressure cut-of valve is triggered at which time the retractable piston (321) extends in the opposite direction while simultaneously rotating in a forward direction. This piston action serves to expel the hot melt from the piston barrel injection chamber (325) into the attached mold, relieving the elevated internal pressure. Once the injection is complete and the piston barrel injection chamber (325) is emptied, the process repeats.

In a further aspect of the present disclosure, the synchronized, pressure-controlled process repeats continuously over a prolonged period of time. In another further aspect of the present disclosure, the process is synchronized by monitoring and regulating the flow rate of the hot melt. In another further aspect of the present disclosure, the process is synchronized by monitoring and regulating the rate of the addition of an API into the system. In another further aspect of the present disclosure, the process is synchronized by monitoring and regulating the total amount of an API added into the system. In another further aspect of the present disclosure, the process is synchronized by monitoring and regulating the amount of an API added into the system over a given time period. In another further aspect of the present disclosure, the process is synchronized by monitoring and regulating the internal pressure of the hot melt at locations within the system other than at the transfer manifold (116).

Figure 8:
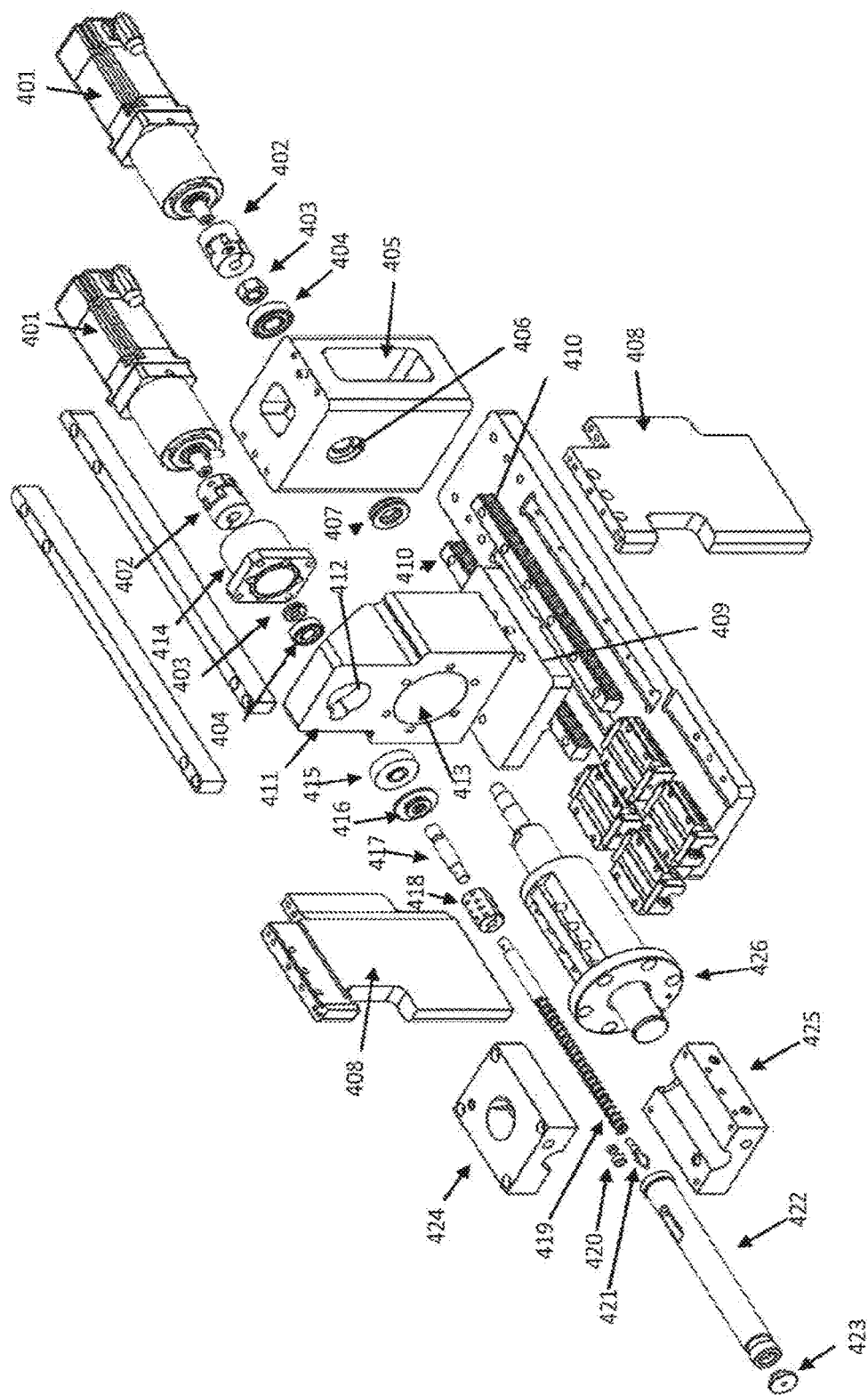
FIG. 8 is an isometric, exploded view of an exemplary coating delivery system (400A, 400B).

Referring to FIG. 8, a coating delivery system (400A, 400B) of the present disclosure is a mechanical apparatus for applying one or more coating materials to the cavities of a mold. A coating delivery system (400A, 400B) may comprise a port for the introduction of the coating material, a heated piston barrel injection chamber (422), a retractable piston (419), and an injection nozzle or tip (423). The coating delivery system (400A, 400B) is capable of lateral motion toward or away from a mold unit (200) by means of sliding on a set of stationary rail tracks (410). The speed, temperature, and pressure of the coating delivery system (400A, 400B) are optionally controlled by one or more external control units. In an aspect, the retractable piston (419) of a coating delivery system (400A, 400B) is configured both to retract to expand the injection chamber for the collection of a coating material, and to extend to eject collected coating material present in the injection chamber into an attached cavity block (600, 700, 800).

The coating delivery system (400A, 400B) of the present disclosure is designed to provide a means to deliver a heated coating material under pressure, where the heating may be accomplished with a temperature-controlled piston barrel injection chamber (422), by applying heat either internally or externally to the piston barrel injection chamber (422), or by pre-heating the coating material prior to addition to the piston barrel injection chamber (422); the pressure may be applied manually by forced injection or by using one or more rotary positive displacement pumps, reciprocating positive displacement pumps, peristaltic pumps, rotary lobe pumps, progressive cavity pumps, rotary gear pumps, piston pumps, diaphragm pumps, screw pumps, gear pumps, hydraulic pumps, rotary vane pumps, rope pumps, flexible impeller pumps, steam pumps, impulse pumps, velocity pumps, and centrifugal pumps; and the delivery may be accomplished by using an injector nozzle, tip, valve, or spray gun.

The temperature of the piston barrel injection chamber (422) may be chosen in view of the physical properties (e.g., thermal stability, viscosity) of the coating material. The temperature may also be chosen to affect the coating process to improve the consistency and coverage of the coating, as well as to improve the shape and composition of the molded tablets. See e.g., Cole, Graham, Aulton, Michael E. and Hogan, John E., *Pharmaceutical Coating Technology*. Taylor & Francis, London, 1995. In an aspect, piston barrel injection chamber (422) temperatures may range from about 23° C. to about 300° C. In an aspect, piston barrel injection chamber (422) temperatures may range from about 35° C. and about 150° C. Other coating delivery system (400A, 400B) parameters such as the injection time, injection pressure, piston speed, hold time, and hold pressure may also be controlled.

The synchronization, efficiency, and coated tablet production rate of a continuous coating-molding apparatus provided for in the present disclosure may be influenced by the flow rate of hot melt introduced into the system. As will be evident to a person of skill in the art in view of the present disclosure, a retractable piston (321, 419) and piston barrel injection chamber (325, 422) of the present disclosure can be configured to accommodate a wide range of volumetric flow rates. In an aspect, the diameter of a piston barrel injection chamber (325, 422) of the present disclosure can be varied. In an aspect, the rate of retraction of a retractable piston (321, 419) of the present disclosure can be varied. In an aspect, the rate of extension of a retractable piston (321, 419) of the present disclosure can be varied.

In an aspect of the present disclosure, the volumetric flow rate of a hot melt is at least 1,000,000 ml/min. In an aspect of the present disclosure, the volumetric flow rate of a hot melt is at least 500,000 ml/min. In an aspect of the present disclosure, the volumetric flow rate of a hot melt is at least 100,000 ml/min. In an aspect of the present disclosure, the volumetric flow rate of a hot melt is at least 50,000 ml/min. In an aspect of the present disclosure, the volumetric flow rate of a hot melt is at least 25,000 ml/min. In an aspect of the present disclosure, the volumetric flow rate of a hot melt is at least 10,000 ml/min. In an aspect of the present disclosure, the volumetric flow rate of a hot melt is at least 1,000 ml/min. In an aspect of the present disclosure, the volumetric flow rate of a hot melt is at least 900 ml/min. In an aspect of the present disclosure, the volumetric flow rate of a hot melt is at least 800 ml/min. In an aspect of the present disclosure, the volumetric flow rate of a hot melt is at least 700 ml/min. In an aspect of the present disclosure, the volumetric flow rate of a hot melt is at least 600 ml/min. In an aspect of the present disclosure, the volumetric flow rate of a hot melt is at least 500 ml/min. In an aspect of the present disclosure, the volumetric flow rate of a hot melt is at least 400 ml/min. In an aspect of the present disclosure, the volumetric flow rate of a hot melt is at least 300 ml/min. In an aspect of the present disclosure, the volumetric flow rate of a hot melt is at least 250 ml/min. In an aspect of the present disclosure, the volumetric flow rate of a hot melt is at least 200 ml/min. In an aspect of the present disclosure, the volumetric flow rate of a hot melt is at least 150 ml/min. In an aspect of the present disclosure, the volumetric flow rate of a hot melt is at least 100 ml/min. In an aspect of the present disclosure, the volumetric flow rate of a hot melt is at least 90 ml/min. In an aspect of the present disclosure, the volumetric flow rate of a hot melt is at least 80 ml/min. In an aspect of the present disclosure, the volumetric flow rate of a hot melt is at least 70 ml/min. In an aspect of the present disclosure, the volumetric flow rate of a hot melt is at least 60 ml/min. In an aspect of the present disclosure, the volumetric flow rate of a hot melt is at least 50 ml/min. In an aspect of the present disclosure, the volumetric flow rate of a hot melt is at least 40 ml/min. In an aspect of the present disclosure, the volumetric flow rate of a hot melt is at least 30 ml/min. In an aspect of the present disclosure, the volumetric flow rate of a hot melt is at least 25 ml/min. In an aspect of the present disclosure, the volumetric flow rate of a hot melt is at least 20 ml/min. In an aspect of the present disclosure, the volumetric flow rate of a hot melt is at least 15 ml/min. In an aspect of the present disclosure, the volumetric flow rate of a hot melt is at least 10 ml/min. In an aspect of the present disclosure, the volumetric flow rate of a hot melt is at least 5 ml/min. In an aspect of the present disclosure, the volumetric flow rate of a hot melt is at least 2 ml/min. In an aspect of the present disclosure, the volumetric flow rate of a hot melt is at least 1 ml/min.

In an aspect of the present disclosure, the volumetric flow rate of a hot melt is between 1 ml/min and 1,000,000 ml/min. In an aspect of the present disclosure, the volumetric flow rate of a hot melt is between 1 ml/min and 500,000 ml/min. In an aspect of the present disclosure, the volumetric flow rate of a hot melt is between 1 ml/min and 100,000 ml/min. In an aspect of the present disclosure, the volumetric flow rate of a hot melt is between 1 ml/min and 50,000 ml/min. In an aspect of the present disclosure, the volumetric flow rate of a hot melt is between 1 ml/min and 25,000 ml/min. In an aspect of the present disclosure, the volumetric flow rate of a hot melt is between 1 ml/min and 10,000 ml/min. In an aspect of the present disclosure, the volumetric flow rate of a hot melt is between 1 ml/min and 1,000 ml/min. In an aspect of the present disclosure, the volumetric flow rate of a hot melt is between 1,000 ml/min and 100,000 ml/min. In an aspect of the present disclosure, the volumetric flow rate of a hot melt is between 50,000 ml/min and 100,000 ml/min. In an aspect of the present disclosure, the volumetric flow rate of a hot melt is between 100 ml/min and 1,000 ml/min. In an aspect of the present disclosure, the volumetric flow rate of a hot melt is between 500 ml/min and 1,000 ml/min. In an aspect of the present disclosure, the volumetric flow rate of a hot melt is between 1 ml/min and 500 ml/min. In an aspect of the present disclosure, the volumetric flow rate of a hot melt is between 10 ml/min and 500 ml/min. In an aspect of the present disclosure, the volumetric flow rate of a hot melt is between 100 ml/min and 500 ml/min. In an aspect of the present disclosure, the volumetric flow rate of a hot melt is between 1 ml/min and 250 ml/min. In an aspect of the present disclosure, the volumetric flow rate of a hot melt is between 10 ml/min and 250 ml/min. In an aspect of the present disclosure, the volumetric flow rate of a hot melt is between 100 ml/min and 250 ml/min. In an aspect of the present disclosure, the volumetric flow rate of a hot melt is between 10 ml/min and 100 ml/min.

A continuous coating-molding apparatus provided for in the present disclosure provides the flexibility necessary for the incorporation of multiple APIs into coated pharmaceutical tablets. In an aspect, a hot melt may comprise an API and one or more excipients. In an aspect, a hot melt may comprise an API and an excipient. In an aspect, a hot melt may comprise an API and at least 1 excipient. In an aspect, a hot melt may comprise an API and at least 2 excipients. In an aspect, a hot melt may comprise an API and at least 3 excipients. In an aspect, a hot melt may comprise an API and at least 4 excipients. In an aspect, a hot melt may comprise an API and at least 5 excipients.

The synchronization, efficiency, and coated tablet production rate of a continuous coating-molding apparatus provided for in the present disclosure may be influenced by the rate of API addition. As noted above, a person of skill in the art in view of the present disclosure could modify parameters such as flow rates, piston speeds, piston barrel dimensions, hot melt volumes, and mold configurations to accommodate for variation in coated tablet production rates. The rate of the processing 10 of an API into coated pharmaceutical tablets may be expressed in grams of API processed per hour. In an aspect of the present disclosure, an API is processed into coated pharmaceutical tablets at a rate of at least 100,000 kg per hour. In an aspect of the present disclosure, an API is processed into coated pharmaceutical tablets at a rate of at least 10,000 kg per hour. In an aspect of the present disclosure, an API is 15 processed into coated pharmaceutical tablets at a rate of at least 1,000 kg per hour. In an aspect of the present disclosure, an API is processed into coated pharmaceutical tablets at a rate of at least 100 kg per hour. In an aspect of the present disclosure, an API is processed into coated pharmaceutical tablets at a rate of at least 50 kg per hour. In an aspect of the present disclosure, an API is processed into coated pharmaceutical tablets at a rate of at least 10 kg per hour. In an aspect of the present disclosure, an API is processed into coated pharmaceutical tablets at a rate of at least 3,000 g per hour. In an aspect of the present disclosure, an API is processed into coated pharmaceutical tablets at a rate of at least 2,750 g per hour. In an aspect of the present disclosure, an API is processed into coated pharmaceutical tablets at a rate of at least 2,500 g per hour. In an aspect of the present disclosure, an API is processed into coated pharmaceutical tablets at a rate of at least 2,250 g per hour. In an aspect of the present disclosure, an API is processed into coated pharmaceutical tablets at a rate of at least 2,000 g per hour. In an aspect of the present disclosure, an API is processed into coated pharmaceutical tablets at a rate of at least 1,750 g per hour. In an aspect of the present disclosure, an API is processed into coated pharmaceutical tablets at a rate of at least 1,500 g per hour. In an aspect of the present disclosure, an API is processed into coated pharmaceutical tablets at a rate of at least 1,250 g per hour. In an aspect of the present disclosure, an API is processed into coated pharmaceutical tablets at a rate of at least 1,000 g per hour. In an aspect of the present disclosure, an API is processed into coated pharmaceutical tablets at a rate of at least 750 g per hour. In an aspect of the present disclosure, an API is processed into coated pharmaceutical tablets at a rate of at least 500 g per hour. In an aspect of the present disclosure, an API is processed into coated pharmaceutical tablets at a rate of at least 250 g per hour. In an aspect of the present disclosure, an API is processed into coated pharmaceutical tablets at a rate of at least 100 g per hour. In an aspect of the present disclosure, an API is processed into coated pharmaceutical tablets at a rate of at least 75 g per hour. In an aspect of the present disclosure, an API is processed into coated pharmaceutical tablets at a rate of at least 50 g per hour. In an aspect of the present disclosure, an API is processed into coated pharmaceutical tablets at a rate of at least 40 g per hour. In an aspect of the present disclosure, an API is processed into coated pharmaceutical tablets at a rate of at least 30 g per hour. In an aspect of the present disclosure, an API is processed into coated pharmaceutical tablets at a rate of at least 20 g per hour. In an aspect of the present disclosure, an API is processed into coated pharmaceutical tablets at a rate of at least 10 g per hour. In an aspect of the present disclosure, an API is processed into coated pharmaceutical tablets at a rate of at least 5 g per hour. In an aspect of the present disclosure, an API is processed into coated pharmaceutical tablets at a rate of at least 2 g per hour. In an aspect of the present disclosure, an API is processed into coated pharmaceutical tablets at a rate of at least 1 g per hour.

In an aspect of the present disclosure, an API is processed into coated pharmaceutical tablets at a rate between 1 g per hour and 100,000 kg per hour. In an aspect of the present disclosure, an API is processed into coated pharmaceutical tablets at a rate between 1 g per hour and 10,000 kg per hour. In an aspect of the present disclosure, an API is processed into coated pharmaceutical tablets at a rate between 1 g per hour and 1,000 kg per hour. In an aspect of the present disclosure, an API is processed into coated pharmaceutical tablets at a rate between 1 g per hour and 100 kg per hour. In an aspect of the present disclosure, an API is processed into coated pharmaceutical tablets at a rate between 1 g per hour and 50 kg per hour. In an aspect of the present disclosure, an API is processed into coated pharmaceutical tablets at a rate between 1 g per hour and 10 kg per hour. In an aspect of the present disclosure, an API is processed into coated pharmaceutical tablets at a rate between 1 g per hour and 3,000 g per hour. In an aspect of the present disclosure, an API is processed into coated pharmaceutical tablets at a rate between 10,000 kg per hour and 100,000 kg per hour. In an aspect of the present disclosure, an API is processed into coated pharmaceutical tablets at a rate between 1,000 kg per hour and 100,000 kg per hour. In an aspect of the present disclosure, an API is processed into coated pharmaceutical tablets at a rate between 100 kg per hour and 100,000 kg per hour. In an aspect of the present disclosure, an API is processed into coated pharmaceutical tablets at a rate between 1,000 kg per hour and 10,000 kg per hour. In an aspect of the present disclosure, an API is processed into coated pharmaceutical tablets at a rate between 100 kg per hour and 1,000 kg per hour. In an aspect of the present disclosure, an API is processed into coated pharmaceutical tablets at a rate between 10 kg per hour and 100 kg per hour. In an aspect of the present disclosure, an API is processed into coated pharmaceutical tablets at a rate between 1,000 g per hour and 3,000 g per hour. In an aspect of the present disclosure, an API is processed into coated pharmaceutical tablets at a rate between 1,000 g per hour and 2,000 g per hour. In an aspect of the present disclosure, an API is processed into coated pharmaceutical tablets at a rate between 500 g per hour and 3,000 g per hour. In an aspect of the present disclosure, an API is processed into coated pharmaceutical tablets at a rate between 500 g per hour and 2,000 g per hour. In an aspect of the present disclosure, an API is processed into coated pharmaceutical tablets at a rate between 500 g per hour and 1,000 g per hour. In an aspect of the present disclosure, an API is processed into coated pharmaceutical tablets at a rate between 100 g per hour and 3,000 g per hour. In an aspect of the present disclosure, an API is processed into coated pharmaceutical tablets at a rate between 100 g per hour and 2,000 g per hour. In an aspect of the present disclosure, an API is processed into coated pharmaceutical tablets at a rate between 100 g per hour and 1,000 g per hour. In an aspect of the present disclosure, an API is processed into coated pharmaceutical tablets at a rate between 100 g per hour and 500 g per hour. In an aspect of the present disclosure, an API is processed into coated pharmaceutical tablets at a rate between 10 g per hour and 3,000 g per hour. In an aspect of the present disclosure, an API is processed into coated pharmaceutical tablets at a rate between 10 g per hour and 2,000 g per hour. In an aspect of the present disclosure, an API is processed into coated pharmaceutical tablets at a rate between 10 g per hour and 1,000 g per hour. In an aspect of the present disclosure, an API is processed into coated pharmaceutical tablets at a rate between 10 g per hour and 500 g per hour. In an aspect of the present disclosure, an API is processed into coated pharmaceutical tablets at a rate between 10 g per hour and 100 g per hour. In an aspect of the present disclosure, an API is processed into coated pharmaceutical tablets at a rate between 1 g per hour and 3,000 g per hour. In an aspect of the present disclosure, an API is processed into coated pharmaceutical tablets at a rate between 1 g per hour and 2,500 g per hour. In an aspect of the present disclosure, an API is processed into coated pharmaceutical tablets at a rate between 1 g per hour and 2,000 g per hour. In an aspect of the present disclosure, an API is processed into coated pharmaceutical tablets at a rate between 1 g per hour and 1,500 g per hour. In an aspect of the present disclosure, an API is processed into coated pharmaceutical tablets at a rate between 1 g per hour and 1,000 g per hour. In an aspect of the present disclosure, an API is processed into coated pharmaceutical tablets at a rate between 1 g per hour and 750 g per hour. In an aspect of the present disclosure, an API is processed into coated pharmaceutical tablets at a rate between 1 g per hour and 500 g per hour. In an aspect of the present disclosure, an API is processed into coated pharmaceutical tablets at a rate between 1 g per hour and 250 g per hour. In an aspect of the present disclosure, an API is processed into coated pharmaceutical tablets at a rate between 1 g per hour and 100 g per hour. In an aspect of the present disclosure, an API is processed into coated pharmaceutical tablets at a rate between 1 g per hour and 75 g per hour. In an aspect of the present disclosure, an API is processed into coated pharmaceutical tablets at a rate between 1 g per hour and 50 g per hour. In an aspect of the present disclosure, an API is processed into coated pharmaceutical tablets at a rate between 1 g per hour and 25 g per hour. In an aspect of the present disclosure, an API is processed into coated pharmaceutical tablets at a rate between 1 g per hour and 10 g per hour. In an aspect of the present disclosure, an API is processed into coated pharmaceutical tablets at a rate between 1 g per hour and 5 g per hour. As noted above, changes to the rate of API processing are within the skill of a person of skill in the art in view of the present specification.

In an aspect of the present disclosure, an API may be selected from the group consisting of celecoxib, guaifenesin, furosemide, dexamethasone, itraconazole, acetylsalicylic acid, fenofibrate, artesunate, carbamazepine, chlorpheniramine maleate, nifedipine, theophylline monohydrate, metoprolol tartrate, metoprolol fumarate, metoprolol succinate, metformin, progesterone, fluocinolone acetonide, gentamicin, tenofovir, valsartan, efavirenz, indomethacin, felodipine, nisoldipine, acetominophen, acetylcysteine, adenosine, alprostadil, amiodarone HCl, amiodarone, amitriptyline HCl, amitriptyline, amlodipine besylate, ampicillin, artesunate, baclofen, benzocaine, betamethasone, betamethasone acetate, baetamethasone sodium phosphate, biotin, budesonide-UV, bumetanide, caffeine citrate, caffeine, calcium chloride dihydrate, carbamazepine, calcium citrate, calcium gluconate, carvedilol, cefazolin sodium, cefazolin, cefepime, cefotaxime sodium, ceftazidime, ceftriaxone sodium, ceftriaxone, cefuroxime, cefuroxime sodium, chlorothiazide sodium, chlorothiazide, ciprofloxacin HCl, ciprofloxacin, cistatracurium besylate, clenbuterol-UV, clindamycin phosphate, deferoxamine mesylate, dehydroepianodrosterone, dexamethasone acetate, dexamethasone sodium phosphate, dexamethasone phosphate, dexmedetomidine, dextromethorphan hydrobromide, diazepam, diclofenac, diclofenac potassium, diclofenac sodium, diltiazem HCL, diltiazem, edetate calcium disodium, edetate disodium, ephedrine HCl, ephedrine sulfate, ephedrine, epinephrine bitartrate, epinephrine HCl, epinephrine, estradiol, estradiol cypionate, famotidine, fentanyl citrate, fentanyl, finasteride, fluconazole-UV, flurbiprofen, gabapentin, gentamicin sulfate, glutathione reduced, hyaluronic acid-UV, hydrocortisone, hydrocortisone acetate, hydrocortisone sodium phosphate, hydrocortisone succinate, hydromorphone HCl, hydromorphone, hydroxocobalamin HCl, ibuprofen, indocyanine green-UV, iohexol, ipratropium bromide-UV, ketamine HCl, ketamine, ketoprofen, ketorolac tromethamine, labetalol HCl, lansoprazole, leuprolide acetate, leuprolide, levothyroxine sodium, levothyroxine, lidocaine HCl, lidocaine, magensium chloridehexahydrate, magnesium chloride, magnesium citrate, magnesium sulfate, medroxyprogesterone acetate-UV, meloxicam, meperidine, meperidine HCl, mepivacaine HCl, methadone HCl, methimazole, methohexital sodium, methohexital, methylcoabalamin-UV, methylphenidate, methylprednisolone acetate, methylprednisolone, methylprednisolone sodium succinate, metoclopramide HCl, metoclopramide, N-acetylcysteine, nafcillin, nalbuphine HCl, nalbuphine, naltrexone HCl, naltrexone, nandrolone decanoate, neostigmine methylsulfate, neostigmine, nicardipine HCl, nicardipine, omeprazole sodium, omeprazole, ondansetron HCl, ondansetron, pantoprazole sodium, pantoprazole, papaverine HCl, papaverine, pemoline-UV, penicillin G potassium, pentobarbital sodium, pentobarbital, pentoxifylline, PGE-1, phenobarbital sodium, phenobarbital, phenol, phentolamine mesylate, phentolamine, phenylephrine HCl, phenylephrine tannate, phenylephrine tartrate, phenylephrine, piperacillin sodium, piperacillin, piroxicam, potassium bromide, potassium chloride, potassium citrate, povidone-iodine (betadine), prednisolone, prednisolone sodium phosphate, ranitidine HCl, ranitidine, remifentanil, rifampicin, rocuronium bromide, ropivacaine HCl, sildenafil citrate, sildenafil, simvastatin, sodium bicarbonate, sodium chloride, sodium citrate, sodium thiosulfate, spironolactone, tazobactam sodium, tazobactam, testosterone, testosterone cypionate, testosterone enanthate, testosterone proprionate, tetracaine HCl, tetracaine, thiamine HCl, thiamine, tramadol HCL, tramadol, ubidecarenone-UV, vancomycin HCl, vancomycin, vecuronium bromide, verapamil, and zidovudine.

A continuous coating-molding apparatus provided for in the present disclosure provides flexibility in choosing the number pharmaceutical tablets generated during a given time period. The rate of continuous production of coated pharmaceutical tablets may be expressed, for example, in number of tablets produced per hour. In an aspect of the present disclosure, coated pharmaceutical tablets are produced continuously at a rate of at least 5,000,000 tablets per hour. In an aspect of the present disclosure, coated pharmaceutical tablets are produced continuously at a rate of at least 1,000,000 tablets per hour. In an aspect of the present disclosure, coated pharmaceutical tablets are produced continuously at a rate of at least 500,000 tablets per hour. In an aspect of the present disclosure, coated pharmaceutical tablets are produced continuously at a rate of at least 100,000 tablets per hour. In an aspect of the present disclosure, coated pharmaceutical tablets are produced continuously at a rate of at least 20,000 tablets per hour. In an aspect of the present disclosure, coated pharmaceutical tablets are produced continuously at a rate of at least 17,500 tablets per hour. In an aspect of the present disclosure, coated pharmaceutical tablets are produced continuously at a rate of at least 15,000 tablets per hour. In an aspect of the present disclosure, coated pharmaceutical tablets are produced continuously at a rate of at least 12,500 tablets per hour. In an aspect of the present disclosure, coated pharmaceutical tablets are produced continuously at a rate of at least 10,000 tablets per hour. In an aspect of the present disclosure, coated pharmaceutical tablets are produced continuously at a rate of at least 7,500 tablets per hour. In an aspect of the present disclosure, coated pharmaceutical tablets are produced continuously at a rate of at least 5,000 tablets per hour. In an aspect of the present disclosure, coated pharmaceutical tablets are produced continuously at a rate of at least 2,500 tablets per hour. In an aspect of the present disclosure, coated pharmaceutical tablets are produced continuously at a rate of at least 2,000 tablets per hour. In an aspect of the present disclosure, coated pharmaceutical tablets are produced continuously at a rate of at least 1,500 tablets per hour. In an aspect of the present disclosure, coated pharmaceutical tablets are produced continuously at a rate of at least 1,000 tablets per hour. In an aspect of the present disclosure, coated pharmaceutical tablets are produced continuously at a rate of at least 500 tablets per hour. In an aspect of the present disclosure, coated pharmaceutical tablets are produced continuously at a rate of at least 200 tablets per hour. In an aspect of the present disclosure, coated pharmaceutical tablets are produced continuously at a rate of at least 100 tablets per hour. In an aspect of the present disclosure, coated pharmaceutical tablets are produced continuously at a rate of at least 50 tablets per hour.

In an aspect of the present disclosure, coated pharmaceutical tablets are produced continuously at a rate of at between 50 tablets per hour and 5,000,000 tablets per hour. In an aspect of the present disclosure, coated pharmaceutical tablets are produced continuously at a rate of at between 50 tablets per hour and 1,000,000 tablets per hour. In an aspect of the present disclosure, coated pharmaceutical tablets are produced continuously at a rate of at between 50 tablets per hour and 500,000 tablets per hour. In an aspect of the present disclosure, coated pharmaceutical tablets are produced continuously at a rate of at between 50 tablets per hour and 100,000 tablets per hour. In an aspect of the present disclosure, coated pharmaceutical tablets are produced continuously at a rate of at between 50 tablets per hour and 20,000 tablets per hour. In an aspect of the present disclosure, coated pharmaceutical tablets are produced continuously at a rate of at between 1,000,000 tablets per hour and 5,000,000 tablets per hour. In an aspect of the present disclosure, coated pharmaceutical tablets are produced continuously at a rate of at between 100,000 tablets per hour and 5,000,000 tablets per hour. In an aspect of the present disclosure, coated pharmaceutical tablets are produced continuously at a rate of at between 500,000 tablets per hour and 1,000,000 tablets per hour. In an aspect of the present disclosure, coated pharmaceutical tablets are produced continuously at a rate of at between 100,000 tablets per hour and 1,000,000 tablets per hour. In an aspect of the present disclosure, coated pharmaceutical tablets are produced continuously at a rate of at between 100 tablets per hour and 20,000 tablets per hour. In an aspect of the present disclosure, coated pharmaceutical tablets are produced continuously at a rate of at between 500 tablets per hour and 20,000 tablets per hour. In an aspect of the present disclosure, coated pharmaceutical tablets are produced continuously at a rate of at between 1,000 tablets per hour and 20,000 tablets per hour. In an aspect of the present disclosure, coated pharmaceutical tablets are produced continuously at a rate of at between 5,000 tablets per hour and 20,000 tablets per hour. In an aspect of the present disclosure, coated pharmaceutical tablets are produced continuously at a rate of at between 10,000 tablets per hour and 20,000 tablets per hour. In an aspect of the present disclosure, coated pharmaceutical tablets are produced continuously at a rate of at between 15,000 tablets per hour and 20,000 tablets per hour. In an aspect of the present disclosure, coated pharmaceutical tablets are produced continuously at a rate of at between 5,000 tablets per hour and 15,000 tablets per hour. In an aspect of the present disclosure, coated pharmaceutical tablets are produced continuously at a rate of at between 10,000 tablets per hour and 15,000 tablets per hour. In an aspect of the present disclosure, coated pharmaceutical tablets are produced continuously at a rate of at between 50 tablets per hour and 10,000 tablets per hour. In an aspect of the present disclosure, coated pharmaceutical tablets are produced continuously at a rate of at between 100 tablets per hour and 10,000 tablets per hour. In an aspect of the present disclosure, coated pharmaceutical tablets are produced continuously at a rate of at between 500 tablets per hour and 10,000 tablets per hour. In an aspect of the present disclosure, coated pharmaceutical tablets are produced continuously at a rate of at between 1,000 tablets per hour and 10,000 tablets per hour. In an aspect of the present disclosure, coated pharmaceutical tablets are produced continuously at a rate of at between 5,000 tablets per hour and 10,000 tablets per hour. In an aspect of the present disclosure, coated pharmaceutical tablets are produced continuously at a rate of at between 50 tablets per hour and 5,000 tablets per hour. In an aspect of the present disclosure, coated pharmaceutical tablets are produced continuously at a rate of at between 100 tablets per hour and 5,000 tablets per hour. In an aspect of the present disclosure, coated pharmaceutical tablets are produced continuously at a rate of at between 500 tablets per hour and 5,000 tablets per hour. In an aspect of the present disclosure, coated pharmaceutical tablets are produced continuously at a rate of at between 1,000 tablets per hour and 5,000 tablets per hour. In an aspect of the present disclosure, coated pharmaceutical tablets are produced continuously at a rate of at between 1,000 tablets per hour and 2,000 tablets per hour. In an aspect of the present disclosure, coated pharmaceutical tablets are produced continuously at a rate of at between 50 tablets per hour and 1,000 tablets per hour. In an aspect of the present disclosure, coated pharmaceutical tablets are produced continuously at a rate of at between 100 tablets per hour and 1,000 tablets per hour. In an aspect of the present disclosure, coated pharmaceutical tablets are produced continuously at a rate of at between 500 tablets per hour and 1,000 tablets per hour. In an aspect of the present disclosure, coated pharmaceutical tablets are produced continuously at a rate of at between 50 tablets per hour and 500 tablets per hour. In an aspect of the present disclosure, coated pharmaceutical tablets are produced continuously at a rate of at between 100 tablets per hour and 500 tablets per hour. In an aspect of the present disclosure, coated pharmaceutical tablets are produced continuously at a rate of at between 50 tablets per hour and 100 tablets per hour.

In aspects according to the present disclosure, a machine is provided for producing coated pharmaceutical tablets by a continuous process comprising: (i) a mold unit (200) comprising a molding frame (207) comprising at least one core block (500) and rotatable to at least four positions; (ii) a first coating delivery system (400A) comprising a first cavity block (600), a means to provide a heated coating material under pressure, and a mechanism for reversibly joining and placing the first cavity block (600) in fluid communication with the at least one core block (500) forming a first temporary mold on the molding frame (207) at a first position; (iii) a core injection unit (300) comprising a piston barrel injection chamber (325) fitted with a retractable piston (321), a port, a second cavity block (700), and a mechanism for reversibly joining and placing the second cavity block (700) in fluid communication with the at least one core block (500) forming a second temporary mold on the molding frame (207) at a second position, wherein the retractable piston (321) is configured to retract to expand said piston barrel injection chamber (325) and extend to eject material present in said piston barrel injection chamber (325) into said second temporary mold; (iv) a second coating delivery system comprising a third cavity block (800), a means to provide a heated coating material under pressure, and a mechanism for reversibly joining and placing the third cavity block (800) in fluid communication with the at least one core block (500) forming a third temporary mold on the molding frame (207) at a third position; and (v) a discharge area located at or in proximity to a fourth position of said molding frame (207).

In aspects of the present disclosure, a means to deliver a heated coating material under pressure includes applying heat either internally or externally to the piston barrel injection chamber (422), or by pre-heating the coating material prior to addition to the piston barrel injection chamber (422); the pressure may be applied manually by forced injection or by using one or more rotary positive displacement pumps, reciprocating positive displacement pumps, peristaltic pumps, rotary lobe pumps, progressive cavity pumps, rotary gear pumps, piston pumps, diaphragm pumps, screw pumps, gear pumps, hydraulic pumps, rotary vane pumps, rope pumps, flexible impeller pumps, steam pumps, impulse pumps, velocity pumps, and centrifugal pumps; and the delivery may be accomplished by using an injector nozzle, tip, valve, or spray gun.

In aspects of the present disclosure, a means for retaining injected material includes retaining the injected material by vacuum, by adhesion, by mass distribution, by physical clamping, or by two or more of these methods used in combination. In aspects of the present disclosure, a mechanism for reversibly joining and placing a core block (500) and a cavity block (600, 700, 800) in fluid communication with one another is a clamp, screw, hook, tie, rail, or hydraulic press.

In further aspects of the present disclosure, the machine is joined to and in direct fluid communication with a hot melt extruder (100). In other further aspects, the machine has a first coating delivery system (400A) comprising a piston barrel injection chamber (422) fitted with a retractable piston (419), where the retractable piston (419) is configured to retract to expand the piston barrel injection chamber (422) and extend to eject the coating material present into a first cavity block (600). In yet other further aspects, the machine has a second coating delivery system (400B) comprising a piston barrel injection chamber (422) fitted with a retractable piston (419), where the retractable piston (419) is configured to retract to expand the piston barrel injection chamber (422) to eject the coating material present in the piston barrel injection chamber (422) into a second cavity block (700).

In aspects according to the present disclosure, a machine is provided for producing coated pharmaceutical tablets by a continuous process comprising: (i) a mold unit (200) comprising a molding frame (207) comprising at least one core block (500) and rotatable to at least four positions, (ii) a coating delivery system (400A, 400B) comprising a first cavity block (600) and a third cavity block (800), a means to provide a heated coating material under pressure, and a mechanism for reversibly joining and placing the first cavity block (600) or third cavity block (800) in fluid communication with the at least one core block (500) forming a first temporary mold on the molding frame (207) at a first position, (iii) a core injection unit (300) comprising a piston barrel injection chamber (325) fitted with a retractable piston (321), a port, a second cavity block (700), and a mechanism for reversibly joining and placing the second cavity block (700) in fluid communication with the at least one core block (500) forming a second temporary mold on the molding frame (207) at a second position, wherein the retractable piston (321) is configured to retract to expand said piston barrel injection chamber (325) and extend to eject material present in said piston barrel injection chamber (325) into said second temporary mold, and (iv) a discharge area located at or in proximity to a fourth position of said molding frame (207).

In aspects according to the present disclosure, a machine is provided for producing uncoated pharmaceutical tablets by a continuous process comprising: (i) a mold unit (200) comprising a molding frame (207) comprising at least one core block (500) and rotatable to at least four positions; (ii) a core injection unit (300) comprising a piston barrel injection chamber (325) fitted with a retractable piston (321), a port, a second cavity block (700), and a mechanism for reversibly joining and placing the second cavity block (700) in fluid communication with the at least one core block (500) forming a second temporary mold on the molding frame (207) at a second position, wherein the retractable piston (321) is configured to retract to expand said piston barrel injection chamber (325) and extend to eject material present in said piston barrel injection chamber (325) into said second temporary mold; and (iii) a discharge area located at or in proximity to a fourth position of said molding frame (207).

In aspects according to the present disclosure, a core injection unit (300) is provided for injecting a continuous source of a hot melt comprising an active pharmaceutical ingredient and one or more excipients into at least one core block (500), where the core injection unit (300) comprises a piston barrel injection chamber (325) fitted with a retractable piston (321), a port, a cavity block (700), and a mechanism for reversibly joining and placing said cavity block in fluid communication with the at least one core block (500) to form a temporary mold, where the retractable piston (321) is configured to retract to expand the piston barrel injection chamber (325) and extend to eject material present in the piston barrel injection chamber (325) into the temporary mold. In further aspects of the present disclosure, the port of the core injection unit (300) is joined to and in direct fluid communication with a hot melt reservoir. In other further aspects of the present disclosure, the port of the core injection unit (300) is joined to and in direct fluid communication with a hot melt extruder.

A person of skill in the art, in view of the present specification, would understand that the proper selection of molding frame (207) configuration, along with the proper selection of the number, types, and positions of attached core blocks (500), will allow for the production of fully coated tablets, uncoated tablets, partially coated tablets, or multiple coated tablets as desired. In an aspect, a molding frame (207) of the present disclosure comprises a single position. In an aspect, a molding frame (207) of the present disclosure comprises at least one position. In an aspect, a molding frame (207) of the present disclosure comprises more than a single position. In an aspect, a molding frame (207) of the present disclosure comprises 2 positions. In an aspect, a molding frame (207) of the present disclosure comprises 3 positions. In an aspect, a molding frame (207) of the present disclosure comprises 4 positions. In an aspect, a molding frame (207) of the present disclosure comprises 5 positions. In an aspect, a molding frame (207) of the present disclosure comprises 6 positions. In an aspect, a molding frame (207) of the present disclosure comprises 7 positions. In an aspect, a molding frame (207) of the present disclosure comprises 8 positions. In an aspect, a molding frame (207) of the present disclosure comprises 9 positions. In an aspect, a molding frame (207) of the present disclosure comprises 10 positions. In an aspect, a molding frame (207) of the present disclosure comprises 11 positions. In an aspect, a molding frame (207) of the present disclosure comprises 12 positions. In an aspect, a molding frame (207) of the present disclosure comprises 13 positions. In an aspect, a molding frame (207) of the present disclosure comprises 14 positions. In an aspect, a molding frame (207) of the present disclosure comprises 15 positions. In an aspect, a molding frame (207) of the present disclosure comprises 16 positions. In an aspect, a molding frame (207) of the present disclosure comprises 17 positions. In an aspect, a molding frame (207) of the present disclosure comprises 18 positions. In an aspect, a molding frame (207) of the present disclosure comprises 19 positions. In an aspect, a molding frame (207) of the present disclosure comprises 20 positions.

In an aspect, a molding frame (207) of the present disclosure comprises between 1 and 20 positions. In an aspect, a molding frame (207) of the present disclosure comprises between 1 and 12 positions. In an aspect, a molding frame (207) of the present disclosure comprises between 1 and 10 positions. In an aspect, a molding frame (207) of the present disclosure comprises between 1 and 8 positions. In an aspect, a molding frame (207) of the present disclosure comprises between 1 and 6 positions. In an aspect, a molding frame (207) of the present disclosure comprises between 1 and 4 positions. In an aspect, a molding frame (207) of the present disclosure comprises between 1 and 2 positions. In an aspect, a molding frame (207) of the present disclosure comprises between 2 and 20 positions. In an aspect, a molding frame (207) of the present disclosure comprises between 2 and 12 positions. In an aspect, a molding frame (207) of the present disclosure comprises between 2 and 10 positions. In an aspect, a molding frame (207) of the present disclosure comprises between 2 and 8 positions. In an aspect, a molding frame (207) of the present disclosure comprises between 2 and 6 positions. In an aspect, a molding frame (207) of the present disclosure comprises between 2 and 4 positions. In an aspect, a molding frame (207) of the present disclosure comprises between 4 and 20 positions. In an aspect, a molding frame (207) of the present disclosure comprises between 4 and 12 positions. In an aspect, a molding frame (207) of the present disclosure comprises between 4 and 10 positions. In an aspect, a molding frame (207) of the present disclosure comprises between 4 and 8 positions. In an aspect, a molding frame (207) of the present disclosure comprises between 4 and 6 positions. In an aspect, a molding frame (207) of the present disclosure comprises between 6 and 20 positions. In an aspect, a molding frame (207) of the present disclosure comprises between 6 and 12 positions. In an aspect, a molding frame (207) of the present disclosure comprises between 8 and 20 positions. In an aspect, a molding frame (207) of the present disclosure comprises between 10 and 20 positions.

A person of skill in the art, in view of the present specification, would understand that the proper selection of rotation increments of a molding frame (207), coupled with the selection of the number, types, and positions of attached core blocks (500), will allow for the production of fully coated tablets, uncoated tablets, partially coated tablets, or multiple coated tablets as desired. In an aspect, a molding frame (207) of the present disclosure rotates in about 18 degree increments. In an aspect, a molding frame (207) of the present disclosure rotates in about 19 degree increments. In an aspect, a molding frame (207) of the present disclosure rotates in about 20 degree increments. In an aspect, a molding frame (207) of the present disclosure rotates in about 21 degree increments. In an aspect, a molding frame (207) of the present disclosure rotates in about 22.5 degree increments. In an aspect, a molding frame (207) of the present disclosure rotates in about 24 degree increments. In an aspect, a molding frame (207) of the present disclosure rotates in about 26 degree increments. In an aspect, a molding frame (207) of the present disclosure rotates in about 28 degree increments. In an aspect, a molding frame (207) of the present disclosure rotates in about 30 degree increments. In an aspect, a molding frame (207) of the present disclosure rotates in about 33 degree increments. In an aspect, a molding frame (207) of the present disclosure rotates in about 36 degree increments. In an aspect, a molding frame (207) of the present disclosure rotates in about 40 degree increments. In an aspect, a molding frame (207) of the present disclosure rotates in about 45 degree increments. In an aspect, a molding frame (207) of the present disclosure rotates in about 52 degree increments. In an aspect, a molding frame (207) of the present disclosure rotates in about 60 degree increments. In an aspect, a molding frame (207) of the present disclosure rotates in about 72 degree increments. In an aspect, a molding frame (207) of the present disclosure rotates in about 90 degree increments. In an aspect, a molding frame (207) of the present disclosure rotates in 90 degree increments. In an aspect, a molding frame (207) of the present disclosure rotates in about 120 degree increments. In an aspect, a molding frame (207) of the present disclosure rotates in 120 degree increments. In an aspect, a molding frame (207) of the present disclosure rotates in about 180 degree increments. In an aspect, a molding frame (207) of the present disclosure rotates in 180 degree increments.

In an aspect, a molding frame (207) of the present disclosure rotates in increments of between 18 degrees and 20 degrees. In an aspect, a molding frame (207) of the present disclosure rotates in increments of between 18 degrees and 22.5 degrees. In an aspect, a molding frame (207) of the present disclosure rotates in increments of between 18 degrees and 26 degrees. In an aspect, a molding frame (207) of the present disclosure rotates in increments of between 18 degrees and 30 degrees. In an aspect, a molding frame (207) of the present disclosure rotates in increments of between 18 degrees and 36 degrees. In an aspect, a molding frame (207) of the present disclosure rotates in increments of between 18 degrees and 40 degrees. In an aspect, a molding frame (207) of the present disclosure rotates in increments of between 18 degrees and 45 degrees. In an aspect, a molding frame (207) of the present disclosure rotates in increments of between 18 degrees and 52 degrees. In an aspect, a molding frame (207) of the present disclosure rotates in increments of between 18 degrees and 60 degrees. In an aspect, a molding frame (207) of the present disclosure rotates in increments of between 18 degrees and 72 degrees. In an aspect, a molding frame (207) of the present disclosure rotates in increments of between 18 degrees and 90 degrees. In an aspect, a molding frame (207) of the present disclosure rotates in increments of between 18 degrees and 120 degrees. In an aspect, a molding frame (207) of the present disclosure rotates in increments of between 18 degrees and 180 degrees. In an aspect, a molding frame (207) of the present disclosure rotates in increments of between 45 degrees and 60 degrees. In an aspect, a molding frame (207) of the present disclosure rotates in increments of between 45 degrees and 72 degrees. In an aspect, a molding frame (207) of the present disclosure rotates in increments of between 45 degrees and 90 degrees. In an aspect, a molding frame (207) of the present disclosure rotates in increments of between 45 degrees and 120 degrees. In an aspect, a molding frame (207) of the present disclosure rotates in increments of between 45 degrees and 180 degrees. In an aspect, a molding frame (207) of the present disclosure rotates in increments of between 60 degrees and 72 degrees. In an aspect, a molding frame (207) of the present disclosure rotates in increments of between 60 degrees and 90 degrees. In an aspect, a molding frame (207) of the present disclosure rotates in increments of between 60 degrees and 120 degrees. In an aspect, a molding frame (207) of the present disclosure rotates in increments of between 60 degrees and 180 degrees. In an aspect, a molding frame (207) of the present disclosure rotates in increments of between 90 degrees and 120 degrees. In an aspect, a molding frame (207) of the present disclosure rotates in increments of between 90 degrees and 180 degrees.

A person of skill in the art, in view of the present specification, would understand that the number and positions of core blocks (500) attached to a molding frame (207) will provide control over the total number of fully coated tablets, uncoated tablets, partially coated tablets, or multiple coated tablets produced in a given time period. In an aspect, a molding frame (207) of the present disclosure comprises at least 20 core block (500). In an aspect, a molding frame (207) of the present disclosure comprises 19 core blocks (500). In an aspect, a molding frame (207) of the present disclosure comprises 18 core blocks (500). In an aspect, a molding frame (207) of the present disclosure comprises 17 core blocks (500). In an aspect, a molding frame (207) of the present disclosure comprises 16 core blocks (500). In an aspect, a molding frame (207) of the present disclosure comprises 15 core blocks (500). In an aspect, a molding frame (207) of the present disclosure comprises 14 core blocks (500). In an aspect, a molding frame (207) of the present disclosure comprises 13 core blocks (500). In an aspect, a molding frame (207) of the present disclosure comprises 12 core blocks (500). In an aspect, a molding frame (207) of the present disclosure comprises 11 core blocks (500). In an aspect, a molding frame (207) of the present disclosure comprises 10 core blocks (500). In an aspect, a molding frame (207) of the present disclosure comprises 9 core blocks (500). In an aspect, a molding frame (207) of the present disclosure comprises 8 core blocks (500). In an aspect, a molding frame (207) of the present disclosure comprises 7 core blocks (500). In an aspect, a molding frame (207) of the present disclosure comprises 6 core blocks (500). In an aspect, a molding frame (207) of the present disclosure comprises 5 core blocks (500). In an aspect, a molding frame (207) of the present disclosure comprises 4 core blocks (500). In an aspect, a molding frame (207) of the present disclosure comprises 3 core blocks (500). In an aspect, a molding frame (207) of the present disclosure comprises 2 core blocks (500). In an aspect, a molding frame (207) of the present disclosure comprises a single core block (500).

In an aspect, a molding frame (207) of the present disclosure comprises between 1 and 20 core blocks (500). In an aspect, a molding frame (207) of the present disclosure comprises between 1 and 12 core blocks (500). In an aspect, a molding frame (207) of the present disclosure comprises between one and 10 core blocks (500). In an aspect, a molding frame (207) of the present disclosure comprises between 1 and 8 core blocks (500). In an aspect, a molding frame (207) of the present disclosure comprises between 1 and 6 core blocks (500). In an aspect, a molding frame (207) of the present disclosure comprises between one and 4 core blocks (500). In an aspect, a molding frame (207) of the present disclosure comprises between one and 2 core blocks (500). In an aspect, a molding frame (207) of the present disclosure comprises between 2 and 20 core blocks (500). In an aspect, a molding frame (207) of the present disclosure comprises between 2 and 12 core blocks (500). In an aspect, a molding frame (207) of the present disclosure comprises between 2 and 10 core blocks (500). In an aspect, a molding frame (207) of the present disclosure comprises between 2 and 8 core blocks (500). In an aspect, a molding frame (207) of the present disclosure comprises between 2 and 6 core blocks (500). In an aspect, a molding frame (207) of the present disclosure comprises between 2 and 4 core blocks (500). In an aspect, a molding frame (207) of the present disclosure comprises between 4 and 20 core blocks (500). In an aspect, a molding frame (207) of the present disclosure comprises between 4 and 12 core blocks (500). In an aspect, a molding frame (207) of the present disclosure comprises between 4 and 10 core blocks (500). In an aspect, a molding frame (207) of the present disclosure comprises between 4 and 8 core blocks (500). In an aspect, a molding frame (207) of the present disclosure comprises between 4 and 6 core blocks (500). In an aspect, a molding frame (207) of the present disclosure comprises between 6 and 20 core blocks (500). In an aspect, a molding frame (207) of the present disclosure comprises between 6 and 12 core blocks (500). In an aspect, a molding frame (207) of the present disclosure comprises between 6 and 10 core blocks (500). In an aspect, a molding frame (207) of the present disclosure comprises between 6 and 8 core blocks (500). In an aspect, a molding frame (207) of the present disclosure comprises between 8 and 20 core blocks (500). In an aspect, a molding frame (207) of the present disclosure comprises between 10 and 20 core blocks (500).

In an aspect, every position of a molding frame (207) of the present disclosure comprises a core block (500). In an aspect, all but one position of a molding frame (207) of the present disclosure comprises core blocks (500). In an aspect, three quarters of the positions of a molding frame (207) of the present disclosure comprise core blocks (500). In an aspect, one half of the positions of a molding frame (207) of the present disclosure comprise core blocks (500). In an aspect, one quarter of the positions of a molding frame (207) of the present disclosure comprise core blocks (500).

In an aspect, between one quarter and one half of the positions of a molding frame (207) comprise core blocks (500). In an aspect, between one quarter and three quarters of the positions of a molding frame (207) comprise core blocks (500). In an aspect, between one half and three quarters of the positions of a molding frame (207) comprises core blocks (500) (500).

The inclusion of retractable ejection pins (553) within a core block (500) provides an effective method for the release of coated pharmaceutical tablets from the core block. In an aspect, no core blocks (500) of the present disclosure comprise retractable ejection pins (553). In an aspect, every core block (500) of the present disclosure comprises a set of retractable ejection pins (553). In an aspect, some core blocks (500) of the present disclosure comprise sets of retractable ejection pins (553) and other core blocks (500) do not.

In an aspect, 20 core blocks (500) of the present disclosure each comprises a set of retractable ejection pins (553). In an aspect, 19 core blocks (500) of the present disclosure each comprises a set of retractable ejection pins (553). In an aspect, 18 core blocks (500) of the present disclosure each comprises a set of retractable ejection pins (553). In an aspect, 17 core blocks (500) of the present disclosure each comprises a set of retractable ejection pins (553). In an aspect, 16 core blocks (500) of the present disclosure each comprises a set of retractable ejection pins (553). In an aspect, 15 core blocks (500) of the present disclosure each comprises a set of retractable ejection pins (553). In an aspect, 14 core blocks (500) of the present disclosure each comprises a set of retractable ejection pins (553). In an aspect, 13 core blocks (500) of the present disclosure each comprises a set of retractable ejection pins (553). In an aspect, 12 core blocks (500) of the present disclosure each comprises a set of retractable ejection pins (553). In an aspect, 11 core blocks (500) of the present disclosure each comprises a set of retractable ejection pins (553). In an aspect, 10 core blocks (500) of the present disclosure each comprises a set of retractable ejection pins (553). In an aspect, 9 core blocks (500) of the present disclosure each comprises a set of retractable ejection pins (553). In an aspect, 8 core blocks (500) of the present disclosure each comprises a set of retractable ejection pins (553). In an aspect, 7 ore blocks (500) of the present disclosure each comprises a set of retractable ejection pins (553). In an aspect, 6 core blocks (500) of the present disclosure each comprises a set of retractable ejection pins (553). In an aspect, 5 core blocks (500) of the present disclosure each comprises a set of retractable ejection pins (553). In an aspect, 4 core blocks (500) of the present disclosure each comprises a set of retractable ejection pins (553). In an aspect, 3 core blocks (500) of the present disclosure each comprises a set of retractable ejection pins (553). In an aspect, 2 core blocks (500) of the present disclosure each comprises a set of retractable ejection pins (553). In an aspect, a single core block (500) of the present disclosure comprises a set of retractable ejection pins (553).

The present specification provides for a core block having one or more ejection pins per well. In an aspect, a core block (500) of the present disclosure has a single retractable ejection pin (533) per well (502). In an aspect, a core block (500) of the present disclosure has 2 retractable ejection pins (533) per well (502). In an aspect, a core block (500) of the present disclosure has 3 retractable ejection pins (533) per well (502). In an aspect, a core block (500) of the present disclosure has 4 retractable ejection pins (533) per well (502). In an aspect, a core block (500) of the present disclosure has 5 retractable ejection pins (533) per well (502). In an aspect, a core block (500) of the present disclosure has 6 retractable ejection pins (533) per well (502). In an aspect, a core block (500) of the present disclosure has 7 retractable ejection pins (533) per well (502). In an aspect, a core block (500) of the present disclosure has 8 retractable ejection pins (533) per well (502). In an aspect, a core block (500) of the present disclosure has 9 retractable ejection pins (533) per well (502). In an aspect, a core block (500) of the present disclosure has 10 retractable ejection pins (533) per well (502). In an aspect, a core block (500) of the present disclosure has no retractable ejection pins (533) in any well (502).

In an aspect, a core block (500) of the present disclosure has at least 1 retractable ejection pin (533) per well (502). In an aspect, a core block (500) of the present disclosure has at least 2 retractable ejection pins (533) per well (502). In an aspect, a core block (500) of the present disclosure has at least 3 retractable ejection pins (533) per well (502). In an aspect, a core block (500) of the present disclosure has at least 4 retractable ejection pins (533) per well (502). In an aspect, a core block (500) of the present disclosure has at least 5 retractable ejection pins (533) per well (502). In an aspect, a core block (500) of the present disclosure has more than 1 retractable ejection pin (533) per well (502). In an aspect, a core block (500) of the present disclosure has more than 2 retractable ejection pins (533) per well (502). In an aspect, a core block (500) of the present disclosure has more than 3 retractable ejection pins (533) per well (502). In an aspect, a core block (500) of the present disclosure has more than 4 retractable ejection pins (533) per well (502). In an aspect, a core block (500) of the present disclosure has more than 5 retractable ejection pins (533) per well (502).

In an aspect, a core block (500) of the present disclosure has between 1 and 2 retractable ejection pins (533) per well (502). In an aspect, a core block (500) of the present disclosure has between 1 and 3 retractable ejection pins (533) per well (502). In an aspect, each a core block (500) of the present disclosure has between 1 and 4 retractable ejection pins (533) per well (502). In an aspect, a core block (500) of the present disclosure has between 1 and 5 retractable ejection pins (533) per well (502). In an aspect, a core block (500) of the present disclosure has between 2 and 3 retractable ejection pins (533) per well (502). In an aspect, a core block (500) of the present disclosure has between 2 and 4 retractable ejection pins (533) per well (502). In an aspect, a core block (500) of the present disclosure has between 2 and 5 retractable ejection pins (533) per well (502). In an aspect, a core block (500) of the present disclosure has between 3 and 5 retractable ejection pins (533) per well (502). In an aspect, a core block (500) of the present disclosure has between 4 and 5 retractable ejection pins (533) per well (502).

In an aspect, coated pharmaceutical tablets are ejected from a core block (500) by the action of retractable ejection pins (553). In an aspect, coated pharmaceutical tablets are ejected from a core block (500) by an air ejection system. In an aspect, coated pharmaceutical tablets are ejected from a core block (500) by a sleeve ejection system.

The throughput and productivity of a continuous coating-molding apparatus provided for in the present disclosure is influenced by the choices of core blocks (500) used. In an aspect, a core block (500) of the present disclosure has a capacity for molding at least 10,000 tablets. In an aspect, a core block (500) of the present disclosure has a capacity for molding at least 5,000 tablets. In an aspect, a core block (500) of the present disclosure has a capacity for molding at least 1,000 tablets. In an aspect, a core block (500) of the present disclosure has a capacity for molding at least 500 tablets. In an aspect, a core block (500) of the present disclosure has a capacity for molding at least 100 tablets. In an aspect, a core block (500) of the present disclosure has a capacity for molding at least 80 tablets. In an aspect, a core block (500) of the present disclosure has a capacity for molding at least 60 tablets. In an aspect, a core block (500) of the present disclosure has a capacity for molding at least 40 tablets. In an aspect, a core block (500) of the present disclosure has a capacity for molding 40 tablets. In an aspect, a core block (500) of the present disclosure has a capacity for molding 39 tablets. In an aspect, a core block (500) of the present disclosure has a capacity for molding 38 tablets. In an aspect, a core block (500) of the present disclosure has a capacity for molding 37 tablets. In an aspect, a core block (500) of the present disclosure has a capacity for molding 36 tablets. In an aspect, a core block (500) of the present disclosure has a capacity for molding 35 tablets. In an aspect, a core block (500) of the present disclosure has a capacity for molding 34 tablets. In an aspect, a core block (500) of the present disclosure has a capacity for molding 33 tablets. In an aspect, a core block (500) of the present disclosure has a capacity for molding 32 tablets. In an aspect, a core block (500) of the present disclosure has a capacity for molding 31 tablets. In an aspect, a core block (500) of the present disclosure has a capacity for molding 30 tablets. In an aspect, a core block (500) of the present disclosure has a capacity for molding 29 tablets. In an aspect, a core block (500) of the present disclosure has a capacity for molding 28 tablets. In an aspect, a core block (500) of the present disclosure has a capacity for molding 27 tablets. In an aspect, a core block (500) of the present disclosure has a capacity for molding 26 tablets. In an aspect, a core block (500) of the present disclosure has a capacity for molding 25 tablets. In an aspect, a core block (500) of the present disclosure has a capacity for molding 24 tablets. In an aspect, a core block (500) of the present disclosure has a capacity for molding 23 tablets. In an aspect, a core block (500) of the present disclosure has a capacity for molding 22 tablets. In an aspect, a core block (500) of the present disclosure has a capacity for molding 21 tablets. In an aspect, a core block (500) of the present disclosure has a capacity for molding 20 tablets. In an aspect, a core block (500) of the present disclosure has a capacity for molding 19 tablets. In an aspect, a core block (500) of the present disclosure has a capacity for molding 18 tablets. In an aspect, a core block (500) of the present disclosure has a capacity for molding 17 tablets. In an aspect, a core block (500) of the present disclosure has a capacity for molding 16 tablets. In an aspect, a core block (500) of the present disclosure has a capacity for molding 15 tablets. In an aspect, a core block (500) of the present disclosure has a capacity for molding 14 tablets. In an aspect, a core block (500) of the present disclosure has a capacity for molding 13 tablets. In an aspect, a core block (500) of the present disclosure has a capacity for molding 12 tablets. In an aspect, a core block (500) of the present disclosure has a capacity for molding 11 tablets. In an aspect, a core block (500) of the present disclosure has a capacity for molding 10 tablets. In an aspect, a core block (500) of the present disclosure has a capacity for molding 9 tablets. In an aspect, a core block (500) of the present disclosure has a capacity for molding 8 tablets. In an aspect, a core block (500) of the present disclosure has a capacity for molding 7 tablets. In an aspect, a core block (500) of the present disclosure has a capacity for molding 6 tablets. In an aspect, a core block (500) of the present disclosure has a capacity for molding 5 tablets. In an aspect, a core block (500) of the present disclosure has a capacity for molding 4 tablets. In an aspect, a core block (500) of the present disclosure has a capacity for molding 3 tablets. In an aspect, a core block (500) of the present disclosure has a capacity for molding 2 tablets.

In an aspect, a core block (500) of the present disclosure has a capacity for molding between 1 and 10,000 tablets. In an aspect, a core block (500) of the present disclosure has a capacity for molding between 1 and 5,000 tablets. In an aspect, a core block (500) of the present disclosure has a capacity for molding between 1 and 1,000 tablets. In an aspect, a core block (500) of the present disclosure has a capacity for molding between 1 and 100 tablets. In an aspect, a core block (500) of the present disclosure has a capacity for molding between 1 and 50 tablets. In an aspect, a core block (500) of the present disclosure has a capacity for molding between 1 and 36 tablets. In an aspect, a core block (500) of the present disclosure has a capacity for molding between 1 and 32 tablets. In an aspect, a core block (500) of the present disclosure has a capacity for molding between 1 and 25 tablets. In an aspect, a core block (500) of the present disclosure has a capacity for molding between 1 and 20 tablets. In an aspect, a core block (500) of the present disclosure has a capacity for molding between 1and 16 tablets. In an aspect, a core block (500) of the present disclosure has a capacity for molding between 1 and 12 tablets. In an aspect, a core block (500) of the present disclosure has a capacity for molding between 1 and 8 tablets. In an aspect, a core block (500) of the present disclosure has a capacity for molding between 1 and 4 tablets. In an aspect, a core block (500) of the present disclosure has a capacity for molding between 2 and 100 tablets. In an aspect, a core block (500) of the present disclosure has a capacity for molding between 2 and 50 tablets. In an aspect, a core block (500) of the present disclosure has a capacity for molding between 2 and 32 tablets. In an aspect, a core block (500) of the present disclosure has a capacity for molding between 2 and 16 tablets. In an aspect, a core block (500) of the present disclosure has a capacity for molding between 2 and 8 tablets. In an aspect, a core block (500) of the present disclosure has a capacity for molding between 4 and 100 tablets. In an aspect, a core block (500) of the present disclosure has a capacity for molding between 4 and 50 tablets. In an aspect, a core block (500) of the present disclosure has a capacity for molding between 4 and 32 tablets. In an aspect, a core block (500) of the present disclosure has a capacity for molding between 4 and 16 tablets. In an aspect, a core block (500) of the present disclosure has a capacity for molding between 8 and 100 tablets. In an aspect, a core block (500) of the present disclosure has a capacity for molding between 8 and 50 tablets. In an aspect, a core block (500) of the present disclosure has a capacity for molding between 8 and 32 tablets. In an aspect, a core block (500) of the present disclosure has a capacity for molding between 8 and 16 tablets. In an aspect, a core block (500) of the present disclosure has a capacity for molding between 16 and 100 tablets. In an aspect, a core block (500) of the present disclosure has a capacity for molding between 16 and 32 tablets.

The throughput and productivity of a continuous coating-molding apparatus provided for in the present disclosure is also be influenced by choice of cavity blocks (600, 700, 800) used. Proper choice of cavity block (600, 700, 800) types provide control over coating location on the tablet and the degree of tablet surface coverage, as well as the application of multiple coating layers to tablets. In an aspect, a cavity block (600, 700, 800) of the present disclosure has a capacity for molding at least 10,000 tablets. In an aspect, a cavity block (600, 700, 800) of the present disclosure has a capacity for molding at least 5,000 tablets. In an aspect, a cavity block (600, 700, 800) of the present disclosure has a capacity for molding at least 1,000 tablets. In an aspect, a cavity block (600, 700, 800) of the present disclosure has a capacity for molding at least 500 tablets. In an aspect, a cavity block (600, 700, 800) of the present disclosure has a capacity for molding at least 100 tablets. In an aspect, a cavity block (600, 700, 800) of the present disclosure has a capacity for molding at least 80 tablets. In an aspect, a cavity block (600, 700, 800) of the present disclosure has a capacity for molding at least 60 tablets. In an aspect, a cavity block (600, 700, 800) of the present disclosure has a capacity for molding at least 40 tablets. In an aspect, a cavity block (600, 700, 800) of the present disclosure has a capacity for molding 40 tablets. In an aspect, a cavity block (600, 700, 800) of the present disclosure has a capacity for molding 39 tablets. In an aspect, a cavity block (600, 700, 800) of the present disclosure has a capacity for molding 38 tablets. In an aspect, a cavity block (600, 700, 800) of the present disclosure has a capacity for molding 37 tablets. In an aspect, a cavity block (600, 700, 800) of the present disclosure has a capacity for molding 36 tablets. In an aspect, a cavity block (600, 700, 800) of the present disclosure has a capacity for molding 35 tablets. In an aspect, a cavity block (600, 700, 800) of the present disclosure has a capacity for molding 34 tablets. In an aspect, a cavity block (600, 700, 800) of the present disclosure has a capacity for molding 33 tablets. In an aspect, a cavity block (600, 700, 800) of the present disclosure has a capacity for molding 32 tablets. In an aspect, a cavity block (600, 700, 800) of the present disclosure has a capacity for molding 31 tablets. In an aspect, a cavity block (600, 700, 800) of the present disclosure has a capacity for molding 30 tablets. In an aspect, a cavity block (600, 700, 800) of the present disclosure has a capacity for molding 29 tablets. In an aspect, a cavity block (600, 700, 800) of the present disclosure has a capacity for molding 28 tablets. In an aspect, a cavity block (600, 700, 800) of the present disclosure has a capacity for molding 27 tablets. In an aspect, a cavity block (600, 700, 800) of the present disclosure has a capacity for molding 26 tablets. In an aspect, a cavity block (600, 700, 800) of the present disclosure has a capacity for molding 25 tablets. In an aspect, a cavity block (600, 700, 800) of the present disclosure has a capacity for molding 24 tablets. In an aspect, a cavity block (600, 700, 800) of the present disclosure has a capacity for molding 23 tablets. In an aspect, a cavity block (600, 700, 800) of the present disclosure has a capacity for molding 22 tablets. In an aspect, a cavity block (600, 700, 800) of the present disclosure has a capacity for molding 21 tablets. In an aspect, a cavity block (600, 700, 800) of the present disclosure has a capacity for molding 20 tablets. In an aspect, a cavity block (600, 700, 800) of the present disclosure has a capacity for molding 19 tablets. In an aspect, a cavity block (600, 700, 800) of the present disclosure has a capacity for molding 18 tablets. In an aspect, a cavity block (600, 700, 800) of the present disclosure has a capacity for molding 17 tablets. In an aspect, a cavity block (600, 700, 800) of the present disclosure has a capacity for molding 16 tablets. In an aspect, a cavity block (600, 700, 800) of the present disclosure has a capacity for molding 15 tablets. In an aspect, a cavity block (600, 700, 800) of the present disclosure has a capacity for molding 14 tablets. In an aspect, a cavity block (600, 700, 800) of the present disclosure has a capacity for molding 13 tablets. In an aspect, a cavity block (600, 700, 800) of the present disclosure has a capacity for molding 12 tablets. In an aspect, a cavity block (600, 700, 800) of the present disclosure has a capacity for molding 11 tablets. In an aspect, a cavity block (600, 700, 800) of the present disclosure has a capacity for molding 10 tablets. In an aspect, a cavity block (600, 700, 800) of the present disclosure has a capacity for molding 9 tablets. In an aspect, a cavity block (600, 700, 800) of the present disclosure has a capacity for molding 8 tablets. In an aspect, a cavity block (600, 700, 800) of the present disclosure has a capacity for molding 7 tablets. In an aspect, a cavity block (600, 700, 800) of the present disclosure has a capacity for molding 6 tablets. In an aspect, a cavity block (600, 700, 800) of the present disclosure has a capacity for molding 5 tablets. In an aspect, a cavity block (600, 700, 800) of the present disclosure has a capacity for molding 4 tablets. In an aspect, a cavity block (600, 700, 800) of the present disclosure has a capacity for molding 3 tablets. In an aspect, a cavity block (600, 700, 800) of the present disclosure has a capacity for molding 2 tablets.

In an aspect, a cavity block (600, 700, 800) of the present disclosure has a capacity for molding between 1 and 10,000 tablets. In an aspect, a cavity block (600, 700, 800) of the present disclosure has a capacity for molding between 1 and 5,000 tablets. In an aspect, a cavity block (600, 700, 800) of the present disclosure has a capacity for molding between 1 and 1,000 tablets. In an aspect, a cavity block (600, 700, 800) of the present disclosure has a capacity for molding between 1 and 100 tablets. In an aspect, a cavity block (600, 700, 800) of the present disclosure has a capacity for molding between 1 and 50 tablets. In an aspect, a cavity block (600, 700, 800) of the present disclosure has a capacity for molding between 1 and 36 tablets. In an aspect, a cavity block (600, 700, 800) of the present disclosure has a capacity for molding between 1 and 32 tablets. In an aspect, a cavity block (600, 700, 800) of the present disclosure has a capacity for molding between 1 and 25 tablets. In an aspect, a cavity block (600, 700, 800) of the present disclosure has a capacity for molding between 1 and 20 tablets. In an aspect, a cavity block (600, 700, 800) of the present disclosure has a capacity for molding between 1and 16 tablets. In an aspect, a cavity block (600, 700, 800) of the present disclosure has a capacity for molding between 1 and 12 tablets. In an aspect, a cavity block (600, 700, 800) of the present disclosure has a capacity for molding between 1 and 8 tablets. In an aspect, a cavity block (600, 700, 800) of the present disclosure has a capacity for molding between 1 and 4 tablets. In an aspect, a cavity block (600, 700, 800) of the present disclosure has a capacity for molding between 2 and 100 tablets. In an aspect, a cavity block (600, 700, 800) of the present disclosure has a capacity for molding between 2 and 50 tablets. In an aspect, a cavity block (600, 700, 800) of the present disclosure has a capacity for molding between 2 and 32 tablets. In an aspect, a cavity block (600, 700, 800) of the present disclosure has a capacity for molding between 2 and 16 tablets. In an aspect, a cavity block (600, 700, 800) of the present disclosure has a capacity for molding between 2 and 8 tablets. In an aspect, a cavity block (600, 700, 800) of the present disclosure has a capacity for molding between 4 and 100 tablets. In an aspect, a cavity block (600, 700, 800) of the present disclosure has a capacity for molding between 4 and 50 tablets. In an aspect, a cavity block (600, 700, 800) of the present disclosure has a capacity for molding between 4 and 32 tablets. In an aspect, a cavity block (600, 700, 800) of the present disclosure has a capacity for molding between 4 and 16 tablets. In an aspect, a cavity block (600, 700, 800) of the present disclosure has a capacity for molding between 8 and 100 tablets. In an aspect, a cavity block (600, 700, 800) of the present disclosure has a capacity for molding between 8 and 50 tablets. In an aspect, a cavity block (600, 700, 800) of the present disclosure has a capacity for molding between 8 and 32 tablets. In an aspect, a cavity block (600, 700, 800) of the present disclosure has a capacity for molding between 8 and 16 tablets. In an aspect, a cavity block (600, 700, 800) of the present disclosure has a capacity for molding between 16 and 100 tablets. In an aspect, a cavity block (600, 700, 800) of the present disclosure has a capacity for molding between 16 and 32 tablets.

The present specification provides for and allows modifications to be made to the structure of the core block (500). In one aspect, the present specification provides for a core block (500) having a non-detachable core mold plate (501). In an aspect, the present specification provides for and includes a core mold plate (501) that comprises both an outer frame (510) and a detachable inner plate (520), where the detachable inner plate (520) fits into and is configured to attach to the outer frame (510). After detachment of a detachable inner plate (520) from an outer frame (510), a different detachable inner plate (520) may then be attached to the outer frame (510). This simple detachment-attachment process allows for changes to be made to the molding process, including changes in molding capacity, mold configuration, tablet size, and tablet shape. In an aspect, the detachable inner plate (520) is attached to the outer frame (510). In an aspect, the detachable inner plate (520) is temporarily attached to the outer frame (510). In an aspect, the detachable inner plate (520) is permanently attached to the outer frame (510). In an aspect, the detachable inner plate (520) is detached from the outer frame (510).

The present specification provides for and allows changes to be made to the structure of the cavity blocks (600, 700, 800). In an aspect, the present specification provides for a cavity block (600) having a non-detachable coating mold plate (601). In an aspect, the present specification provides for a cavity block (700) having a non-detachable cavity mold plate (701). In an aspect, the present specification provides for and includes a coating mold plate (601) that comprises both an outer frame (610) and a detachable inner plate (620), where the detachable inner plate (620) fits into and is configured to attach to the outer frame (610). In an aspect, the present specification provides for and includes a cavity mold plate (701) that comprises both an outer frame (710) and a detachable inner plate (720), where the detachable inner plate (720) fits into and is configured to be attached to the outer frame (710). In an aspect, the detachable inner plate (620, 720) is attached to the outer frame (610, 710). In an aspect, the detachable inner plate (620, 720) is temporarily attached to the outer frame (610, 710). In an aspect, the detachable inner plate (620, 720) is permanently attached to the outer frame (610, 710). In an aspect, the detachable inner plate (620, 720) is detached from the outer frame (610, 710).

The present specification provides for and includes a variety of spatial arrangements of mold cavities. The choice of mold cavity arrangement may influence core block (500) or cavity block (600, 700, 800) capacity (e.g., throughput of tablets per mold plate), as well as the efficiency of cooling and/or heating of the mold cavities formed. In an aspect, the wells (502) of a core block (500) of the present disclosure are spatially arranged in a grid orientation. In an aspect, the wells (502) of a core block (500) of the present disclosure are spatially arranged in a hexagonal orientation. In an aspect, the wells (502) of a core block (500) of the present disclosure are spatially arranged in a circular orientation. In an aspect, the wells (502) of a core block (500) of the present disclosure are spatially arranged in an X-shaped orientation. In an aspect, the wells (502) of a core block (500) of the present disclosure are spatially arranged in a square orientation. In an aspect, the wells (502) of a core block (500) of the present disclosure are spatially arranged in a rectangular orientation. In an aspect, the wells (502) of a core block (500) of the present disclosure are spatially arranged in a triangular orientation. In an aspect, the wells (502) of a core block (500) of the present disclosure are spatially arranged in a linear orientation. In an aspect, the wells (502) of a core block (500) of the present disclosure are spatially arranged in a random orientation.

In an aspect, the wells (602) of a first cavity block (600) of the present disclosure are spatially arranged in a grid orientation. In an aspect, the wells (602) of a first cavity block (600) of the present disclosure are spatially arranged in a hexagonal orientation. In an aspect, the wells (602) of a first cavity block (600) of the present disclosure are spatially arranged in a circular orientation. In an aspect, the wells (602) of a first cavity block (600) of the present disclosure are spatially arranged in an X-shaped orientation. In an aspect, the wells (602) of a first cavity block (600) of the present disclosure are spatially arranged in a square orientation. In an aspect, the wells (602) of a first cavity block (600) of the present disclosure are spatially arranged in a rectangular orientation. In an aspect, the wells (602) of a first cavity block (600) of the present disclosure are spatially arranged in a triangular orientation. In an aspect, the wells (602) of a first cavity block (600) of the present disclosure are spatially arranged in a linear orientation. In an aspect, the wells (602) of a first cavity block (600) of the present disclosure are spatially arranged in a random orientation.

In an aspect, the wells (702) of a second cavity block (700) of the present disclosure are spatially arranged in a grid orientation. In an aspect, the wells (702) of a second cavity block (700) of the present disclosure are spatially arranged in a hexagonal orientation. In an aspect, the wells (702) of a second cavity block (700) of the present disclosure are spatially arranged in a circular orientation. In an aspect, the wells (702) of a second cavity block (700) of the present disclosure are spatially arranged in an oval-shaped orientation. In an aspect, the wells (702) of a second cavity block (700) of the present disclosure are spatially arranged in an X-shaped orientation. In an aspect, the wells (702) of a second cavity block (700) of the present disclosure are spatially arranged in a square orientation. In an aspect, the wells (702) of a second cavity block (700) of the present disclosure are spatially arranged in a rectangular orientation. In an aspect, the wells (702) of a second cavity block (700) of the present disclosure are spatially arranged in a triangular orientation. In an aspect, the wells (702) of a second cavity block (700) of the present disclosure are spatially arranged in a linear orientation. In an aspect, the wells (702) of a second cavity block (700) of the present disclosure are spatially arranged in a random orientation.

In an aspect of the present disclosure, an API is present in a pharmaceutical tablet. In an aspect of the present disclosure, a pharmaceutical tablet comprises 5 APIs. In an aspect of the present disclosure, a pharmaceutical tablet comprises more than 4 APIs. In an aspect of the present disclosure, a pharmaceutical tablet comprises 3 APIs. In an aspect of the present disclosure, a pharmaceutical tablet comprises 2 APIs. In an aspect of the present disclosure, a pharmaceutical tablet comprises at least one API. In an aspect of the present disclosure, a pharmaceutical tablet comprises a single API. In an aspect of the present disclosure, no API is present in a pharmaceutical tablet.

In an aspect of the present disclosure, a pharmaceutical tablet comprises between 1 and 5 APIs. In an aspect of the present disclosure, a pharmaceutical tablet comprises between 1 and 4 APIs. In an aspect of the present disclosure, a pharmaceutical tablet comprises between 1 and 3 APIs. In an aspect of the present disclosure, a pharmaceutical tablet comprises between 1 and 2 APIs. In an aspect of the present disclosure, a pharmaceutical tablet comprises between 2 and 5 APIs. In an aspect of the present disclosure, a pharmaceutical tablet comprises between 2 and 4 APIs. In an aspect of the present disclosure, a pharmaceutical tablet comprises between 2 and 3 APIs. In an aspect of the present disclosure, a pharmaceutical tablet comprises between 3 and 5 APIs. In an aspect of the present disclosure, a pharmaceutical tablet comprises between 3 and 4 APIs. In an aspect of the present disclosure, a pharmaceutical tablet comprises between 4 and 5 APIs.

In an aspect of the present disclosure, a non-biologically active component is present in a pharmaceutical tablet. As used herein, a "non-biologically active component" is a compound which has little to no effect upon a given biological target but may be included in a solid dosage form for other reasons. In an aspect of the present disclosure, at least one non-biologically active component is present in a pharmaceutical tablet. In an aspect of the present disclosure, 2 non-biologically active components are present in a pharmaceutical tablet. In an aspect of the present disclosure, 3 non-biologically active components are present in a pharmaceutical tablet. In an aspect of the present disclosure, 4 non-biologically active components are present in a pharmaceutical tablet. In an aspect of the present disclosure, 5 non-biologically active components are present in a pharmaceutical tablet. In an aspect of the present disclosure, between 1 and 2 non-biologically active components are present in a pharmaceutical tablet. In an aspect of the present disclosure, between 1 and 3 non-biologically active components are present in a pharmaceutical tablet. In an aspect of the present disclosure, between 1 and 4 non-biologically active components are present in a pharmaceutical tablet. In an aspect of the present disclosure, between 1 and 5 non-biologically active components are present in a pharmaceutical tablet. In an aspect of the present disclosure, between 2 and 3 non-biologically active components are present in a pharmaceutical tablet. In an aspect of the present disclosure, between 2 and 4 non-biologically active components are present in a pharmaceutical tablet. In an aspect of the present disclosure, between 2 and 5 non-biologically active components are present in a pharmaceutical tablet. In an aspect of the present disclosure, between 3 and 4 non-biologically active components are present in a pharmaceutical tablet. In an aspect of the present disclosure, between 3 and 5 non-biologically active components are present in a pharmaceutical tablet. In an aspect of the present disclosure, between 4 and 5 non-biologically active components are present in a pharmaceutical tablet.

In an aspect of the present disclosure, a mixture of one API and one non-biologically active component is present in a pharmaceutical tablet. In an aspect of the present disclosure, a mixture of at least one API and at least one non-biologically active component is present in a pharmaceutical tablet. In an aspect of the present disclosure, a mixture of at least one API and 2 non-biologically active components is present in a pharmaceutical tablet. In an aspect of the present disclosure, a mixture of at least 2 APIs and 1 non-biologically active component is present in a pharmaceutical tablet. In an aspect of the present disclosure, a mixture of at least 2 APIs and 2 non-biologically active components is present in a pharmaceutical tablet. In an aspect of the present disclosure, a mixture of at least 2 APIs and 3 non-biologically active components is present in a pharmaceutical tablet. In an aspect of the present disclosure, a mixture of at least 2 APIs and 4 non-biologically active components is present in a pharmaceutical tablet. In an aspect of the present disclosure, a mixture of at least 2 APIs and 5 non-biologically active components is present in a pharmaceutical tablet.

The present specification provides for and includes a variety of pharmaceutical tablet shapes and sizes, which may influence the delivery, release, stability, and storage of the API or APIs contained within. The shapes and sizes of pharmaceutical tablets produced are determined by the proper choice of core block (500) and cavity block (600, 700, 800) combinations. A pharmaceutical tablet of the present disclosure may be of any shape and size. In an aspect, a pharmaceutical tablet of the present disclosure is disk-shaped. In an aspect, a pharmaceutical tablet of the present disclosure is oval-shaped. In an aspect, a pharmaceutical tablet of the present disclosure is rod-shaped. In an aspect, a pharmaceutical tablet of the present disclosure is cylindrical. In an aspect, a pharmaceutical tablet of the present disclosure is spherical. In an aspect, a pharmaceutical tablet of the present disclosure is triangular. In an aspect, a pharmaceutical tablet of the present disclosure is rectangular. In an aspect, a pharmaceutical tablet of the present disclosure is square-shaped. In an aspect, a pharmaceutical tablet of the present disclosure is hexagonal. In an aspect, a pharmaceutical tablet of the present disclosure is octagonal. In an aspect, a pharmaceutical tablet of the present disclosure is dimpled. In an aspect, a pharmaceutical tablet of the present may have a convex surface on one side. In an aspect, a pharmaceutical tablet of the present may have a convex surface on 2 sides. In an aspect, a pharmaceutical tablet of the present may have a flat surface on one side. In an aspect, a pharmaceutical tablet of the present may have a flat surface on 2 sides. In an aspect, a pharmaceutical tablet of the present disclosure is heart-shaped. In an aspect, a pharmaceutical tablet of the present disclosure is symmetrical. In an aspect, a pharmaceutical tablet of the present disclosure is non-symmetrical.

A coating-molding apparatus provided for in the present disclosure allows for the continuous production of fully coated, partially coated, or non-coated pharmaceutical tablets by the proper choice of cavity blocks (600, 700, 800) in combination with the proper choice coating materials (or lack thereof) delivered by one or more coating delivery systems (400). In an aspect, a pharmaceutical tablet of the present disclosure may be fully coated. In an aspect, a pharmaceutical tablet of the present disclosure may be uncoated. In an aspect, a pharmaceutical tablet of the present disclosure may be partially coated.

A coating-molding apparatus provided for in the present disclosure also allows for the continuous production of pharmaceutical tablets with multiple coatings by the delivery of successive coats, to each molded tablet. A fully coated pharmaceutical tablet of the present disclosure may comprise a single coating material. A fully coated pharmaceutical tablet of the present disclosure may comprise a first coating material and a second coating material where the first coating material and the second coating material are different. A fully coated pharmaceutical tablet of the present disclosure may comprise a first coating material and a second coating material where the first coating material and a second coating material are identical. A fully coated pharmaceutical tablet of the present disclosure may comprise two or more different coating materials.

A fully coated pharmaceutical tablet of the present disclosure may comprise a first partial coat comprising a first coating material and a second partial coat comprising a second coating material. In a related aspect, the first coating material and the second coating material are identical. In a related aspect, the first partial coat and second partial coat are of identical thicknesses. In a related aspect, the first partial coat and second partial coat are of different thicknesses. In a related aspect, the first partial coat and second partial coat have equal surface areas. In a related aspect, the first partial coat and second partial coat have unequal surface areas. In a related aspect, the first partial coat and second partial coat have the same color. In a related aspect, the first partial coat and second partial coat are of different colors.

A fully coated pharmaceutical tablet of the present disclosure may comprise more than 1 full coat. A fully coated pharmaceutical tablet of the present disclosure may comprise 2 full coats. A fully coated pharmaceutical tablet of the present disclosure may comprise 2 full coats where the second coat fully covers the first coat. A fully coated pharmaceutical tablet of the present disclosure may comprise 2 full coats where the second coat partially covers the first coat. A fully coated pharmaceutical tablet of the present disclosure may comprise 3 full coats. A fully coated pharmaceutical tablet of the present disclosure may comprise 4 full coats. A fully coated pharmaceutical tablet of the present disclosure may comprise 5 full coats. A fully coated pharmaceutical tablet of the present disclosure may comprise between 1 and 2 full coats. A fully coated pharmaceutical tablet of the present disclosure may comprise between 1 and 3 full coats. A fully coated pharmaceutical tablet of the present disclosure may comprise between 1 and 4 full coats. A fully coated pharmaceutical tablet of the present disclosure may comprise between 1 and 5 full coats. A fully coated pharmaceutical tablet of the present disclosure may comprise between 2 and 3 full coats. A fully coated pharmaceutical tablet of the present disclosure may comprise between 2 and 4 full coats. A fully coated pharmaceutical tablet of the present disclosure may comprise between 2 and 5 full coats. A fully coated pharmaceutical tablet of the present disclosure may comprise between 3 and 5 full coats. A fully coated pharmaceutical tablet of the present disclosure may comprise between 4 and 5 full coats.

A partially coated pharmaceutical tablet of the present disclosure may comprise a single partial coat. A partially coated pharmaceutical tablet of the present disclosure may comprise more than one partial coat. A partially coated pharmaceutical tablet of the present disclosure may comprise 2 partial coats. A partially coated pharmaceutical tablet of the present disclosure may comprise 3 partial coats. A partially coated pharmaceutical tablet of the present disclosure may comprise 4 partial coats. A partially coated pharmaceutical tablet of the present disclosure may comprise 5 partial coats. A partially coated pharmaceutical tablet of the present disclosure may comprise between 1 and 2 partial coats. A partially coated pharmaceutical tablet of the present disclosure may comprise between 1 and 3 partial coats. A partially coated pharmaceutical tablet of the present disclosure may comprise between 1 and 4 partial coats. A partially coated pharmaceutical tablet of the present disclosure may comprise between 1 and 5 partial coats. A partially coated pharmaceutical tablet of the present disclosure may comprise between 2 and 3 partial coats. A partially coated pharmaceutical tablet of the present disclosure may comprise between 2 and 4 partial coats. A partially coated pharmaceutical tablet of the present disclosure may comprise between 2 and 5 partial coats. A partially coated pharmaceutical tablet of the present disclosure may comprise between 3 and 4 partial coats. A partially coated pharmaceutical tablet of the present disclosure may comprise between 3 and 5 partial coats. A partially coated pharmaceutical tablet of the present disclosure may comprise between 4 and 5 partial coats.

A fully coated pharmaceutical tablet of the present disclosure may comprise a full coat and an additional partial coat. A fully coated pharmaceutical tablet of the present disclosure may comprise a full coat and 2 additional partial coats. A fully coated pharmaceutical tablet of the present disclosure may comprise a full coat and 3 additional partial coats. A fully coated pharmaceutical tablet of the present disclosure may comprise a full coat and 4 additional partial coats. A fully coated pharmaceutical tablet of the present disclosure may comprise a full coat and 5 additional partial coats. A fully coated pharmaceutical tablet of the present disclosure may comprise a full coat and between 1 and 2 partial coats. A fully coated pharmaceutical tablet of the present disclosure may comprise a full coat and between 1 and 3 partial coats. A fully coated pharmaceutical tablet of the present disclosure may comprise a full coat and between 1 and 4 partial coats. A fully coated pharmaceutical tablet of the present disclosure may comprise a full coat and between 1 and 5 partial coats. A fully coated pharmaceutical tablet of the present disclosure may comprise a full coat and between 2 and 3 partial coats. A fully coated pharmaceutical tablet of the present disclosure may comprise a full coat and between 2 and 4 partial coats. A fully coated pharmaceutical tablet of the present disclosure may comprise a full coat and between 2 and 5 partial coats. A fully coated pharmaceutical tablet of the present disclosure may comprise a full coat and between 3 and 4 partial coats. A fully coated pharmaceutical tablet of the present disclosure may comprise a full coat and between 3 and 5 partial coats. A fully coated pharmaceutical tablet of the present disclosure may comprise a full coat and between 4 and 5 partial coats.

A type of coating material of the present disclosure may be selected from the group consisting of a sugar coating, a seal coating, an enteric coating, and a film coating.

A coating material of the present disclosure may be selected from the group consisting of sugars, waxes, celluloses, fatty acids, and any mixtures thereof.

An excipient of the present disclosure may be selected from the group consisting of polyvinylpyrrolidone (PVP), vinylpyrrolidone-vinyl acetate copolymer (PVP-PVAc), ethyl vinyl acetate (EVA), polyvinyl alcohol (PVA), polyvinyl acetate (PVAc), polyethylene glycol (PEG), polyethylene oxide (PEO), cellulose ethers, cellulose esters, carboxymethyl cellulose (CMC), methylcellulose (MC), hydroxyethyl cellulose (HEC), hydroxypropyl methyl cellulose (HPMC), hydroxyethyl methyl cellulose (HEMC), hydroxypropyl cellulose (HPC), ethylcellulose (EC), cellulose acetate phthalate (CAP), polyvinyl acetate phthalate (PVAP), cellulose acetate trimellitate (CAT), cellulose acetate butyrate (CAB), poly(alkyl)methacrylates, poly(methyl)methacrylates (PMMA), acrylate ester copolymers, methacrylate copolymers, ammonium methacrylate copolymer, methacrylic acid copolymers, methacrylic acid-ethyl acrylate copolymers, neutral methacrylate copolymers, polyvinyl caprolactam-polyvinyl acetate-polyethylene glycol graft copolymer (PEG-VCap-VAc); polyglycolide (PGA), poly(L-lactide) (PLA), poly(L-lactide-coglycolide) copolymers (PLGA), poly(ε-caprolactone) (PCL), polysaccharides, maltodextrin, starch, modified starches, pullulan, sugar alcohols, sorbitol, mannitol, maltitol, erythritol, xylitol, isomalt, lactitol, thermoplastic polyurethanes, shellac, zein, chitosan, carrageenan, alginic acid polymer, xanthum gum, gelatin, polyanhydrides, fatty acids, fatty alcohols, fatty acid esters, waxes, and any mixtures thereof.

The present specification provides for and includes multiple extruder barrel segments for the establishment of temperature gradients as the hot melt flows through the extruder barrel. In an aspect, the extruder barrel (101) of the present disclosure comprises 5 extruder barrel segments. In an aspect, the extruder barrel (101) of the present disclosure comprises 4 extruder barrel segments. In an aspect, the extruder barrel (101) of the present disclosure comprises 3 extruder barrel segments. In an aspect, the extruder barrel (101) of the present disclosure comprises 2 extruder barrel segments. In an aspect, the extruder barrel (101) of the present disclosure comprises a single extruder barrel segment. In an aspect, the extruder barrel (101) of the present disclosure comprises between 1 and 5 extruder barrel segments. In an aspect, the extruder barrel (101) of the present disclosure comprises between 1 and 4 extruder barrel segments. In an aspect, the extruder barrel (101) of the present disclosure comprises between 1 and 3 extruder barrel segments. In an aspect, the extruder barrel (101) of the present disclosure comprises between 1 and 2 extruder barrel segments. In an aspect, the extruder barrel (101) of the present disclosure comprises between 2 and 5 extruder barrel segments. In an aspect, the extruder barrel (101) of the present disclosure comprises between 2 and 4 extruder barrel segments. In an aspect, the extruder barrel (101) of the present disclosure comprises between 2 and 3 extruder barrel segments. In an aspect, the extruder barrel (101) of the present disclosure comprises between 3 and 5 extruder barrel segments. In an aspect, the extruder barrel (101) of the present disclosure comprises between 3 and 4 extruder barrel segments. In an aspect, the extruder barrel (101) of the present disclosure comprises between 4 and 5 extruder barrel segments.

The present specification provides for and includes the use of in-line detection instruments for the purpose of monitoring physical, chemical, electronic, and spectroscopic properties of the hot melt during the extrusion process prior to molding-coating. In an aspect, an in-line detection instrument may be chosen from the group consisting of a Fourier transformation near-infrared spectrometer, a Raman spectrometer, an ultraviolet-visible spectrometer, a high performance liquid chromatography instrument, a pH meter, an electrical conductivity meter, a pressure sensor, a fluorescence spectrometer, and a mass spectrometer. In an aspect, one or more in-line detection instrument may be chosen from the group consisting of a Fourier transformation near-infrared spectrometer, a Raman spectrometer, an ultraviolet-visible spectrometer, a high performance liquid chromatography instrument, a pH meter, an electrical conductivity meter, a pressure sensor, a fluorescence spectrometer, and a mass spectrometer. In a preferred aspect, a detection instrument is a Raman spectrometer. In a preferred aspect, a detection instrument is a near-infrared spectrometer.

In an aspect, a transfer manifold (116) of the present disclosure comprises 10 in-line detector ports (110). In an aspect, a transfer manifold (116) of the present disclosure comprises 9 in-line detector ports (110). In an aspect, a transfer manifold (116) of the present disclosure comprises 8 in-line detector ports (110). In an aspect, a transfer manifold (116) of the present disclosure comprises 7 in-line detector ports (110). In an aspect, a transfer manifold (116) of the present disclosure comprises 6 in-line detector ports (110). In an aspect, a transfer manifold (116) of the present disclosure comprises 5 in-line detector ports (110). In an aspect, a transfer manifold (116) of the present disclosure comprises 4 in-line detector ports (110). In an aspect, a transfer manifold (116) of the present disclosure comprises 3 in-line detector ports (110). In an aspect, a transfer manifold (116) of the present disclosure comprises 2 in-line detector ports (110). In an aspect, a transfer manifold (116) of the present disclosure comprises at least 1 in-line detector port (110). In an aspect, a transfer manifold (116) of the present disclosure comprises an in-line detector port (110).

In an aspect, a transfer manifold (116) of the present disclosure comprises between 1 and 10 in-line detector ports (110). In an aspect, a transfer manifold (116) of the present disclosure comprises between 1 and 5 in-line detector ports (110). In an aspect, a transfer manifold (116) of the present disclosure comprises between 1 and 4 in-line detector ports (110). In an aspect, a transfer manifold (116) of the present disclosure comprises between 1 and 3 in-line detector ports (110). In an aspect, a transfer manifold (116) of the present disclosure comprises 1 or 2 in-line detector ports (110). In an aspect, a transfer manifold (116) of the present disclosure comprises between 2 and 10 in-line detector ports (110). In an aspect, a transfer manifold (116) of the present disclosure comprises between 2 and 5 in-line detector ports (110). In an aspect, a transfer manifold (116) of the present disclosure comprises between 2 and 4 in-line detector ports (110). In an aspect, a transfer manifold (116) of the present disclosure comprises 2 or 3 in-line detector ports (110). In an aspect, a transfer manifold (116) of the present disclosure comprises between 3 and 10 in-line detector ports (110). In an aspect, a transfer manifold (116) of the present disclosure comprises between 3 and 5 in-line detector ports (110). In an aspect, a transfer manifold (116) of the present disclosure comprises between 4 and 6 in-line detector ports (110). In an aspect, a transfer manifold (116) of the present disclosure comprises between 5 and 10 in-line detector ports (110).

In an aspect, one or more in-line detector ports (110) are not connected to any in-line detection instruments. In an aspect, one or more in-line detector ports (110) are connected to one in-line detection instrument. In an aspect, one or more in-line detector ports (110) are connected to one or more in-line detection instruments.

The coordination of individual steps of the molding-coating process provided in the present disclosure allows injection molding, a traditionally discontinuous process, to be performed in a continuous manner. Referring to FIG. 9A-9J, an example of a full cycle of forming, coating, and ejecting fully coated pharmaceutical tablets within a single core block (500) joined to the molding frame (207) of a mold unit (200) where the molding frame (207) comprises four positions is provided. A full molding, coating, and ejection cycle can be described by a sequence of 10 discrete steps, which may or may not be performed with pauses of varying time periods between any two successive steps. A person of skill in the art, in view of the present specification, would understand that this process may be applied simultaneously to multiple core blocks (500) joined to multiple positions of a molding frame (207).

Figure 9A:
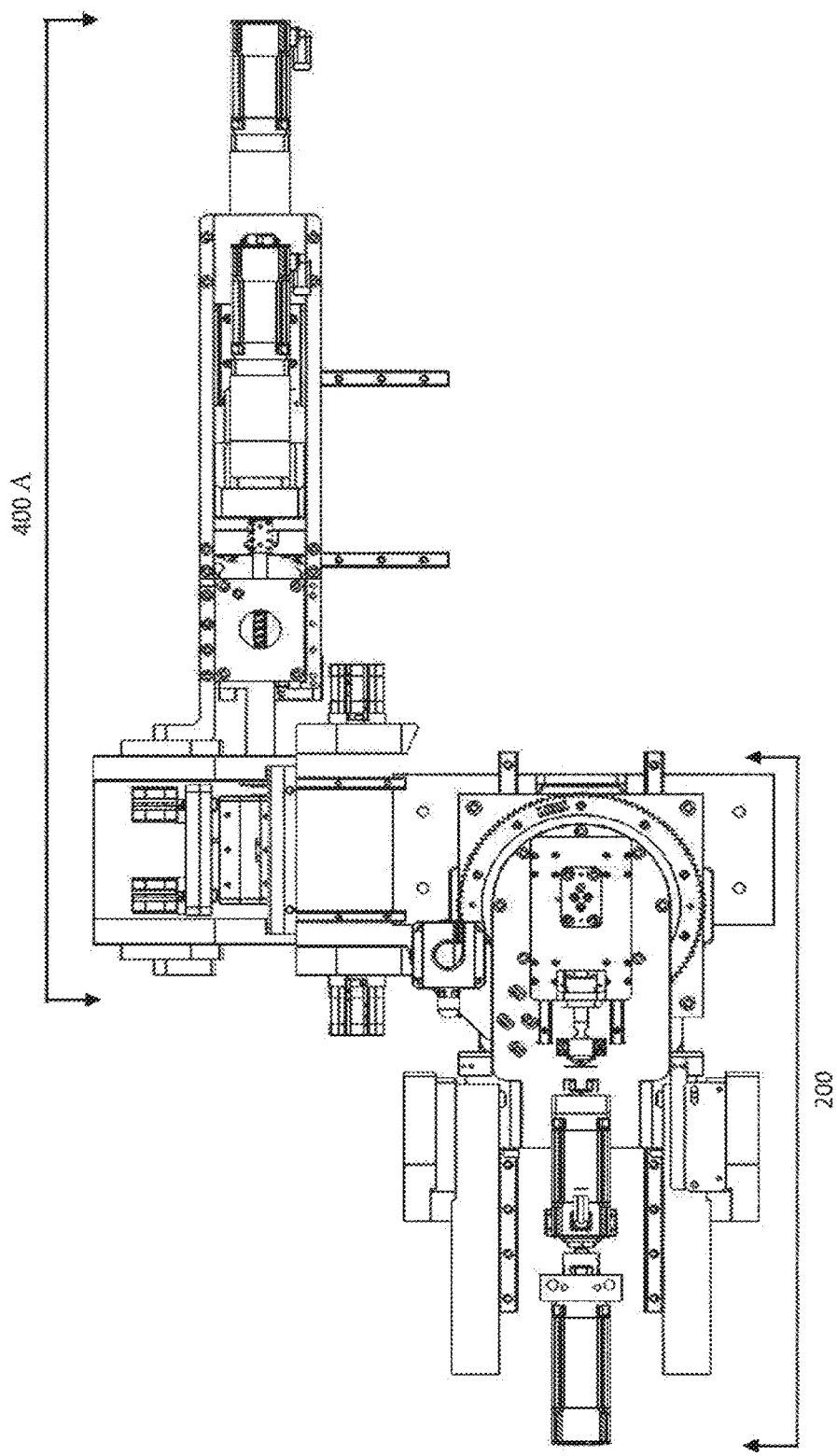
FIG. 9A-9J provides an example of the component relationships during the step-by-step process for the formation, coating, and ejection of fully coated pharmaceutical tablets within a single core block (500) joined to the molding frame (207) of a mold unit (200) as follows.
Figure 9B:
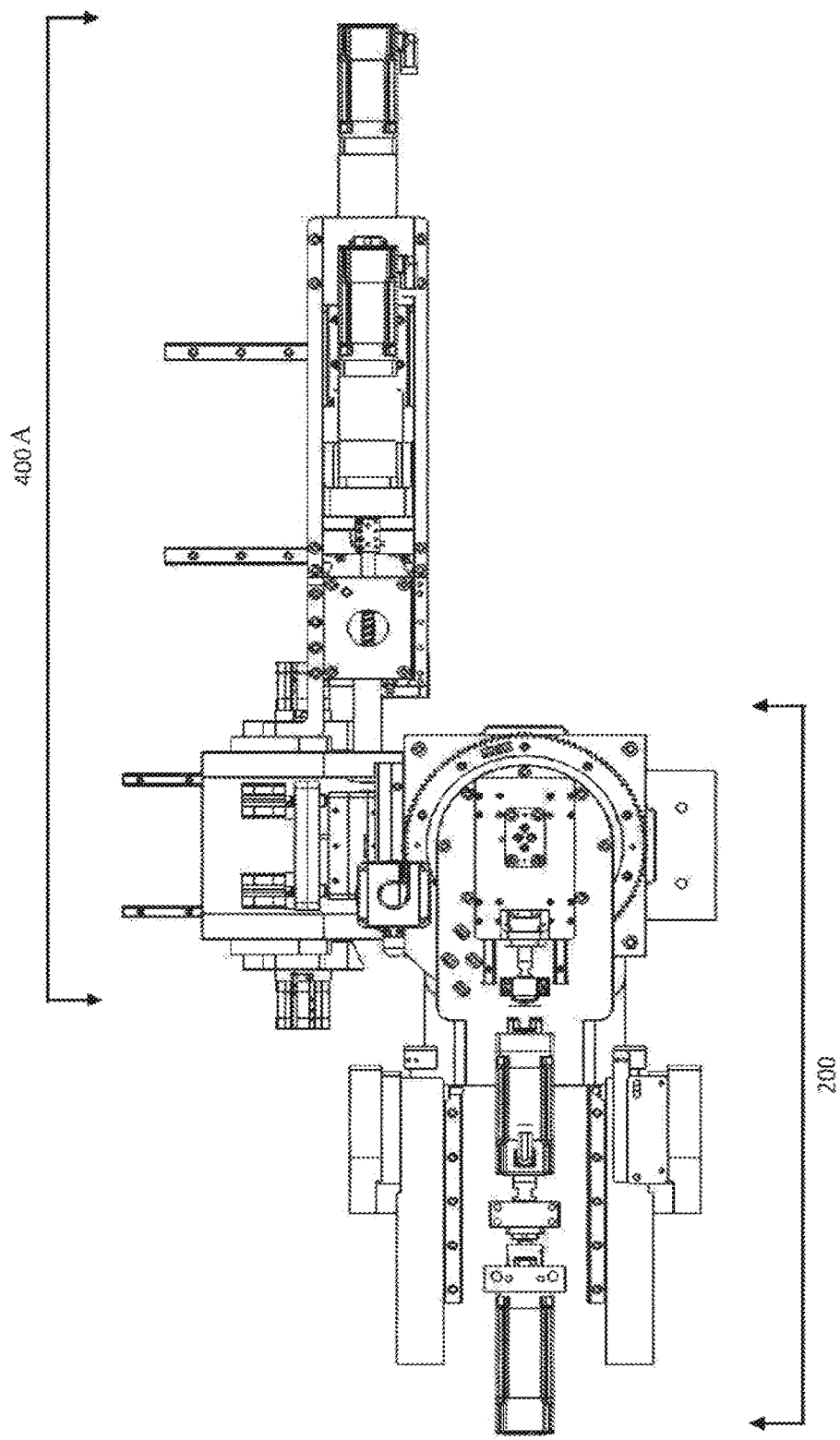
Figure 9C:
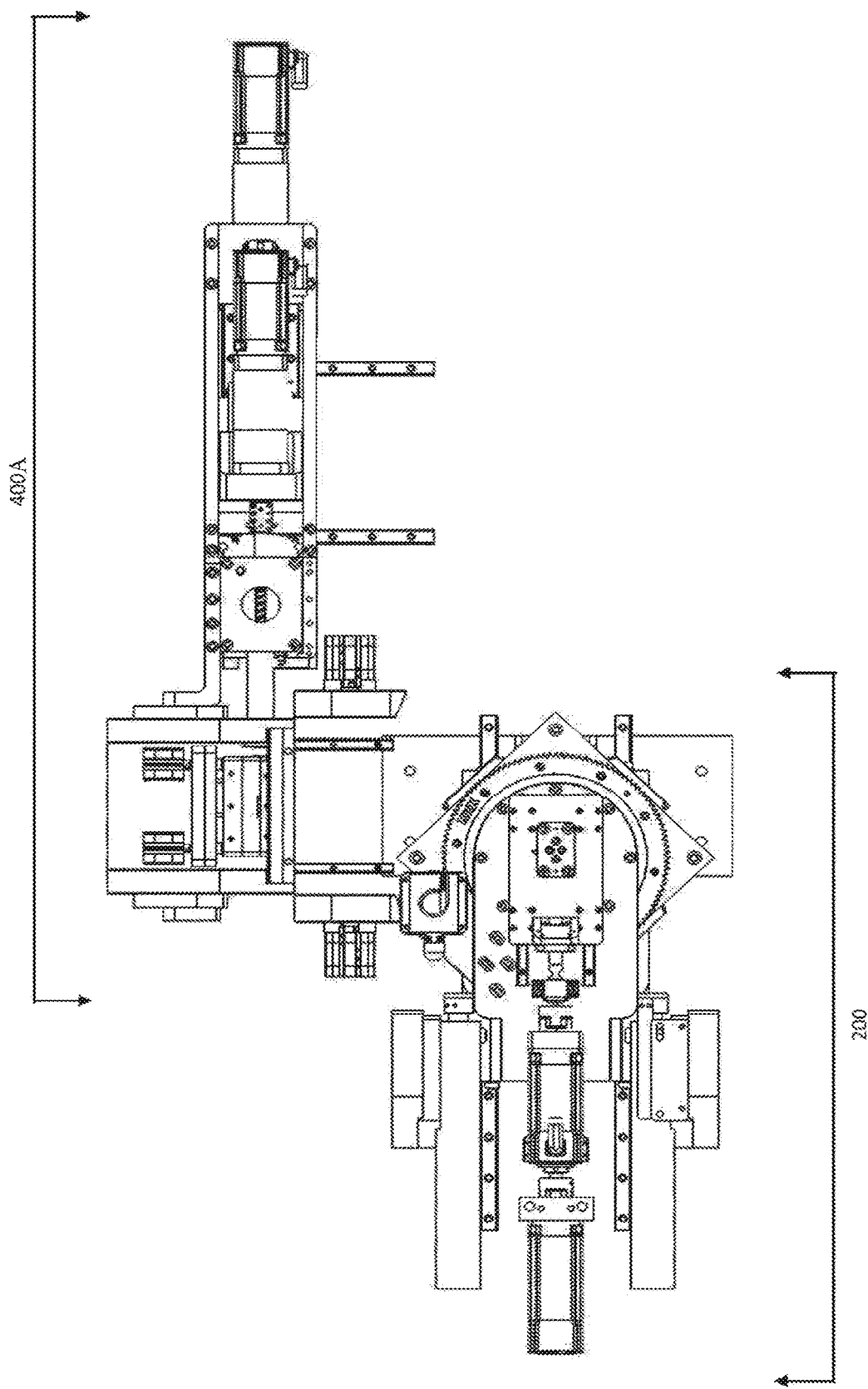
Figure 9D:
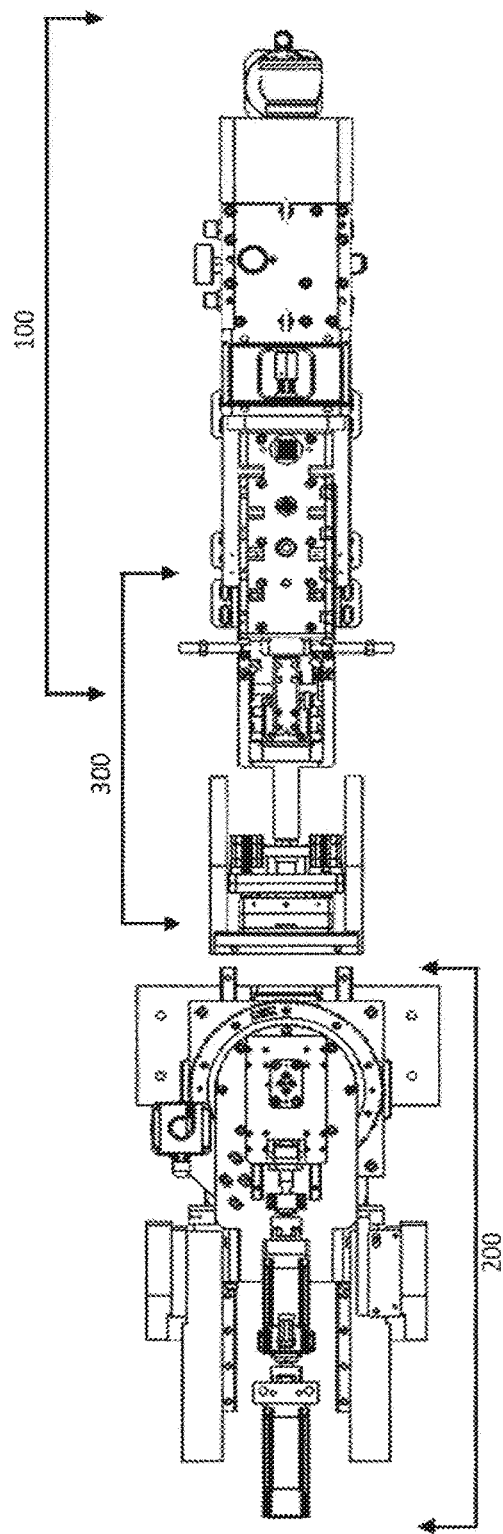
Figure 9E:
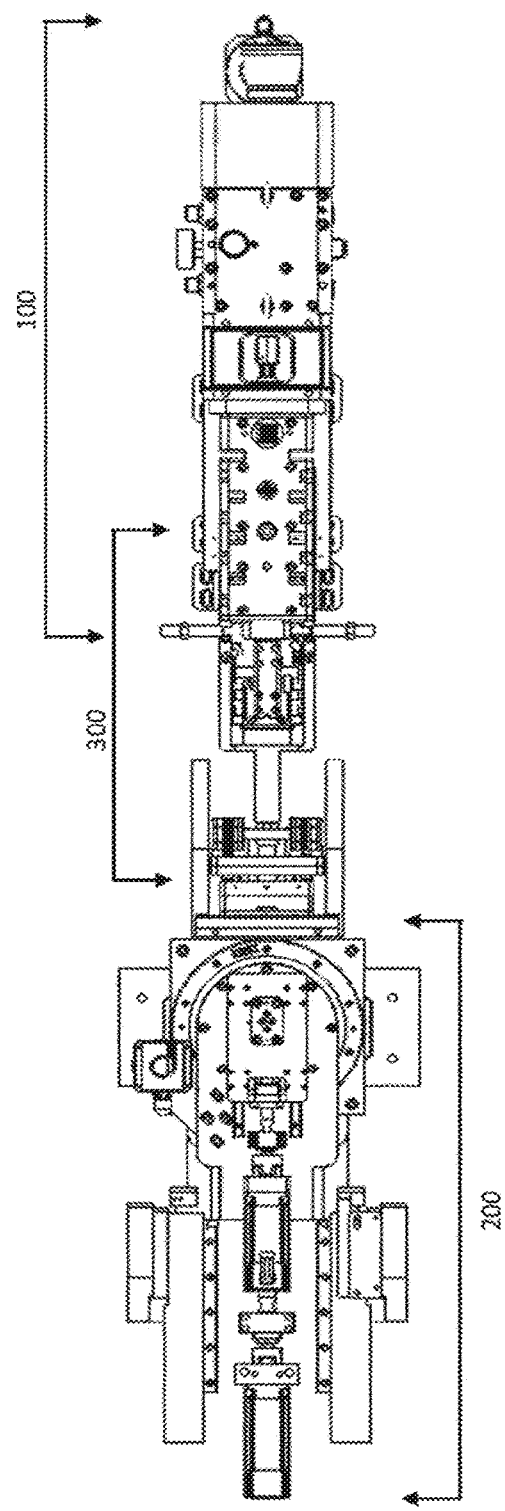
Figure 9F:
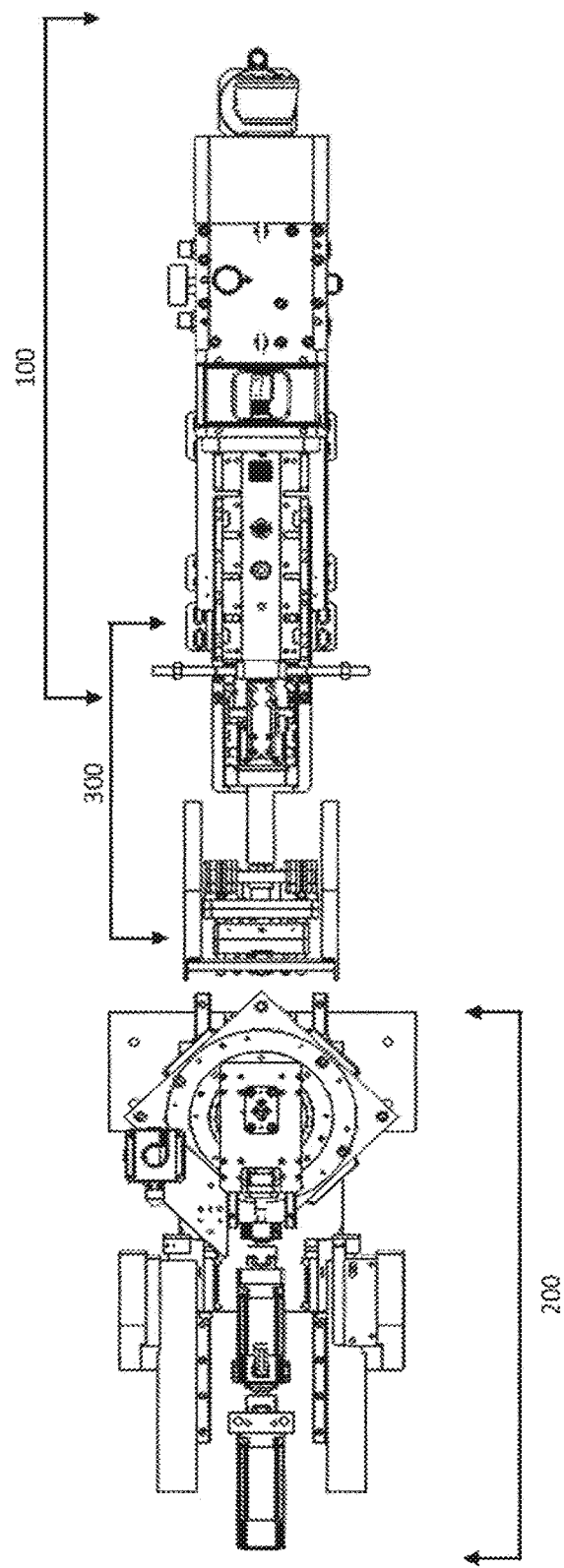
Figure 9G:
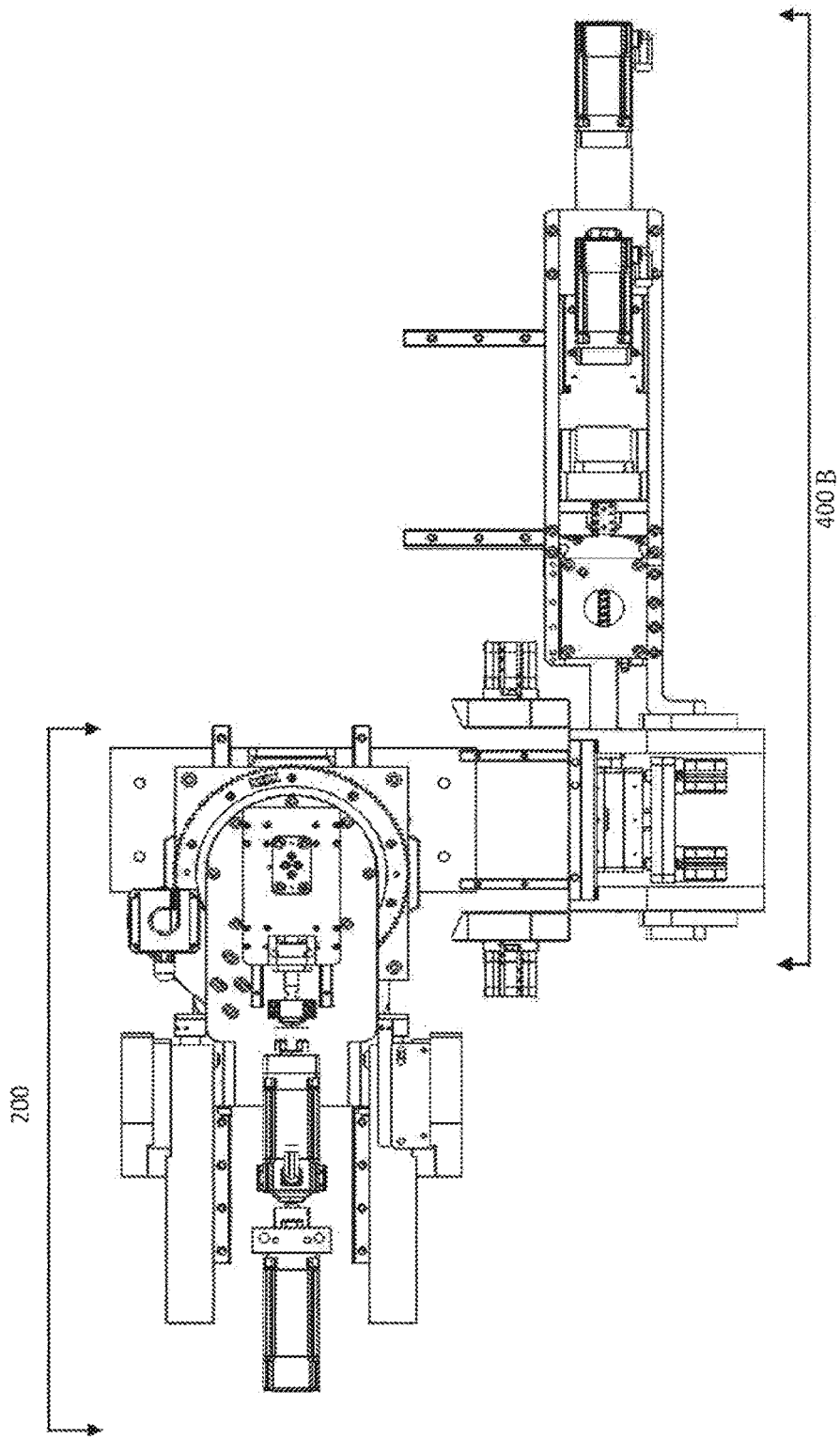
Figure 9H:
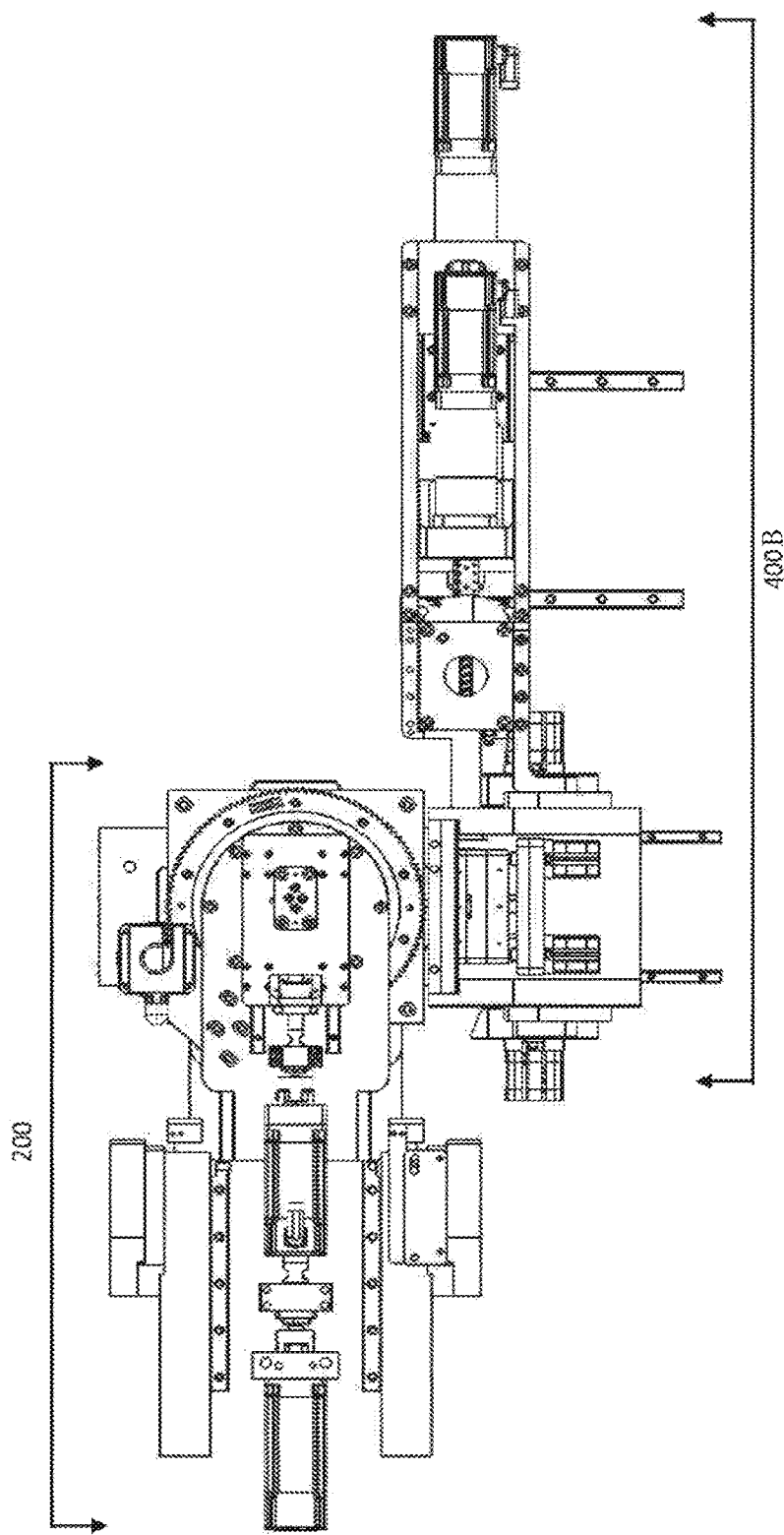
Figure 9I:
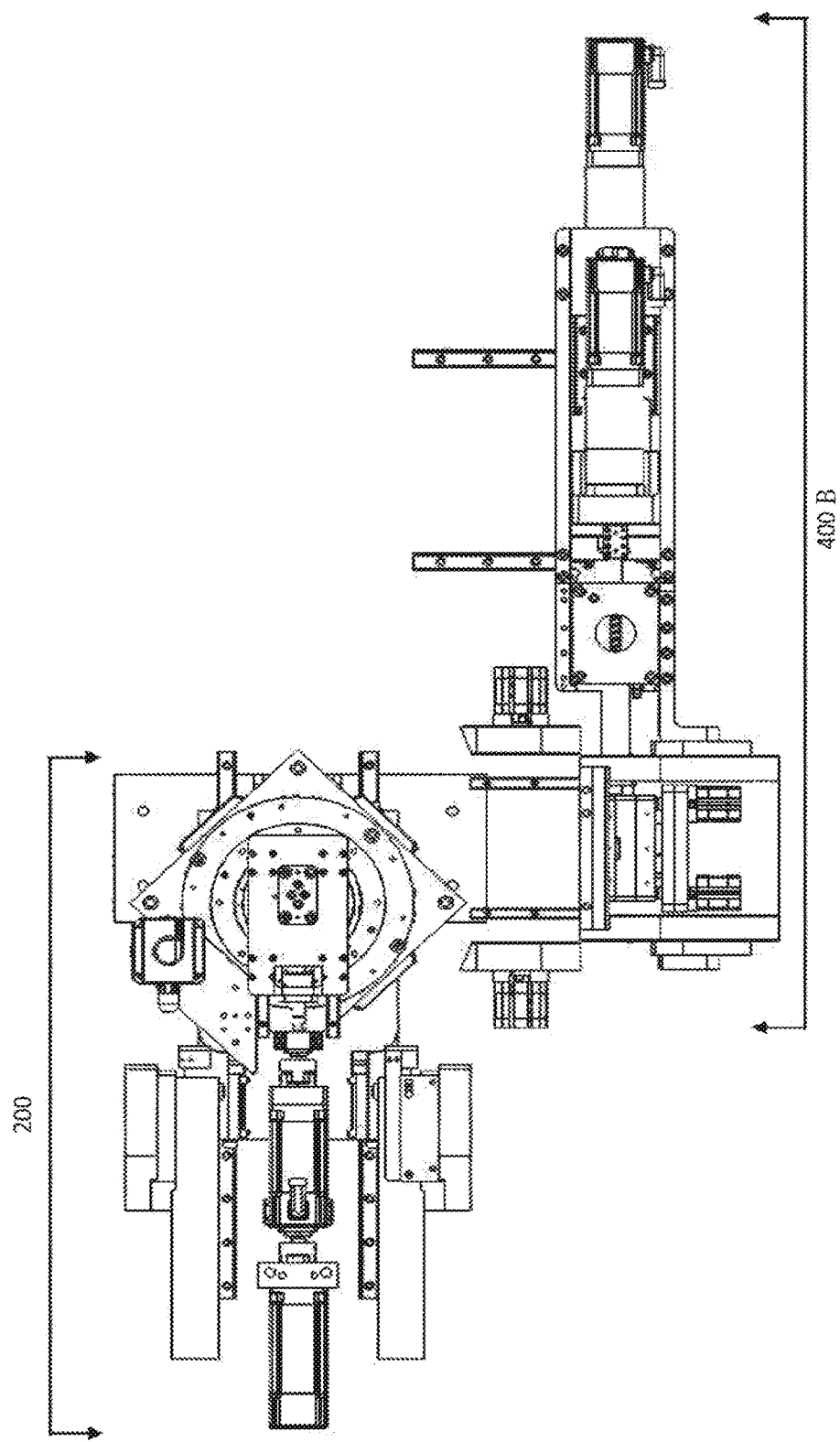
Figure 9J:
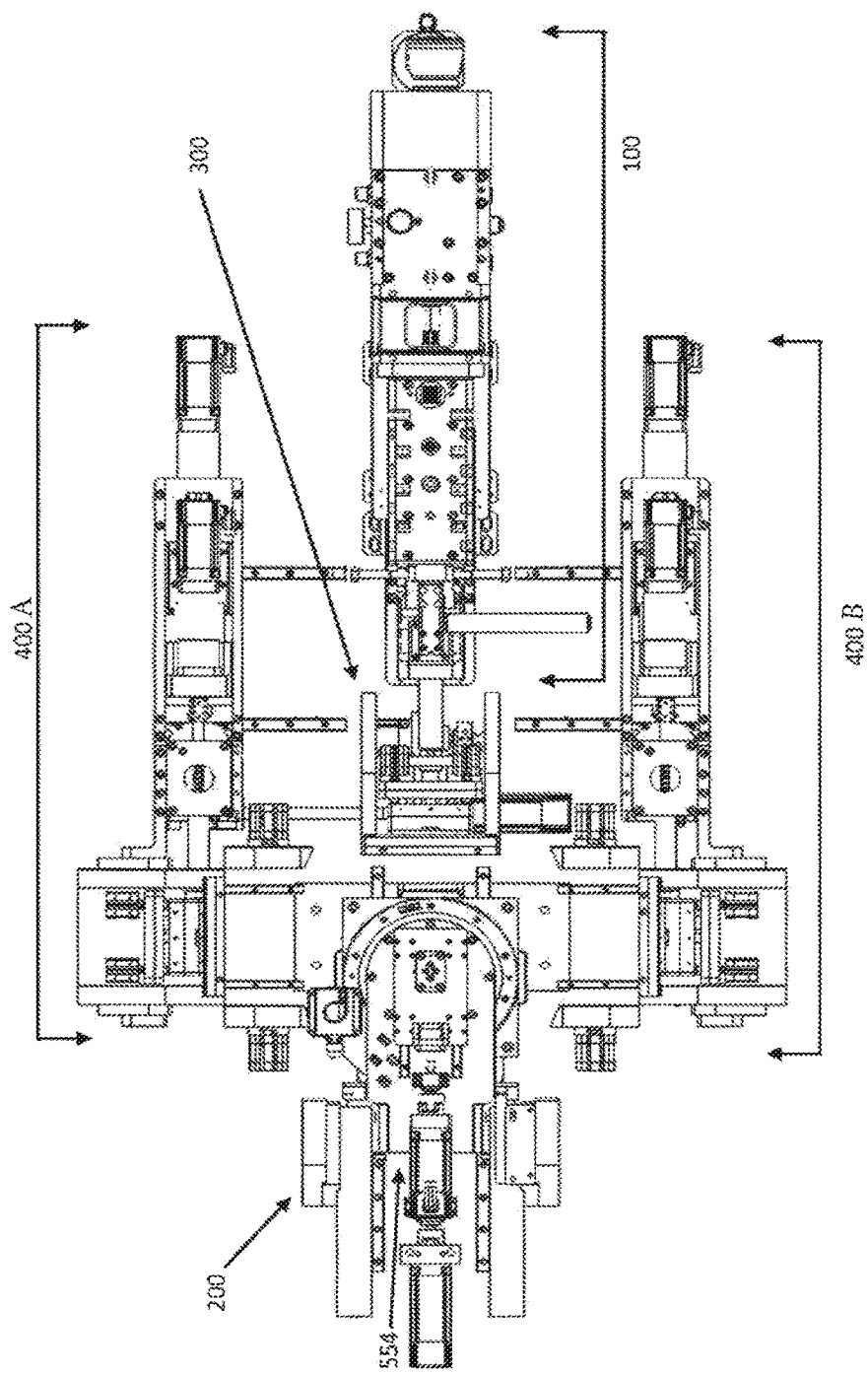

Referring to FIG. 9A, in an initial step, a mold unit (200) at a first position is disengaged from, but in proximity to, a first coating delivery system (400A). Referring to FIG. 9B, in a second step, the first coating delivery system (400A) moves to engage the mold unit (200) at a first position, allowing a first coating material to be injected from the first coating delivery system (400A) and into the core block (500) attached to the molding frame (207). Referring to FIG. 9C, in a third step, the first coating delivery system (400A) moves to disengage from the mold unit (200), and the molding frame (207) rotates clockwise toward a second position. Referring to FIG. 9D, in a fourth step, the rotation of the molding frame (207) to a second position is complete, putting the core block (500) attached to the molding frame (207) in proximity to, but disengaged from, a core injector unit (300). Referring to FIG. 9E, in a fifth step, the core injector unit (300) moves to engage the a mold unit (200) at a second position, allowing a hot melt to be injected rom the core injector unit (300) and into the core block (500) attached to the molding frame (207). Referring to FIG. 9F, in a sixth step, the core injector unit (300) moves to disengage from the mold unit (200), and the molding frame (207) rotates clockwise toward a third position. Referring to FIG. 9G, in a seventh step, the rotation of the molding frame (207) to a third position is complete, putting the core block (500) attached to the molding frame (207) in proximity to, but disengaged from, a second coating delivery system (400B). Referring to FIG. 9H, in an eighth step, the second coating delivery system (400B) moves to engage the mold unit (200) at a third position, allowing a second coating material to be injected from the second coating delivery system (400B) and into the core block (500) attached to the molding frame (207). Referring to FIG. 9I, in a ninth step, the second coating delivery system (400B) moves to disengage from the mold unit (200), and the molding frame (207) rotates clockwise toward a fourth position. Referring to FIG. 9J, in a final step, the rotation of the molding frame (207) to a fourth position is complete, allowing the ejection of coated pharmaceutical tablets from the core block (500) of the mold unit (200). FIG. 9J includes the first coating delivery system (400A), core injector unit (300), and second coating delivery system (400B) all in proximity to, but disengaged from, the mold unit (200).

A person of skill in the art, in view of the present specification, would understand this general process of forming, coating, and ejecting coated pharmaceutical tablets within a core block (500) may be applied to a molding frame (207) comprising any number of positions and type of molding frame (207) configuration and design. Further, a person of skill in the art would understand this general process of forming, coating, and ejecting coated pharmaceutical tablets may be applied to a molding frame (207) comprising any number of core blocks. Even further, a person of skill in the art would understand that any of the steps of this general process of forming, coating, and ejecting coated pharmaceutical tablets may be performed simultaneously on these any number of core blocks for a prolonged period of time as a continuous process.

Figure 10:
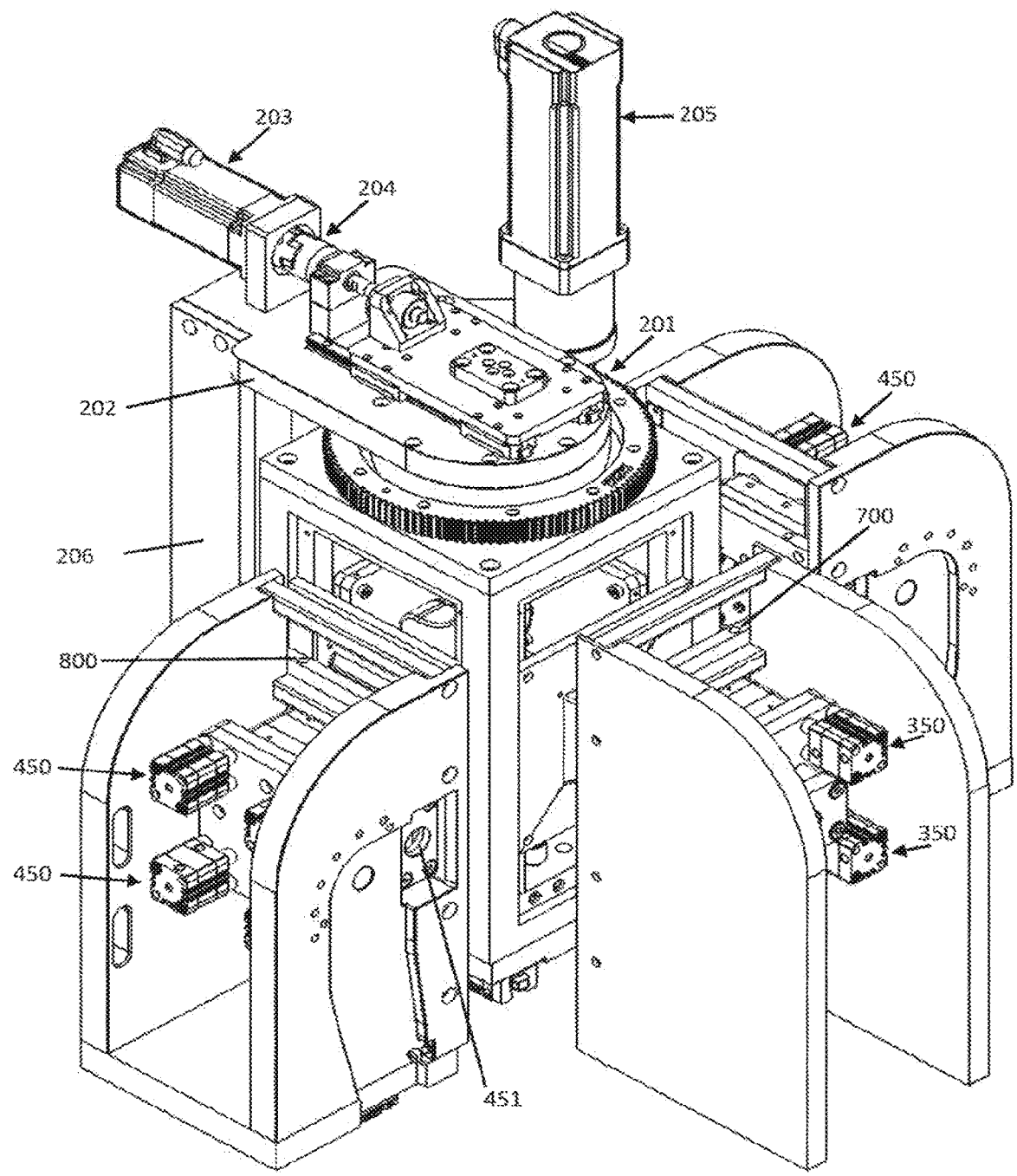
FIG. 10 is an isomeric view of an exemplary mold unit (200) disengaged from, but in proximity to, two exemplary coating delivery systems (400A, 400B) and an exemplary coating injection unit (300).
Figure 11A:
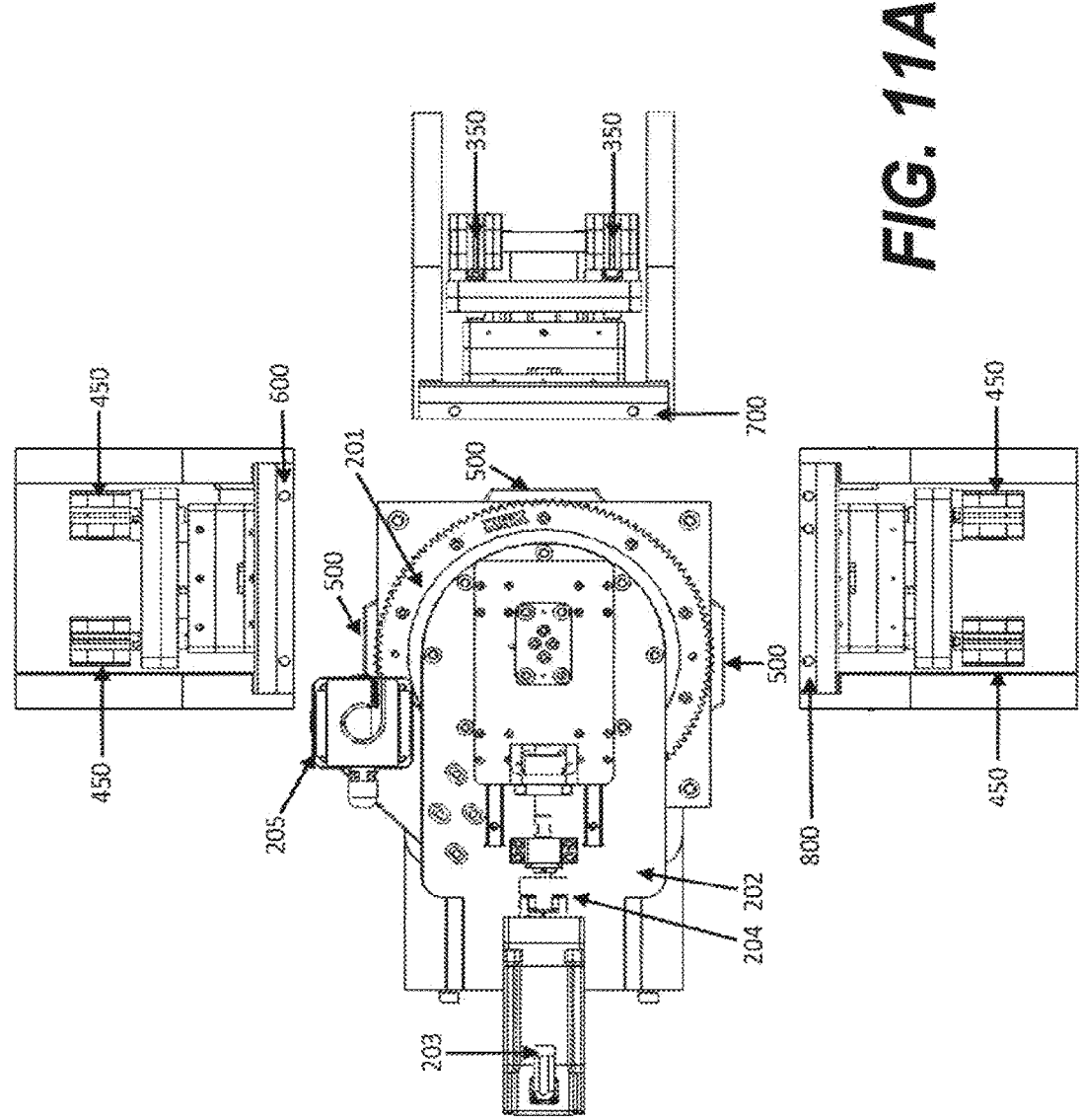
FIG. 11A is a top view of an exemplary mold unit (200) comprising four exemplary core blocks (500, three are visible and a fourth is obscured) which is fully disengaged from an exemplary first coating delivery system injector comprising an exemplary first cavity block (600), an exemplary core injection unit injector comprising an exemplary second cavity block (700), and an exemplary second coating delivery system injector comprising an exemplary third cavity block (800).
Figure 11B:
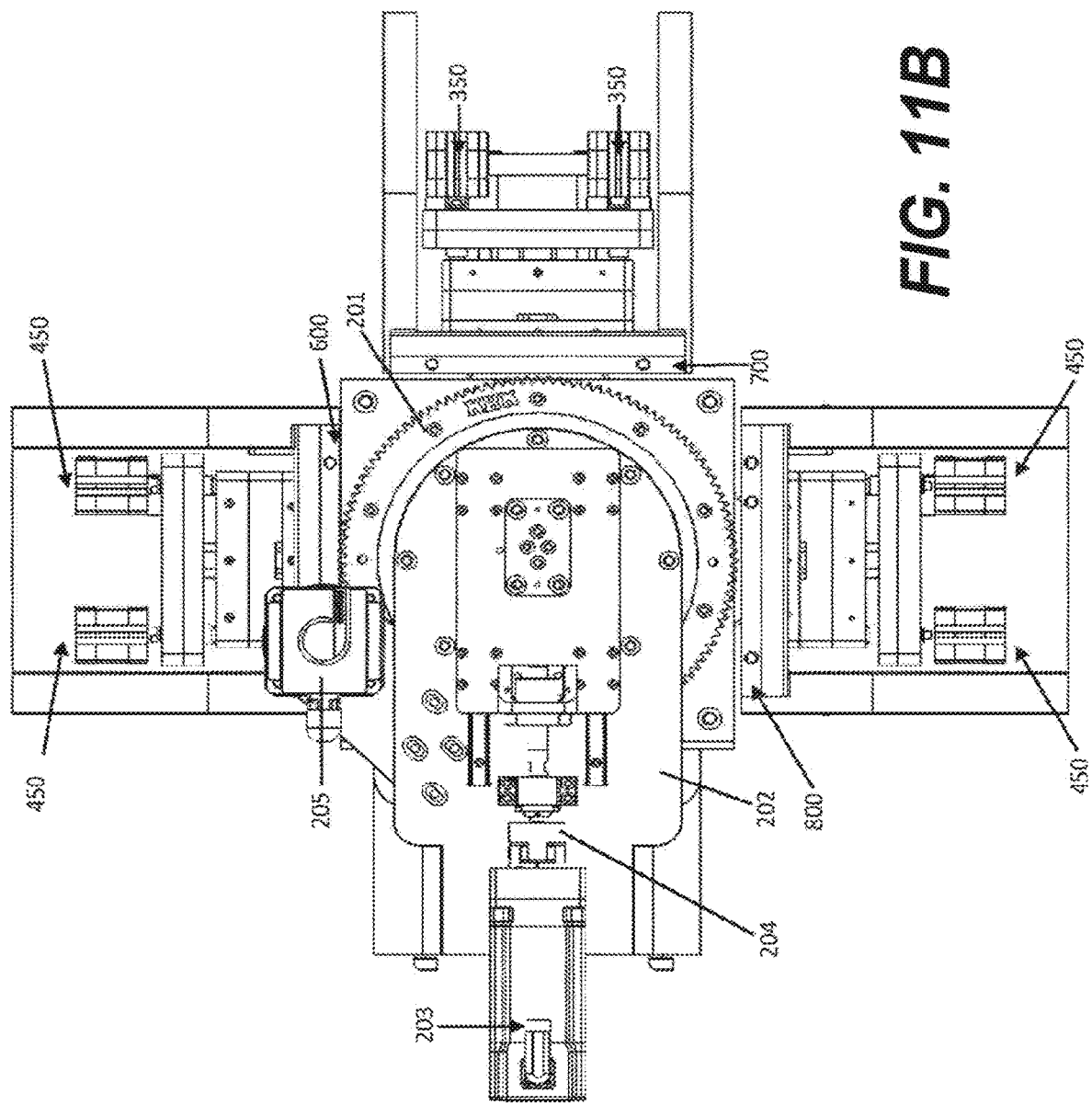
FIG. 11B is a top view of an exemplary mold unit (200) comprising four exemplary core blocks (500, each obscured) fully engaged with an exemplary first coating delivery system injector comprising an exemplary first cavity block (600), an exemplary core injector comprising an exemplary second cavity block (700), and an exemplary second coating delivery system injector comprising an exemplary third cavity block (800), where each cavity block forms a temporary mold with a corresponding core block (500) of the mold unit (200).

Referring to FIGS. 10 and 11A-11B, an example of a mold unit (200) comprising a molding frame (207) comprising four core blocks (500) at four positions is shown. In FIGS. 10 and 11A, a mold unit (200) is shown to be fully disengaged from a core injector unit (300) and two coating injection units (400) in proximity to the mold unit (200). In FIG. 11B, three out of four core blocks (500) of molding frame (207) are fully engaged with the core injector unit (300) and two coating injection units (400), allowing the simultaneous injection of a first coating material in a first temporary mold at a first position, injection of a hot melt into a second temporary mold at a second position, the injection of a second coating material into a third temporary mold at a third position, and the ejection of fully coated pharmaceutical tablets at a fourth position.

A person of skill in the art, in view of the present specification, would understand this simultaneous process of forming, coating, and ejecting coated pharmaceutical tablets may apply to any number of core blocks (500) attached to a molding frame (207). Further, a person of skill in the art would understand that this simultaneous process of forming, coating, and ejecting coated pharmaceutical tablets within any number of core blocks (500) attached to a molding frame (207) may be performed for a prolonged period of time as a continuous process.

The apparatus as described may be used for the molding of coated pharmaceutical tablets by a continuous process incorporating a continuous source of hot melt for incorporation into pharmaceutical tablets produced. In aspects according to the present disclosure, a method is provided for producing coated pharmaceutical tablets by an integrated, continuous process comprising: (i) providing a machine according to claim 1 comprising a mold unit (200) comprising a molding frame (207) comprising at least one core block (500) and rotatable to at least four positions, and a continuous source of a hot melt comprising an active pharmaceutical ingredient and one or more excipients; (ii) forming a half coat within the at least one core block (500) by (a) joining and placing a first cavity block (600) in fluid communication with a first coating delivery system (400A) and the at least one core block (500) to form a first temporary mold in a first position; (b) injecting a first coating material into the first temporary mold to form a half coat; (c) separating the first temporary mold to provide at least one core block (500) comprising a half coat; and (d) rotating the molding frame (207) to a second position; (ii) forming half coated pharmaceutical pre-tablets by (a) joining and placing a second cavity block (700) in fluid communication with a piston barrel injection chamber (325) fitted with a retractable piston (321) and a port to introduce the hot melt into the piston barrel injection chamber (325) and the at least one core block (500) comprising a half coat to form a second temporary mold, (b) injecting the hot melt into the second temporary mold by extending the retractable piston (321) into the piston barrel injection chamber (325) to form half coated pharmaceutical pre-tablets, (c) separating the second temporary mold to provide at least one core block (500) comprising half coated pharmaceutical pre-tablets while simultaneously initiating retraction of the retractable piston (321) to expand the piston barrel injection chamber (325) and accommodate a flow of the hot melt from said continuous source, and (d) rotating the molding frame (207) to a third position; (iii) forming fully coated pharmaceutical tablets by (a) joining and placing a third cavity block (800) in fluid communication with a second coating system (400B) and the at least one core block (500) comprising half coated pharmaceutical pre-tablets to form a third temporary mold, (b) injecting a second coating material into the third temporary mold to form fully coated pharmaceutical tablets, (c) separating the third temporary mold to provide at least one core block (500) comprising fully coated pharmaceutical tablets, and (d) rotating the molding frame (207) to a fourth position; and (iv) ejecting the fully coated pharmaceutical tablets from the at least one core block comprising fully coated pharmaceutical tablets and then rotating the molding frame (207) to a different position.

In further aspects according to the present disclosure, the molding frame (207) comprises additional core blocks, wherein each additional core block (500) is located at a different position of the molding frame (207). In even further aspects according to the present disclosure, steps (i) to (iv) are performed simultaneously where the forming steps (i), (ii), and (iii), and the ejecting steps (iv) are determined by the positions of the additional core blocks (500) on the molding frame (207).

Figure 12:
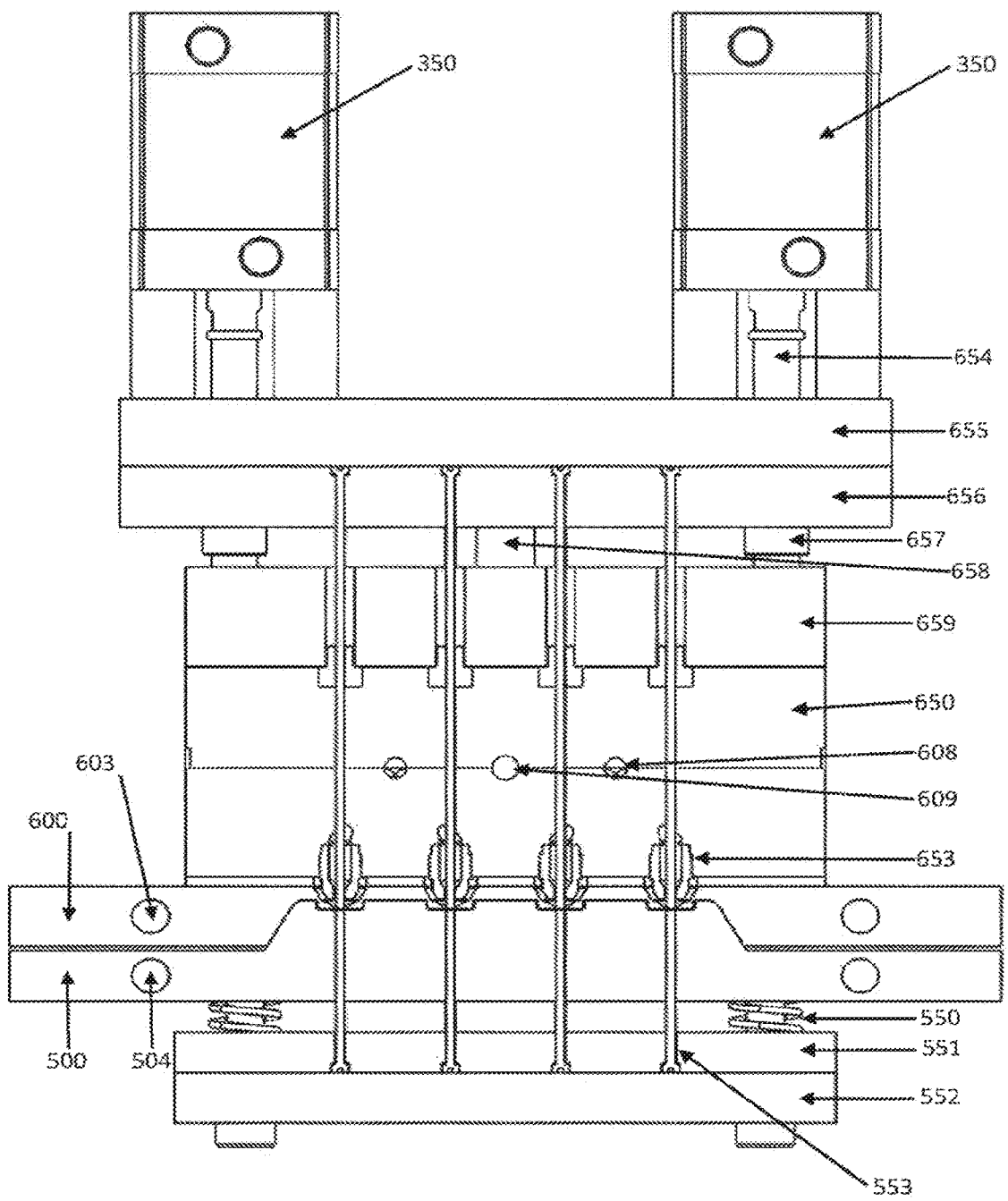
FIG. 12 is a side view of an exemplary first coating delivery system injector comprising an exemplary cavity block (600) fully engaged with an exemplary core block (500) comprising an ejector pin plate (551) holding a set of ejector pins (553).
Figure 13A:
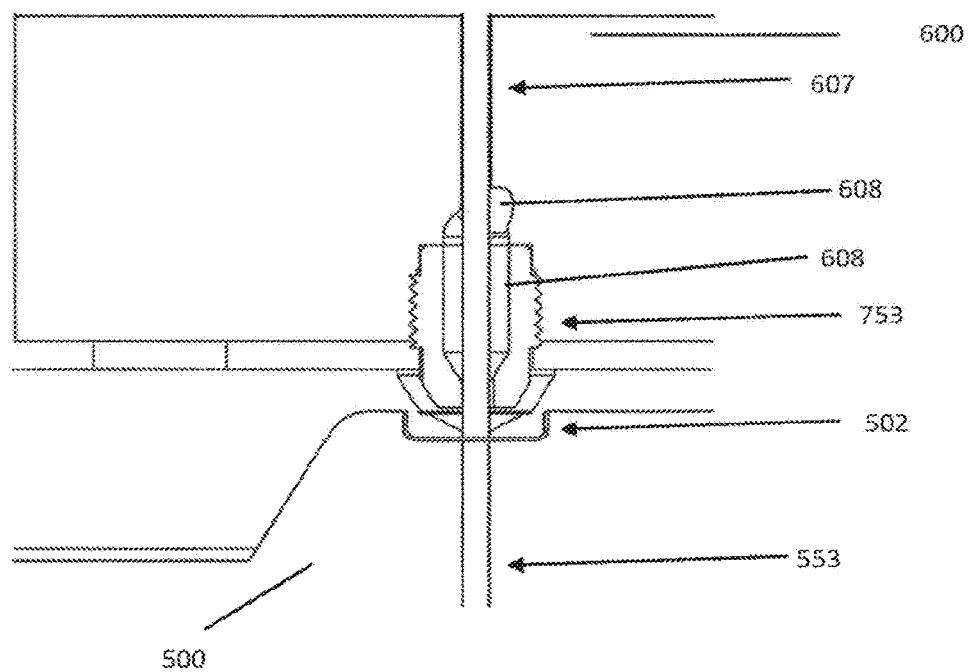
FIG. 13A is a side view of an exemplary extended valve gate (607) within an exemplary coating delivery system (400A, 400B), allowing the flow of coating material into the mold created by joining an exemplary cavity block (600, 700, 800) with an exemplary core block (500).
Figure 13B:
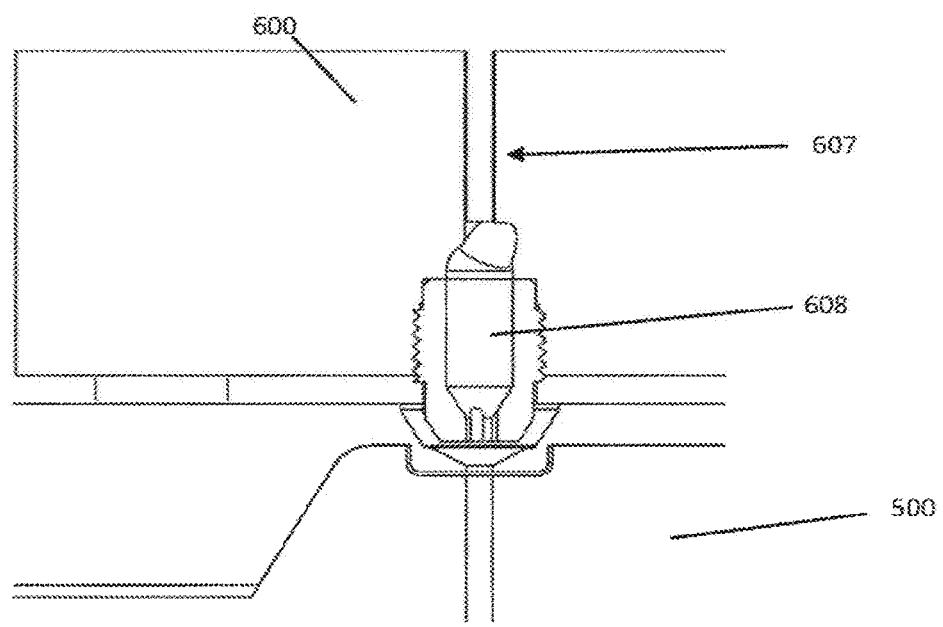
FIG. 13B is a side view of an exemplary retracted valve gate (607) within an exemplary coating delivery system (400A, 400B), blocking the flow of coating material into the mold created by joining an exemplary cavity block (600, 700, 800) with an exemplary core block (500).

Referring to FIGS. 12 and 13A-B, the flow of a coating material from a coating delivery system (400A, 400B) may be controlled by valve gates (607). When valve gates (607) within a cavity block (600, 700, 800) are extended, coating material flows into the temporary mold created by joining a cavity block (600, 700, 800) with a core block (500). Conversely, when valve gates (607) within a cavity block (600, 700, 800) are retracted, the flow of coating material into the temporary mold created by joining a cavity block (600, 700, 800) with a core block (500) is stopped, preventing overfilling of the mold cavities.

In an aspect, the hot melt injection pressure of the present disclosure is about 10,000 psi. In an aspect, the hot melt injection pressure of the present disclosure is about 5,000 psi. In an aspect, the hot melt injection pressure of the present disclosure is about 4,500 psi. In an aspect, the hot melt injection pressure of the present disclosure is about 4,000 psi. In an aspect, the hot melt injection pressure of the present disclosure is about 3,500 psi. In an aspect, the hot melt injection pressure of the present disclosure is about 3,000 psi. In an aspect, the hot melt injection pressure of the present disclosure is about 2,500 psi. In an aspect, the hot melt injection pressure of the present disclosure is about 2,000 psi. In an aspect, the hot melt injection pressure of the present disclosure is about 1,500 psi. In an aspect, the hot melt injection pressure of the present disclosure is about 1,000 psi. In an aspect, the hot melt injection pressure of the present disclosure is about 500 psi. In an aspect, the hot melt injection pressure of the present disclosure is about 100 psi.

In an aspect, the hot melt injection pressure of the present disclosure is between 100 psi and 10,000 psi. In an aspect, the hot melt injection pressure of the present disclosure is between 100 psi and 5,000 psi. In an aspect, the hot melt injection pressure of the present disclosure is between 100 psi and 3,000 psi. In an aspect, the hot melt injection pressure of the present disclosure is between 100 psi and 2,000 psi. In an aspect, the hot melt injection pressure of the present disclosure is between 100 psi and 1,000 psi. In an aspect, the hot melt injection pressure of the present disclosure is between 500 psi and 5,000 psi. In an aspect, the hot melt injection pressure of the present disclosure is between 500 psi and 3,000 psi. In an aspect, the hot melt injection pressure of the present disclosure is between 500 psi and 2,000 psi. In an aspect, the hot melt injection pressure of the present disclosure is between 500 psi and 1,000 psi.

In an aspect, the coating injection pressure of the present disclosure is about 10,000 psi. In an aspect, the coating injection pressure of the present disclosure is about 5,000 psi. In an aspect, the coating injection pressure of the present disclosure is about 4,500 psi. In an aspect, the coating injection pressure of the present disclosure is about 4,000 psi. In an aspect, the coating injection pressure of the present disclosure is about 3,500 psi. In an aspect, the coating injection pressure of the present disclosure is about 3,000 psi. In an aspect, the coating injection pressure of the present disclosure is about 2,500 psi. In an aspect, the coating injection pressure of the present disclosure is about 2,000 psi. In an aspect, the coating injection pressure of the present disclosure is about 1,500 psi. In an aspect, the coating injection pressure of the present disclosure is about 1,000 psi. In an aspect, the coating injection pressure of the present disclosure is about 500 psi. In an aspect, the coating injection pressure of the present disclosure is about 100 psi.

In an aspect, the coating injection pressure of the present disclosure is between 100 psi and 10,000 psi. In an aspect, the coating injection pressure of the present disclosure is between 100 psi and 5,000 psi. In an aspect, the coating injection pressure of the present disclosure is between 100 psi and 3,000 psi. In an aspect, the coating injection pressure of the present disclosure is between 100 psi and 2,000 psi. In an aspect, the coating injection pressure of the present disclosure is between 100 psi and 1,000 psi. In an aspect, the coating injection pressure of the present disclosure is between 500 psi and 5,000 psi. In an aspect, the coating injection pressure of the present disclosure is between 500 psi and 3,000 psi. In an aspect, the coating injection pressure of the present disclosure is between 500 psi and 2,000 psi. In an aspect, the coating injection pressure of the present disclosure is between 500 psi and 1,000 psi.

The present specification provides for hot melt shot sizes and coating shot sizes of various volumes and lengths. In an aspect, the hot melt shot size length of the present disclosure is about 200 mm. In an aspect, the hot melt shot size length of the present disclosure is about 150 mm. In an aspect, the hot melt shot size length of the present disclosure is about 125 mm. In an aspect, the hot melt shot size length of the present disclosure is about 100 mm. In an aspect, the hot melt shot size length of the present disclosure is about 90 mm. In an aspect, the hot melt shot size length of the present disclosure is about 80 mm. In an aspect, the hot melt shot size length of the present disclosure is about 70 mm. In an aspect, the hot melt shot size length of the present disclosure is about 60 mm. In an aspect, the hot melt shot size length of the present disclosure is about 50 mm. In an aspect, the hot melt shot size length of the present disclosure is about 45 mm. In an aspect, the hot melt shot size length of the present disclosure is about 40 mm. In an aspect, the hot melt shot size length of the present disclosure is about 35 mm. In an aspect, the hot melt shot size length of the present disclosure is about 30 mm. In an aspect, the hot melt shot size length of the present disclosure is about 25 mm. In an aspect, the hot melt shot size length of the present disclosure is about 20 mm. In an aspect, the hot melt shot size length of the present disclosure is about 15 mm. In an aspect, the hot melt shot size length of the present disclosure is about 5 mm.

In an aspect, the hot melt shot size length of the present disclosure is between 5 mm and 200 mm. In an aspect, the hot melt shot size length of the present disclosure is between 5 mm and 100 mm. In an aspect, the hot melt shot size length of the present disclosure is between 5 mm and 50 mm. In an aspect, the hot melt shot size length of the present disclosure is between 5 mm and 20 mm. In an aspect, the hot melt shot size length of the present disclosure is between 5 mm and 10 mm. In an aspect, the hot melt shot size length of the present disclosure is between 10 mm and 200 mm. In an aspect, the hot melt shot size length of the present disclosure is between 10 mm and 100 mm. In an aspect, the hot melt shot size length of the present disclosure is between 10 mm and 50 mm. In an aspect, the hot melt shot size length of the present disclosure is between 20 mm and 200 mm. In an aspect, the hot melt shot size length of the present disclosure is between 20 mm and 50 mm. In an aspect, the hot melt shot size length of the present disclosure is between 50 mm and 200 mm. In an aspect, the hot melt shot size length of the present disclosure is between 50 mm and 100 mm. In an aspect, the hot melt shot size length of the present disclosure is between 100 mm and 200 mm.

In an aspect, the coating shot size length of the present disclosure is about 200 mm. In an aspect, the coating shot size length of the present disclosure is about 150 mm. In an aspect, the coating shot size length of the present disclosure is about 125 mm. In an aspect, the coating shot size length of the present disclosure is about 100 mm. In an aspect, the coating shot size length of the present disclosure is about 90 mm. In an aspect, the coating shot size length of the present disclosure is about 80 mm. In an aspect, the coating shot size length of the present disclosure is about 70 mm. In an aspect, the coating shot size length of the present disclosure is about 60 mm. In an aspect, the coating shot size length of the present disclosure is about 50 mm. In an aspect, the coating shot size length of the present disclosure is about 45 mm. In an aspect, the coating shot size length of the present disclosure is about 40 mm. In an aspect, the coating shot size length of the present disclosure is about 35 mm. In an aspect, the coating shot size length of the present disclosure is about 30 mm. In an aspect, the coating shot size length of the present disclosure is about 25 mm. In an aspect, the coating shot size length of the present disclosure is about 20 mm. In an aspect, the coating shot size length of the present disclosure is about 15 mm. In an aspect, the coating shot size length of the present disclosure is about 5 mm.

In an aspect, the coating shot size length of the present disclosure is between 5 mm and 200 mm. In an aspect, the coating shot size length of the present disclosure is between 5 mm and 100 mm. In an aspect, the coating shot size length of the present disclosure is between 5 mm and 50 mm. In an aspect, the coating shot size length of the present disclosure is between 5 mm and 20 mm. In an aspect, the coating shot size length of the present disclosure is between 5 mm and 10 mm. In an aspect, the coating shot size length of the present disclosure is between 10 mm and 200 mm. In an aspect, the coating shot size length of the present disclosure is between 10 mm and 100 mm. In an aspect, the coating shot size length of the present disclosure is between 10 mm and 50 mm. In an aspect, the coating shot size length of the present disclosure is between 20 mm and 200 mm. In an aspect, the coating shot size length of the present disclosure is between 20 mm and 50 mm. In an aspect, the coating shot size length of the present disclosure is between 50 mm and 200 mm. In an aspect, the coating shot size length of the present disclosure is between 50 mm and 100 mm. In an aspect, the coating shot size length of the present disclosure is between 100 mm and 200 mm. 15

In an aspect, the diameter of the core piston barrel injection chamber (325) of the present disclosure is at least 10,000 mm. In an aspect, the diameter of the core piston barrel injection chamber (325) of the present disclosure is at least 1,000 mm. In an aspect, the diameter of the core piston barrel injection chamber (325) of the present disclosure is at least 100 mm. In an aspect, the diameter of the core piston barrel injection chamber (325) of the present disclosure is at least 50 mm. In an aspect, the diameter of the core piston barrel injection chamber (325) of the present disclosure is at least 10 mm. In an aspect, the diameter of the core piston barrel injection chamber (325) of the present disclosure is at least 5 mm. In an aspect, the diameter of the core piston barrel injection chamber (325) of the present disclosure is at least 1 mm. In an aspect, the diameter of the core piston barrel injection chamber (325) of the present disclosure is at least 0.5 mm.

In an aspect, the diameter of the core piston barrel injection chamber (325) of the present disclosure is between 0.5 mm and 10,000 mm. In an aspect, the diameter of the core piston barrel injection chamber (325) of the present disclosure is between 0.5 mm and 1,000 mm. In an aspect, the diameter of the core piston barrel injection chamber (325) of the present disclosure is between 0.5 mm and 100 mm. In an aspect, the diameter of the core piston barrel injection chamber (325) of the present disclosure is between 0.5 mm and 10 mm. In an aspect, the diameter of the core piston barrel injection chamber (325) of the present disclosure is between 0.5 mm and 5 mm. In an aspect, the diameter of the core piston barrel injection chamber (325) of the present disclosure is between 0.5 mm and 1 mm. In an aspect, the diameter of the core piston barrel injection chamber (325) of the present disclosure is between 1,000 mm and 10,000 mm. In an aspect, the diameter of the core piston barrel injection chamber (325) of the present disclosure is between 100 mm and 1,000 mm. In an aspect, the diameter of the core piston barrel injection chamber (325) of the present disclosure is between 10 mm and 100 mm. In an aspect, the diameter of the core piston barrel injection chamber (325) of the present disclosure is between 1 mm and 10 mm.

In an aspect, the diameter of the coating piston barrel injection chamber (422) of the present disclosure is at least 10,000 mm. In an aspect, the diameter of the coating piston barrel injection chamber (422) of the present disclosure is at least 1,000 mm. In an aspect, the diameter of the coating piston barrel injection chamber (422) of the present disclosure is at least 100 mm. In an aspect, the diameter of the coating piston barrel injection chamber (422) of the present disclosure is at least 50 mm. In an aspect, the diameter of the coating piston barrel injection chamber (422) of the present disclosure is at least 10 mm. In an aspect, the diameter of the coating piston barrel injection chamber (422) of the present disclosure is at least 5 mm. In an aspect, the diameter of the coating piston barrel injection chamber (422) of the present disclosure is at least 1 mm. In an aspect, the diameter of the coating piston barrel injection chamber (422) of the present disclosure is at least 0.5 mm.

In an aspect, the diameter of the coating piston barrel injection chamber (422) of the present disclosure is between 0.5 mm and 10,000 mm. In an aspect, the diameter of the coating piston barrel injection chamber (422) of the present disclosure is between 0.5 mm and 1,000 mm. In an aspect, the diameter of the coating piston barrel injection chamber (422) of the present disclosure is between 0.5 mm and 100 mm. In an aspect, the diameter of the coating piston barrel injection chamber (422) of the present disclosure is between 0.5 mm and 10 mm. In an aspect, the diameter of the coating piston barrel injection chamber (422) of the present disclosure is between 0.5 mm and 5 mm. In an aspect, the diameter of the coating piston barrel injection chamber (422) of the present disclosure is between 0.5 mm and 1 mm. In an aspect, the diameter of the coating piston barrel injection chamber (422) of the present disclosure is between 1,000 mm and 10,000 mm. In an aspect, the diameter of the coating piston barrel injection chamber (422) of the present disclosure is between 100 mm and 1,000 mm. In an aspect, the diameter of the coating piston barrel injection chamber (422) of the present disclosure is between 10 mm and 100 mm. In an aspect, the diameter of the coating piston barrel injection chamber (422) of the present disclosure is between 1 mm and 10 mm.

EXEMPLARY EMBODIMENTS

Embodiment 1. A machine for producing coated pharmaceutical tablets by a continuous process comprising: a mold unit (200) comprising a molding frame (207) comprising at least one core block (500) and rotatable to at least four positions; a first coating delivery system (400A) comprising a first cavity block (600), a means to provide a heated coating material under pressure, and a mechanism for reversibly joining and placing said first cavity block in fluid communication with said at least one core block (500) forming a first temporary mold on said molding frame (207) at a first position; a core injection unit (300) comprising a piston barrel injection chamber (325) fitted with a retractable piston (321), a port, a second cavity block (700), and a mechanism for reversibly joining and placing said second cavity block (700) in fluid communication with said at least one core block forming a second temporary mold on said molding frame (207) at a second position, wherein said retractable piston (321) is configured to retract to expand said piston barrel injection chamber (325) and extend to eject material present in said piston barrel injection chamber (325) into said second temporary mold; a second coating delivery system (400B) comprising a third cavity block (800), a means to provide a heated coating material under pressure, and a mechanism for reversibly joining and placing said third cavity block (800) in fluid communication with said at least one core block (500) forming a third temporary mold on said molding frame (207) at a third position; and a discharge area located at or in proximity to a fourth position of said molding frame (207).

Embodiment 2. The machine of embodiment 1, wherein said retractable piston (321) is an auger flighting.

Embodiment 3. The machine of embodiment 1 or 2, wherein said molding frame (207) comprises four, five, six, seven, or eight positions.

Embodiment 4. The machine of any of embodiments 1 to 3, wherein said molding frame (207) comprises four positions.

Embodiment 5. The machine of any of embodiments 1 to 4, wherein each position of said molding frame (207) comprises a core block (500).

Embodiment 6. The machine of any of embodiments 1 to 5, wherein said at least one core block (500) comprises a set of retractable ejection pins (533).

Embodiment 7. The machine of any of embodiments 1 to 6, wherein said set of retractable ejection pin (533) comprises a single ejection pin per well (502).

Embodiment 8. The machine of any of embodiments 1 to 6, wherein said set of retractable ejection pin (533) comprises two ejection pins per well (502).

Embodiment 9. The machine of any of embodiments 1 to 8, wherein said at least one core block (500) comprises a means for retaining injected material.

Embodiment 10. The machine of embodiment 9, wherein said means of retaining the injected material is selected from the group comprising retaining by vacuum, retaining by adhesion, retaining by mass distribution, and retaining by physical clamping.

Embodiment 11. The machine of any of embodiments 1 to 10, wherein said at least one core block (500) comprises an outer frame (510) and a detachable inner plate (520), wherein said detachable inner plate (520) fits into and is configured to attach to said outer frame (510).

Embodiment 12. The machine of any of embodiments 1 to 11, wherein said port is joined to and in direct fluid communication with a coating extruder (100).

Embodiment 13. The machine of any of embodiment 12, wherein said coating extruder (100) comprises a removable extrusion barrel liner (103).

Embodiment 14. The machine of embodiment 12 or 13, wherein said coating extruder (100) comprises a coating extruder barrel (101) comprising between one and five extruder barrel segments, wherein the temperature of each extruder barrel segment may be controlled independently.

Embodiment 15. The machine of any of embodiments 1 to 14, wherein said at least one core block (500) has a capacity for molding between 8 and 32 tablets.

Embodiment 16. The machine of any of embodiments 1 to 15, wherein said at least one core block (500) comprises a spatial arrangement of wells positioned in a grid orientation or a hexagonal orientation.

Embodiment 17. The machine of any of embodiments 1 to 16, wherein a cavity block (600, 700, 800) comprises a spatial arrangement of wells positioned in a grid orientation or a hexagonal orientation.

Embodiment 18. The machine of any of embodiments 1 to 17, wherein a cavity block (600, 700, 800) comprises an outer frame (610, 710) and a detachable inner plate (620, 720), where said detachable inner plate (620, 720) fits into and is configured to attach to said outer frame (610, 710).

Embodiment 19. The machine of any of embodiments 1 to 18, wherein said first coating delivery system (400A) further comprises a piston barrel injection chamber (422) fitted with a retractable piston (419), wherein said retractable piston (419) is configured to retract to expand said piston barrel injection chamber (422) and extend to eject said coating material present in said piston barrel injection chamber (422) into said first cavity block (600).

Embodiment 20. The machine of any of embodiments 1 to 19, wherein said second coating delivery system (400B) further comprises a piston barrel injection chamber (422) fitted with a retractable piston (419), wherein said retractable piston (419) is configured to retract to expand said piston barrel injection chamber (422) and extend to eject said coating material present in said piston barrel injection chamber (422) into said third cavity block (800).

Embodiment 21. A machine for producing coated pharmaceutical tablets by a continuous process comprising: a mold unit (200) comprising a molding frame (207) comprising at least one core block (500) and rotatable to at least four positions; a coating delivery system (400A, 400B) comprising a first cavity block (600) and a third cavity block (800), a means to provide a heated coating material under pressure, and a mechanism for reversibly joining and placing either said first cavity block (600) or said third cavity block (800) in fluid communication with said at least one core block (500) forming a temporary mold on said molding frame (207) at either a first or third position; a core injection unit (300) comprising a piston barrel injection chamber (325) fitted with a retractable piston (321), a port, a second cavity block (700), and a mechanism for reversibly joining and placing said second cavity block in fluid communication with said at least one core block (500) forming a temporary mold on said molding frame (207) at a second position, wherein said retractable piston (321) is configured to retract to expand said piston barrel injection chamber (325) and extend to eject material present in said piston barrel injection chamber (325) into said second temporary mold; and a discharge area located at or in proximity to a fourth position of said molding frame (207).

Embodiment 22. A machine for producing uncoated pharmaceutical tablets by a continuous process comprising: a mold unit (200) comprising a molding frame (207) at least one core block (500) and rotatable to at least four positions; a core injection unit comprising a piston barrel injection chamber (325) fitted with a retractable piston (321), a port, a cavity block (700), and a mechanism for reversibly joining and placing said cavity block in fluid communication with said at least one core block (500) forming a temporary mold on said molding frame (207) at a first, second, or third position, wherein said retractable piston (321) is configured to retract to expand said piston barrel injection chamber (325) and extend to eject material present in said piston barrel injection chamber (325) into said second temporary mold; and a discharge area located at or in proximity to a fourth position of said molding frame (207).

Embodiment 23. A core injection unit (300) for injecting a continuous source of a coating comprising an active pharmaceutical ingredient and one or more excipients into at least one core block (500), wherein said core injection unit (300) comprises a piston barrel injection chamber (325) fitted with a retractable piston (321), a port, a cavity block (700), and a mechanism for reversibly joining and placing said cavity block in fluid communication with said at least one core block (500) to form a temporary mold, wherein said retractable piston (321) is configured to retract to expand said piston barrel injection chamber (325) and extend to eject material present in said piston barrel injection chamber (325) into said temporary mold.

Embodiment 24. The core injection unit of embodiment 23, wherein said port is joined to and in direct fluid communication with a coating reservoir.

Embodiment 25. A method for producing coated pharmaceutical tablets by an integrated, continuous process comprising: providing a machine according to claim 1 comprising a mold unit (200) comprising a molding frame (207) comprising at least one core block (500) and rotatable to at least four positions, and a continuous source of a coating comprising an active pharmaceutical ingredient and one or more excipients; forming a half coat to said at least one core block (500) by: (a) joining and placing a first cavity block (600) in fluid communication with a first coating delivery system (400A) and said at least one core block (500) to form a first temporary mold in a first position; (b) injecting a first coating material into said first temporary mold to form a half coat; (c) separating said first temporary mold to provide at least one core block (500) comprising a half coat; and (d) rotating said molding frame (207) to a second position; forming half coated pharmaceutical pre-tablets by: (a) joining and placing a second cavity block (700) in fluid communication with a piston barrel injection chamber (325) fitted with a retractable piston (321) and a port to introduce said coating into said piston barrel injection chamber (325) and said at least one core block (500) comprising a half coat to form a second temporary mold; (b) injecting said coating into said second temporary mold by extending said retractable piston (321) into said piston barrel injection chamber (325) to form half coated pharmaceutical pre-tablets; (c) separating said second temporary mold to provide at least one core block (500) comprising half coated pharmaceutical pre-tablets while simultaneously initiating retraction of said retractable piston (321) to expand said piston barrel injection chamber (325) and accommodate a flow of said coating from said continuous source; and (d) rotating said molding frame (207) to a third position; forming fully coated pharmaceutical tablets by: (a) joining and placing a third cavity block (800) in fluid communication with a second coating system (400B) and said at least one core block (500) comprising half coated pharmaceutical pre-tablets to form a third temporary mold; (b) injecting a second coating material into said third temporary mold to form fully coated pharmaceutical tablets; (c) separating said third temporary mold to provide at least one core block (500) comprising fully coated pharmaceutical tablets; and (d) rotating said molding frame (207) to a fourth position; and ejecting said fully coated pharmaceutical tablets from said at least one core block comprising fully coated pharmaceutical tablets and then rotating said molding frame (207) to a different position.

Embodiment 26. The method of embodiment 25, wherein said molding frame (207) further comprises additional core blocks (500), wherein each additional core block (500) is located at a different position of said molding frame (207).

Embodiment 27. The method of embodiment 25 or 26, wherein the above steps are performed simultaneously and said forming and ejecting steps are determined by the position of said additional core blocks (500) on said molding frame (207).

Embodiment 28. The method of any of embodiments 25 to 27, wherein said molding frame (207) comprises four core blocks (500).

Embodiment 29. The method of any of embodiments 25 to 28, wherein said coated pharmaceutical tablets are produced continuously at a rate of between 50 tablets per hour and 20,000 tablets per hour.

Embodiment 30. The method of any of embodiments 25 to 29, wherein said coating is provided at a volumetric flow rate between at least 1 ml/min and at least 1,000 ml/min.

Embodiment 31. The method of any of embodiments 25 to 30, wherein said active pharmaceutical ingredient is processed into said coated pharmaceutical tablets at a rate of between 1 g per hour and 3,000 g per hour.

Embodiment 32. The method of any of embodiments 25 to 31, wherein said molding frame (207) rotates in 90 degree increments.

Embodiment 33. The method of any of embodiments 25 to 32, wherein said molding frame (207), said first cavity block (600), said second cavity block (700), and said third cavity block (800) are cooled by an external temperature control unit.

Embodiment 34. The method of any of embodiments 25 to 33, wherein said core block (500) further comprises retractable ejection pins (553) and said fully coated pharmaceutical tablets are ejected by said pins.

Embodiment 35. The method of any of embodiments 25 to 34, wherein said coating material is chosen from the group consisting of sugars, waxes, celluloses, and fatty acids.

Embodiment 36. The method of any of embodiments 25 to 35, wherein said one or more excipients are chosen from the group consisting of polyvinylpyrrolidone (PVP), vinylpyrrolidone-vinyl acetate copolymer (PVP-PVAc), ethyl vinyl acetate (EVA), polyvinyl alcohol (PVA), polyvinyl acetate (PVAc), polyethylene glycol (PEG), polyethylene oxide (PEO), cellulose ethers, cellulose esters, carboxymethyl cellulose (CMC), methylcellulose (MC), hydroxyethyl cellulose (HEC), hydroxypropyl methyl cellulose (HPMC), hydroxyethyl methyl cellulose (HEMC), hydroxypropyl cellulose (HPC), ethylcellulose (EC), cellulose acetate phthalate (CAP), polyvinyl acetate phthalate (PVAP), cellulose acetate trimellitate (CAT), cellulose acetate butyrate (CAB), poly(alkyl)methacrylates, poly(m-ethyl)methacrylates (PMMA), acrylate ester copolymers, methacrylate copolymers, ammonium methacrylate copolymer, methacrylic acid copolymers, methacrylic acid-ethyl acrylate copolymers, neutral methacrylate copolymers, polyvinyl caprolactam-polyvinyl acetate-polyethylene glycol graft copolymer (PEG-VCap-VAc); polyglycolide (PGA), poly(L-lactide) (PLA), poly(L-lactide-coglycolide) copolymers (PLGA), poly(ε-caprolactone) (PCL), polysaccharides, maltodextrin, starch, modified starches, pullulan, sugar alcohols, sorbitol, mannitol, maltitol, erythritol, xylitol, isomalt, lactitol, thermoplastic polyurethanes, shellac, zein, chitosan, carrageenan, alginic acid polymer, xanthum gum, gelatin, polyanhydrides, fatty acids, fatty alcohols, fatty acid esters, waxes, and any mixtures thereof.

Embodiment 37. The method of any of embodiments 25 to 36, wherein said first coating material and said second coating material are identical.

Embodiment 38. The method of any of embodiments 25 to 37, wherein said fully coated pharmaceutical tablets comprise a first partial coat and second partial coat of different thickness.

Embodiment 39. The method of any of embodiments 25 to 38, wherein said fully coated pharmaceutical tablets comprise a first partial coat and a second partial coat with unequal surface areas.

Embodiment 40. The method of any of embodiments 25 to 39, wherein said coated pharmaceutical tablets are disk-shaped or oval-shaped.

Embodiment 41. A coating extruder (100) comprising a motion control unit (108) and an extrusion barrel (101), wherein the extrusion barrel (101) further comprises a primary inlet port (109), at least one temperature control block (102), a twin screw extruder (104), one or more secondary inlet ports (110), and a removable extrusion barrel liner (103) comprising openings aligned with said primary inlet port (109) and said one or more secondary inlet ports (110).

Embodiment 42. The coating extruder of embodiment 41, wherein said coating extruder (100) further comprises a transfer manifold (116).

Embodiment 43. The coating extruder of embodiment 42, wherein said transfer manifold (116) further comprises a pressure sensor.

Embodiment 44. The coating extruder of embodiment 42 or 43, wherein said transfer manifold (116) comprises one or more in-line detector ports (110).

Embodiment 45. The coating extruder of embodiment 44, wherein said one or more in-line detector ports (110) are connected to one or more in-line detection instruments.

Embodiment 46. The coating extruder of embodiment 45, wherein each of the said one or more in-line detection instruments is chosen from the group consisting of a Fourier transformation near-infrared spectrometer, a Raman spectrometer, an ultraviolet-visible spectrometer, a high performance liquid chromatography instrument, a pH meter, an electrical conductivity meter, a pressure sensor, a fluorescence spectrometer, and a mass spectrometer.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

While the present disclosure has been described with reference to particular aspects, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the scope of the present disclosure.

EXAMPLES

Example 1

The continuous manufacture of coated pharmaceutical tablets by the integrated coating extrusion and injection molding using the machine of FIG. 1A is described. An API is fed continuously into the primary material inlet of the extruder at a rate of 0.5 kg/h for a two hour period. An excipient A and a plasticizer B are fed into the extruder from another system. The feeding area of the extruder is continuously cooled with an external cooling system. The extruder comprises four extruder segments which are heated at 135° C., 150° C., 150° C. and 150° C., respectively. The transfer manifold, feed block, and injection barrel segments are all heated at 150° C. The first and second coating barrel segments are heated at 155° C. The mold blocks are cooled to 8° C.

The first coating unit is charged with a pre-mixed mixture of polymer C and plasticizer D. The rotational speed of the first coating injection screw is set at 30 rotations per minute (rpm). Upon reaching a set shot size length of 20 mm, where the barrel diameter is 10 mm, the material is injected into the first mold with an injection pressure of approximately 1500 psi. A mold block cooling time of 10 seconds is employed.

The twin extruder screw rotation rate in the extruder is set at 100 rpm. As the volume of coating increases, the transfer manifold pressure probe increases. Upon reaching the melt cut off pressure, the coating begins to fill the coating injection barrel with a backward motion of the injection screw. Upon reaching the set shot size of 50 mm, where the barrel diameter is 10 mm, the coating injection screw injects the coating into an attached mold with injection pressure of approximately 2500 psi.

The parameters and materials employed for the second coating unit are identical to those of the first coating unit, with the exception that the injection pressure for coating is held at 2000 psi.

After the cooling time of 10 seconds, the molds are disengaged, the molding platform rotates, and the molded coated tablets are ejected into a discharge area.

After a 30 min startup time, the run is conducted continuously for a 2 hour period the total consumption of API during this time period is 1 kg, resulting in the production of 21,500 coated pharmaceutical tablets of uniform size and shape.

Example 2

The procedure of Example 1 for the continuous manufacture of coated pharmaceutical tablets by the integrated coating extrusion and injection molding using the machine of FIG. 1A is repeated with the following modifications: (1) An API is fed continuously into the primary material inlet of the extruder at a rate of 1.5 kg/h for a 2 hour period; (2) the twin extruder screw rotation rate in the extruder is set at 160 rpm; (3), the mold block cooling time is decreased to 5 seconds; and (d) the mold block fluid cooling system is cooled to 0° C. The same extruder segment temperatures, transfer manifold temperature, feed block temperature, injection barrel segment temperature, first and second coating barrel segments temperatures, and injection pressures provided in Example 1 were used. These modifications result in immediate solidification of injected materials within the molds and incomplete filling of the molds, producing coated pharmaceutical tablets of non-uniform shape and size. Repeating the same procedure with a single change, cooling of the mold blocks to 4° C. rather than 0° C., results in the production of 64,100 coated pharmaceutical tablets of uniform size and shape.

Example 3

The procedure of Example 1 for the continuous manufacture of coated pharmaceutical tablets by the integrated coating extrusion and injection molding using the machine of FIG. 1A is repeated with the following modification: An API is fed continuously into the primary material inlet of the extruder at a rate of 1.0 kg/h for a 2 hour period. These modifications result in the production of 42,700 coated pharmaceutical tablets of uniform size and shape.

The invention claimed is:

1. A machine for producing coated pharmaceutical tablets by a continuous process comprising:
   a mold unit (200) comprising a molding frame (207) comprising at least one core block (500) and rotatable to at least four positions;
   a first coating delivery system (400A) comprising a first cavity block (600), a means to provide a heated coating material under pressure, and a mechanism for reversibly joining and placing said first cavity block in fluid communication with said at least one core block (500) forming a first temporary mold on said molding frame (207) at a first position;
   a core injection unit (300) comprising a piston barrel injection chamber (325) fitted with a retractable piston (321), a port, a second cavity block (700), and a mechanism for reversibly joining and placing said second cavity block (700) in fluid communication with said at least one core block forming a second temporary mold on said molding frame (207) at a second position, wherein said retractable piston (321) is configured to retract to expand said piston barrel injection chamber (325) and extend to eject material present in said piston barrel injection chamber (325) into said second temporary mold;
   a second coating delivery system (400B) comprising a third cavity block (800), a means to provide a heated coating material under pressure, and a mechanism for reversibly joining and placing said third cavity block (800) in fluid communication with said at least one core block (500) forming a third temporary mold on said molding frame (207) at a third position; and
   a discharge area located at or in proximity to a fourth position of said molding frame (207), wherein said at least one core block (500) comprises a plurality of wells (502) on its surface, wherein said first cavity block (600) comprises a plurality of extrusions (602) extending out from its surface, and wherein each of said second cavity block (700) and said third cavity block (800) comprises a plurality of wells (702) on its surface.

2. The machine of claim 1, wherein said molding frame (207) comprises four, five, six, seven, or eight positions, and at least one of said positions comprises said at least one core block (500).

3. The machine of claim 1, wherein said plurality of wells (502) are spatially arranged in a grid orientation or a hexagonal orientation on the surface of said at least one core block (500).

4. The machine of claim 3, wherein said at least one core block (500) comprises at least one retractable ejection pin (533) per well (502).

5. The machine of claim 1, wherein said at least one core block (500) comprises a means of retaining injected material, said means of retaining the injected material selected from the group consisting of retaining by vacuum, retaining by adhesion, retaining by mass distribution, and retaining by physical clamping.

6. The machine of claim 1, wherein said at least one core block (500) comprises an outer frame (510) and a detachable inner plate (520), wherein said detachable inner plate (520) fits into and is configured to attach to said outer frame (510).

7. The machine of claim 1, wherein said port is joined to and in direct fluid communication with a coating extruder (100).

8. The machine of claim 7, wherein said coating extruder (100) comprises
- a removable extrusion barrel liner (103),
- a coating extruder barrel (101) comprising between one and five extruder barrel segments, and
- a transfer manifold (116) comprising one or more in-line detector ports (110) connected to one or more in-line detection instruments, wherein the temperature of each extruder barrel segment may be controlled independently.

9. The machine of claim 1, wherein said plurality of wells (702) are spatially arranged in a grid orientation or a hexagonal orientation on the surface of said second cavity block (700), said third cavity block (800), or both.

10. The machine of claim 1, wherein one or more of said cavity blocks (600, 700, 800) comprises an outer frame (610, 710) and a detachable inner plate (620, 720), wherein said detachable inner plate (620, 720) fits into and is configured to attach to said outer frame (610, 710).

11. The machine of claim 1, wherein one or more of said coating delivery systems (400A, 400B) further comprises a piston barrel injection chamber (422) fitted with a retractable piston (419), wherein said retractable piston (419) is configured to retract to expand said piston barrel injection chamber (422) and extend to eject said coating material present in said piston barrel injection chamber (422) into said cavity block (600, 700, 800).

12. A machine for producing coated pharmaceutical tablets by a continuous process comprising:
- a mold unit (200) comprising a molding frame (207) comprising at least one core block (500) and rotatable to at least four positions;
- a coating delivery system (400) comprising a first cavity block (600) and a third cavity block (800), a means to provide a heated coating material under pressure, and a mechanism for reversibly joining and placing either said first cavity block (600) or said third cavity block (800) in fluid communication with said at least one core block (500) forming a temporary mold on said molding frame (207) at either a first or third position;
- a core injection unit (300) comprising a piston barrel injection chamber (325) fitted with a retractable piston (321), a port, a second cavity block (700), and a mechanism for reversibly joining and placing said second cavity block in fluid communication with said at least one core block (500) forming a temporary mold on said molding frame (207) at a second position, wherein said retractable piston (321) is configured to retract to expand said piston barrel injection chamber (325) and extend to eject material present in said piston barrel injection chamber (325) into said second temporary mold; and
- a discharge area located at or in proximity to a fourth position of said molding frame (207), wherein said at least one core block (500) comprises a plurality of wells (502) on its surface, wherein said first cavity block (600) comprises a plurality of extrusions (602) extending out from its surface, and wherein each of said second cavity block (700) and said third cavity block (800) comprises a plurality of wells (702) on its surface.

13. A machine for producing uncoated pharmaceutical tablets by a continuous process comprising:
- a mold unit (200) comprising a molding frame (207) at least one core block (500) and rotatable to at least four positions;
- a core injection unit comprising a piston barrel injection chamber (325) fitted with a retractable piston (321), a port, a cavity block (700), and a mechanism for reversibly joining and placing said cavity block in fluid communication with said at least one core block (500) forming a temporary mold on said molding frame (207) at a first, second, or third position, wherein said retractable piston (321) is configured to retract to expand said piston barrel injection chamber (325) and extend to eject material present in said piston barrel injection chamber (325) into said second temporary mold; and
- a discharge area located at or in proximity to a fourth position of said molding frame (207), wherein said at least one core block (500) comprises a plurality of wells (502) on its surface, and wherein said cavity block (700) comprises a plurality of wells (702) on its surface.

14. A method for producing coated pharmaceutical tablets by an integrated, continuous process comprising:
providing a machine according to claim 1 comprising a mold unit (200) comprising a molding frame (207) comprising at least one core block (500) and rotatable to at least four positions, and a continuous source of a coating comprising an active pharmaceutical ingredient and one or more excipients; forming a half coat to said at least one core block (500) by:
- (a) joining and placing a first cavity block (600) in fluid communication with a first coating delivery system (400A) and said at least one core block (500) to form a first temporary mold in a first position;
- (b) injecting a first coating material into said first temporary mold to form a half coat;
- (c) separating said first temporary mold to provide at least one core block (500) comprising a half coat; and
- (d) rotating said molding frame (207) to a second position;

forming half coated pharmaceutical pre-tablets by:
- (a) joining and placing a second cavity block (700) in fluid communication with a piston barrel injection chamber (325) fitted with a retractable piston (321) and a port to introduce said coating into said piston barrel injection chamber (325) and said at least one core block (500) comprising a half coat to form a second temporary mold;
- (b) injecting said coating into said second temporary mold by extending said retractable piston (321) into said piston barrel injection chamber (325) to form half coated pharmaceutical pre-tablets;
- (c) separating said second temporary mold to provide at least one core block (500) comprising half coated pharmaceutical pre-tablets while simultaneously initiating retraction of said retractable piston (321) to expand said piston barrel injection chamber (325) and accommodate a flow of said coating from said continuous source; and
- (d) rotating said molding frame (207) to a third position; forming fully coated pharmaceutical tablets by:
  (a) joining and placing a third cavity block (800) in fluid communication with a second coating application system (400B) and said at least one core block (500) comprising half coated pharmaceutical pre-tablets to form a third temporary mold; (b) injecting a second coating material into said third temporary mold to form fully coated pharmaceutical tablets;

(c) separating said third temporary mold to provide at least one core block (500) comprising fully coated pharmaceutical tablets; and (d) rotating said molding frame (207) to a fourth position; and ejecting said fully coated pharmaceutical tablets from said at least one core block comprising fully coated pharmaceutical tablets and then rotating said molding frame (207) to a different position.

15. The method of claim 14, wherein said molding frame (207) further comprises additional core blocks (500), wherein each additional core block (500) is located at a different position of said molding frame (207).

16. The method of claim 14, wherein the above steps are performed simultaneously and said forming and ejecting steps are determined by the position of said additional core blocks (500) on said molding frame (207).

17. The method of claim 14, wherein said molding frame (207) and said cavity blocks (600, 700, 800) are cooled by an external temperature control unit.

18. The method of claim 14, wherein said at least one core block (500) further comprises retractable ejection pins (553), and said fully coated pharmaceutical tablets are ejected by said pins.

19. The method of claim 14, wherein
said coating material is selected from the group consisting of sugars, waxes, celluloses, and fatty acids, and
said one or more excipients are chosen from the group consisting of polyvinylpyrrolidone (PVP), vinylpyrrolidone-vinyl acetate copolymer (PVP-PVAc), ethyl vinyl acetate (EVA), polyvinyl alcohol (PVA), polyvinyl acetate (PVAc), polyethylene glycol (PEG), polyethylene oxide (PEO), cellulose ethers, cellulose esters, carboxymethyl cellulose (CMC), methylcellulose (MC), hydroxyethyl cellulose (HEC), hydroxypropyl methyl cellulose (HPMC), hydroxyethyl methyl cellulose (HEMC), hydroxypropyl cellulose (HPC), ethylcellulose (EC), cellulose acetate phthalate (CAP), polyvinyl acetate phthalate (PVAP), cellulose acetate trimellitate (CAT), cellulose acetate butyrate (CAB), poly(alkyl)methacrylates, poly(methyl)methacrylates (PMMA), acrylate ester copolymers, methacrylate copolymers, ammonium methacrylate copolymer, methacrylic acid copolymers, methacrylic acid-ethyl acrylate copolymers, neutral methacrylate copolymers, polyvinyl caprolactam-polyvinyl acetate-polyethylene glycol graft copolymer (PEG-VCap-VAc); polyglycolide (PGA), poly(L-lactide) (PLA), poly(L-lactide-coglycolide) copolymers (PLGA), poly(ε-caprolactone) (PCL), polysaccharides, maltodextrin, starch, modified starches, pullulan, sugar alcohols, sorbitol, mannitol, maltitol, erythritol, xylitol, isomalt, lactitol, thermoplastic polyurethanes, shellac, zein, chitosan, carrageenan, alginic acid polymer, xanthum gum, gelatin, polyanhydrides, fatty acids, fatty alcohols, fatty acid esters, waxes, and any mixtures thereof.

20. The method of claim 14, wherein said coated pharmaceutical tablets are produced continuously at a rate of between 50 tablets per hour and 100,000 tablets per hour.

21. The method of claim 14, wherein said molding frame (207) rotates in 90 degree increments.

* * * * *